(12) United States Patent
Miyagishima

(10) Patent No.: US 12,693,523 B2
(45) Date of Patent: Jul. 28, 2026

(54) OBSERVATION OPTICAL SYSTEM AND OPTICAL APPARATUS

(71) Applicant: FUJIFILM Corporation, Tokyo (JP)

(72) Inventor: Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 264 days.

(21) Appl. No.: 18/469,338

(22) Filed: Sep. 18, 2023

(65) Prior Publication Data

US 2024/0103262 A1 Mar. 28, 2024

(30) Foreign Application Priority Data

Sep. 22, 2022 (JP) ................................. 2022-151984

(51) Int. Cl.
*G02B 25/04* (2006.01)
*G02B 13/00* (2006.01)
*G02B 25/00* (2006.01)

(52) U.S. Cl.
CPC ......... *G02B 25/04* (2013.01); *G02B 13/0045* (2013.01); *G02B 25/001* (2013.01)

(58) Field of Classification Search
CPC ... G02B 25/04; G02B 13/0045; G02B 25/001
USPC ........................................................ 359/643
See application file for complete search history.

(56) References Cited

U.S. PATENT DOCUMENTS

2015/0226954 A1 8/2015 Miyamoto
2017/0371147 A1 12/2017 Cao et al.

2021/0033866 A1 2/2021 Cao et al.
2021/0271055 A1 9/2021 Kuo et al.
2023/0288666 A1* 9/2023 Shinobu ................. G02B 13/18

FOREIGN PATENT DOCUMENTS

| JP | 2013-250506 A | 12/2013 |
| JP | 2020-030421 A | 2/2020 |
| JP | 2021-005111 A | 1/2021 |
| JP | 2021-067864 A | 4/2021 |
| JP | 2021-135498 A | 9/2021 |
| JP | 2021-536023 A | 12/2021 |
| JP | 2022-058068 A | 4/2022 |

(Continued)

OTHER PUBLICATIONS

An Office Action, "Notice of Reasons for Refusal," mailed by the Japanese Patent Office on Mar. 17, 2026, which corresponds to Japanese Patent Application No. 2022-151984 and is related to U.S. Appl. No. 18/469,338; with English language translation.

*Primary Examiner* — William Choi
(74) *Attorney, Agent, or Firm* — Studebaker Brackett PLLC

(57) ABSTRACT

An observation optical system includes a display element, and an eyepiece lens disposed on an eyepoint side with respect to the display element. The eyepiece lens includes a first negative lens having strongest negative refractive power among lenses included in the eyepiece lens, a first positive lens disposed adjacent to a display element side of the first negative lens, and a second positive lens disposed closest to the display element side among positive lenses disposed on the eyepoint side with respect to the first negative lens. The number of lenses included in the eyepiece lens is greater than or equal to five. The observation optical system satisfies predetermined conditional expressions.

22 Claims, 31 Drawing Sheets

EXAMPLE 1

(56)          References Cited

FOREIGN PATENT DOCUMENTS

| | | |
|---|---|---|
| JP | 2023-131451 A | 9/2023 |
| WO | 2014/073027 A1 | 5/2014 |
| WO | 2019/054358 A1 | 3/2019 |

* cited by examiner

EXAMPLE 1

EXAMPLE 2

EXAMPLE 2

EXAMPLE 3

EXAMPLE 3

EXAMPLE 4

EXAMPLE 4

EXAMPLE 5

EXAMPLE 6

EXAMPLE 6

EXAMPLE 7

EXAMPLE 7

EXAMPLE 8

EXAMPLE 8

EXAMPLE 9

EXAMPLE 9

EXAMPLE 10

EXAMPLE 10

EXAMPLE 11

EXAMPLE 12

EXAMPLE 12

EXAMPLE 13

EXAMPLE 13

EXAMPLE 14

EXAMPLE 15

EXAMPLE 15

OBSERVATION OPTICAL SYSTEM AND OPTICAL APPARATUS

CROSS-REFERENCE TO RELATED APPLICATIONS

This application claims priority from Japanese Patent Application No. 2022-151984, filed on Sep. 22, 2022, the entire disclosure of which is incorporated herein by reference.

BACKGROUND

Technical Field

The present disclosure relates to an observation optical system and an optical apparatus.

Related Art

In the related art, lens systems disclosed in JP2021-005111A, JP2021-067864A, JP2020-030421A, and WO2014/073027A have been known as an ocular optical system applicable to an observation optical system.

SUMMARY

There has been demand for an observation optical system that enables observation with a wide apparent field of view while having favorable performance achieved by suitably correcting various aberrations such as a field curvature and a lateral chromatic aberration. A level of demand has increased year by year.

The present disclosure provides an observation optical system that enables observation with a wide apparent field of view while having favorable performance, and an optical apparatus comprising the observation optical system.

An observation optical system according to an aspect of the present disclosure comprises a display element, and an eyepiece lens disposed on an eyepoint side with respect to the display element, in which the eyepiece lens includes a first negative lens having strongest negative refractive power among lenses included in the eyepiece lens, a first positive lens disposed adjacent to a display element side of the first negative lens, and a second positive lens disposed closest to the display element side among positive lenses disposed on the eyepoint side with respect to the first negative lens, the number of lenses included in the eyepiece lens is greater than or equal to five, and in a case where a half value of a longest diameter of a display region in the display element is denoted by H, a focal length of the eyepiece lens in a state where diopter is −1 diopter is denoted by f, a sum of an air conversion distance on an optical axis from a display surface of the display element to a lens surface of the eyepiece lens closest to the display element side and a distance on the optical axis from the lens surface of the eyepiece lens closest to the display element side to a lens surface of the eyepiece lens closest to the eyepoint side in a state where the diopter is −1 diopter is denoted by TLA, and a refractive index of the first negative lens with respect to a d line is denoted by Nn1, Conditional Expressions (1), (2), and (3) are satisfied, which are represented by $$0.355 < H/f < 0.48 \tag{1}$$

$$0.17 < H/TLA < 0.285 \tag{2}$$

$$1.5 < Nn1 < 1.7 \tag{3}$$

The number of lenses included in the eyepiece lens may be configured to be five or six.

In a case where a paraxial curvature radius of a surface of the first positive lens on the eyepoint side is denoted by Rpr, and a paraxial curvature radius of a surface of the first negative lens on the display element side is denoted by Rnf, the observation optical system of the above aspect preferably satisfies Conditional Expression (4) represented by $$0 < |(Rnf-Rpr)/(Rnf+Rpr)| < 0.6 \tag{4}$$

In a case where a focal length of the first positive lens is denoted by fp1, the observation optical system of the above aspect preferably satisfies Conditional Expression (5) represented by $$0 < f/fp1 < 1.8 \tag{5}$$

In a case where a focal length of the first negative lens is denoted by fn1, the observation optical system of the above aspect preferably satisfies Conditional Expression (6) represented by $$-1.4 < f/fn1 < -0.3 \tag{6}$$

In a case where a focal length of the second positive lens is denoted by fp2, the observation optical system of the above aspect preferably satisfies Conditional Expression (7) represented by $$0 < f/fp2 < 0.9 \tag{7}$$

In a case where a focal length of the first positive lens is denoted by fp1, the observation optical system of the above aspect preferably satisfies Conditional Expression (8) represented by $$0 < H/fp1 < 0.9 \tag{8}$$

In a case where a focal length of the first negative lens is denoted by fn1, the observation optical system of the above aspect preferably satisfies Conditional Expression (9) represented by $$-0.6 < H/fn1 < -0.2 \tag{9}$$

In a case where a focal length of the second positive lens is denoted by fp2, the observation optical system of the above aspect preferably satisfies Conditional Expression (10) represented by $$0 < H/fp2 < 0.4 \tag{10}$$

In a case where an Abbe number of the first negative lens based on the d line is denoted by vn1, the observation optical system of the above aspect preferably satisfies Conditional Expression (11) represented by $$19 < vn1 < 27 \tag{11}$$

In a case where a refractive index of a lens having strongest positive refractive power among the lenses included in the eyepiece lens with respect to the d line is denoted by Nps, the observation optical system of the above aspect preferably satisfies Conditional Expression (12) represented by $$1.6 < Nps < 2 \tag{12}$$

In a case where an Abbe number of a lens having strongest positive refractive power among the lenses included in the eyepiece lens based on the d line is denoted by vps, the observation optical system of the above aspect preferably satisfies Conditional Expression (13) represented by $$35 < vps < 55 \tag{13}$$

In a case where an average value of refractive indexes of all lenses included in the eyepiece lens with respect to the d line is denoted by Nave, the observation optical system of the above aspect preferably satisfies Conditional Expression (14) represented by $$1.55 < Nave < 1.75 \tag{14}$$

In a case where a focal length of a lens of the eyepiece lens closest to the eyepoint side is denoted by fe, the observation optical system of the above aspect preferably satisfies Conditional Expression (15) represented by $$0 < f/|fe| < 0.9 \tag{15}$$

In a case where a paraxial curvature radius of a surface, on the display element side, of a lens of the eyepiece lens closest to the eyepoint side is denoted by Ref, and a paraxial curvature radius of a surface, on the eyepoint side, of the lens of the eyepiece lens closest to the eyepoint side is denoted by Rer, the observation optical system of the above aspect preferably satisfies Conditional Expression (16) represented by $$0 < |(Rer-Ref)/(Rer+Ref)| < 3 \tag{16}$$

In a case where an air interval on the optical axis between a lens of the eyepiece lens closest to the eyepoint side and a second lens of the eyepiece lens from the eyepoint side in a state where the diopter is −1 diopter is denoted by dE, the observation optical system of the above aspect preferably satisfies Conditional Expression (17) represented by $$0.002 < dE/TLA < 0.07 \tag{17}$$

In a case where a focal length of a lens of the eyepiece lens closest to the display element side is denoted by fo, the observation optical system of the above aspect preferably satisfies Conditional Expression (18) represented by $$0.01 < f/|fo| < 1.8 \tag{18}$$

In a case where a paraxial curvature radius of a surface, on the display element side, of a lens of the eyepiece lens closest to the display element side is denoted by Rof, and a paraxial curvature radius of a surface, on the eyepoint side, of the lens of the eyepiece lens closest to the display element side is denoted by Ror, the observation optical system of the above aspect preferably satisfies Conditional Expression (19) represented by $$0 < |(Ror-Rof)/(Ror+Rof)| < 10 \tag{19}$$

In a case where an air interval on the optical axis between a lens of the eyepiece lens closest to the display element side and a second lens of the eyepiece lens from the display element side is denoted by dO, the observation optical system of the above aspect preferably satisfies Conditional Expression (20) represented by $$0 < dO/TLA < 0.1 \tag{20}$$

An optical apparatus according to another aspect of the present disclosure comprises the observation optical system of the above aspect.

In the present specification, "consist of" or "consisting of" is intended to mean that a lens that substantially does not have refractive power, an optical element other than a lens, such as a stop, a filter, and a cover glass, a lens flange, a lens barrel, and the like may be included in addition to the illustrated constituents.

In the present specification, a "lens having positive refractive power" and a "positive lens" have the same meaning. A "lens having negative refractive power" and a "negative lens" have the same meaning. A "single lens" means one non-cemented lens. A compound aspherical lens (a lens that is composed of a spherical lens and of a film of an aspherical shape formed on the spherical lens as a single body and that functions as one aspherical lens as a whole) is not regarded as a cemented lens and is treated as one lens. A sign of refractive power, a curvature radius, and a surface shape related to a lens including an aspherical surface in a paraxial region are used unless otherwise specified. For a sign of the curvature radius, the sign of the curvature radius of a surface having a convex shape facing toward the display element side is positive, and the sign of the curvature radius of a surface having a convex shape facing toward the eyepoint side is negative.

The "focal length" used in the conditional expressions is a paraxial focal length. The values used in the conditional expressions are values based on the d line. The "distance on the optical axis" used in the conditional expressions is a geometrical distance on the optical axis unless otherwise specified. In the present specification, "d line", "C line", and "F line" are bright lines. A wavelength of the d line is 587.56 nanometers (nm). A wavelength of the C line is 656.27 nanometers (nm). A wavelength of the F line is 486.13 nanometers (nm).

According to the present disclosure, an observation optical system that enables observation with a wide apparent field of view while having favorable performance, and an optical apparatus comprising the observation optical system can be provided.

DESCRIPTION OF EMBODIMENTS

Hereinafter, an embodiment of the present disclosure will be described with reference to the drawings.

Figure 1:
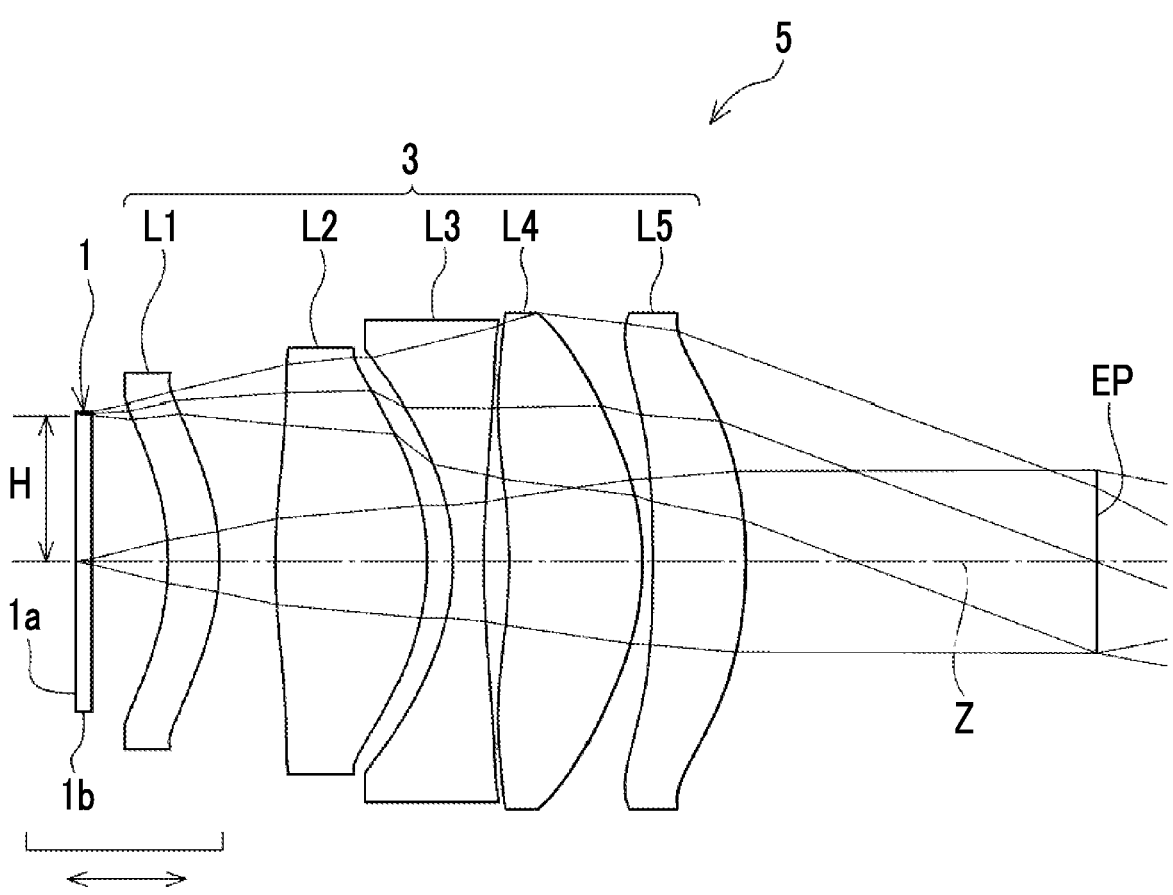
FIG. 1 is a cross-sectional view that corresponds to an observation optical system of Example 1 and that illustrates a configuration and luminous flux of an observation optical system according to one embodiment.

FIG. 1 illustrates a cross-sectional view of a configuration and luminous flux of an observation optical system 5 according to one embodiment of the present disclosure. The example illustrated in FIG. 1 corresponds to Example 1 described later. In FIG. 1, on-axis luminous flux and off-axis luminous flux corresponding to a maximum apparent field of view are illustrated as the luminous flux. In FIG. 1, a left side is illustrated as a display element side, and a right side is illustrated as an eyepoint side. An eyepoint EP in FIG. 1 does not illustrate a shape and illustrates a position in an optical axis direction.

The observation optical system 5 comprises a display element 1, and an eyepiece lens 3 disposed on the eyepoint side with respect to the display element 1. The display element 1 is an element that displays an image. The display element 1 includes a display region 1a in which the image is displayed, and a cover member 1b consisting of an optical member not having refractive power. In the example in FIG. 1, the display region 1a is positioned on a surface of the cover member 1b on the display element side. For example, the display element 1 can be configured as an image display panel consisting of a liquid crystal display device or of an organic electroluminescence (EL) display element. The display element 1 and the eyepiece lens 3 are arranged at a predetermined air interval.

The display element 1 is an example of an observed object. The eyepiece lens 3 is used for observing the image displayed in the display region 1a of the display element 1. That is, the observation optical system 5 is configured to observe the image displayed on the display element 1 through the eyepiece lens 3.

The eyepiece lens 3 includes a first positive lens, a first negative lens, and a second positive lens. The first negative lens is a lens having the strongest negative refractive power among the lenses included in the eyepiece lens 3. The first positive lens is a positive lens disposed adjacent to the display element side of the first negative lens. The second positive lens is a positive lens that is disposed closest to the display element side among positive lenses disposed on the eyepoint side with respect to the first negative lens. Such a configuration of including a positive lens, a negative lens, and a positive lens in order from the display element side to the eyepoint side is advantageous for securing a wide apparent field of view while favorably correcting a chromatic aberration and suppressing an increase in a diameter of the optical system.

As an example, the eyepiece lens 3 in FIG. 1 consists of a lens L1 having positive refractive power, a lens L2 having positive refractive power, a lens L3 having negative refractive power, a lens L4 having positive refractive power, and a lens L5 having positive refractive power in order from the display element side to the eyepoint side. In the example in FIG. 1, the lens L3 corresponds to the first negative lens, the lens L2 corresponds to the first positive lens, and the lens L4 corresponds to the second positive lens.

The number of lenses included in the eyepiece lens 3 is configured to be greater than or equal to five. The configuration of five or more lenses makes it easy to secure a wide apparent field of view while favorably correcting a lateral chromatic aberration, an astigmatism, a distortion, and the like.

The number of lenses included in the eyepiece lens 3 may be configured to be five or six. In this case, it is easy to secure a wide apparent field of view while reducing the number of lenses of the configuration as much as possible and favorably correcting the lateral chromatic aberration, the astigmatism, the distortion, and the like.

Next, preferable configurations and available configurations related to conditional expressions of the observation optical system 5 will be described. In the following description related to the conditional expressions, duplicate description of symbols will be partially omitted by using the same symbol for the same definition in order to avoid redundant description.

In a case where a half value of a longest diameter of the display region 1a in the display element 1 is denoted by H, and a focal length of the eyepiece lens 3 in a state where diopter is −1 diopter is denoted by f, the observation optical system 5 preferably satisfies Conditional Expression (1) below. Causing a corresponding value of Conditional Expression (1) not to be less than or equal to a lower limit thereof can suppress weak refractive power of the eyepiece lens 3 and thus is advantageous for securing a wide apparent field of view. Causing the corresponding value of Conditional Expression (1) not to be greater than or equal to an upper limit thereof is advantageous for suppressing aberrations such as a field curvature while achieving size reduction in a diameter direction and in the optical axis direction. In order to obtain more favorable characteristics, the observation optical system 5 more preferably satisfies Conditional Expression (1-1) below and still more preferably satisfies Conditional Expression (1-2) below.

$$0.355 < H/f < 0.48 \tag{1}$$

$$0.36 < H/f < 0.475 \tag{1-1}$$

$$0.365 < H/f < 0.47 \tag{1-2}$$

In the present specification, the "longest diameter of the display region 1a in the display element 1" related to H means a value of twice a distance between an optical axis Z and a point most separated from the optical axis Z in the diameter direction in the display region 1a that coincides with the optical axis Z at a centroid thereof. For example, in a case where the display region 1a has a rectangular shape, H can be a length of a half of a diagonal of the display region 1a. In addition, for example, in a case where the display region 1a is a perfect circle, H can be a radius of the display region 1a. In a case where the display region 1a is an ellipse, H can be a half of the longest diameter (major axis) among diameters of the display region 1a.

In addition, the display region 1a means a region in which the image is actually displayed. For example, in a case where the display element 1 comprises a display portion of an aspect ratio of 4:3 in which a plurality of pixels are disposed, and an image of an aspect ratio of 3:2 is displayed in a part of the display portion, the display region 1a refers to a region in which the image of the aspect ratio of 3:2 is displayed. Accordingly, a diameter of the display element 1 does not necessarily coincide with the longest diameter of the display region 1a.

The observation optical system 5 preferably satisfies Conditional Expression (2) below. Here, a sum of an air conversion distance on the optical axis from a display surface of the display element 1 to a lens surface of the eyepiece lens 3 closest to the display element side and a distance on the optical axis from the lens surface of the eyepiece lens 3 closest to the display element side to a lens surface of the eyepiece lens 3 closest to the eyepoint side in a state where the diopter is −1 diopter is denoted by TLA. Causing a corresponding value of Conditional Expression (2) not to be less than or equal to a lower limit thereof is advantageous for reducing the total length of the observation optical system 5. Causing the corresponding value of Conditional Expression (2) not to be greater than or equal to an upper limit thereof is advantageous for suppressing the aberrations such as the field curvature. In order to obtain more favorable characteristics, the observation optical system 5 more preferably satisfies Conditional Expression (2-1) below and still more preferably satisfies Conditional Expression (2-2) below.

$$0.17 < H/TLA < 0.285 \tag{2}$$

$$0.175 < H/TLA < 0.28 \tag{2-1}$$

$$0.18 < H/TLA < 0.275 \tag{2-2}$$

In a case where a refractive index of the first negative lens with respect to a d line is denoted by Nn1, the observation optical system 5 preferably satisfies Conditional Expression (3) below. Causing a corresponding value of Conditional Expression (3) not to be less than or equal to a lower limit thereof can suppress weak refractive power of the first negative lens and thus is advantageous for reducing the total length of the observation optical system 5 in the optical axis direction in a case of securing a wide apparent field of view. Causing the corresponding value of Conditional Expression (3) not to be greater than or equal to an upper limit thereof prevents the first negative lens from having excessively strong refractive power and thus can suppress excessive correction of the lateral chromatic aberration. In order to obtain more favorable characteristics, the observation optical system 5 more preferably satisfies Conditional Expression (3-1) below and still more preferably satisfies Conditional Expression (3-2) below.

$$1.5 < Nn1 < 1.7 \tag{3}$$

$$1.51 < Nn1 < 1.69 \tag{3-1}$$

$$1.52 < Nn1 < 1.68 \tag{3-2}$$

The observation optical system 5 preferably satisfies Conditional Expressions (1), (2), and (3). The observation optical system 5 more preferably satisfies Conditional Expressions (1), (2), and (3) and then at least one of Conditional Expression (1-1), (1-2), (2-1), (2-2), (3-1) or (3-2).

In a case where a paraxial curvature radius of a surface of the first positive lens on the eyepoint side is denoted by Rpr, and a paraxial curvature radius of a surface of the first negative lens on the display element side is denoted by Rnf, the observation optical system 5 preferably satisfies Conditional Expression (4) below. Causing a corresponding value of Conditional Expression (4) not to be less than or equal to a lower limit thereof can suppress excessively strong refraction of an off-axis ray on the surface of the first negative lens on the display element side with respect to refraction of the off-axis ray on the surface of the first positive lens on the eyepoint side and thus is advantageous for suppressing excessive correction of the lateral chromatic aberration. Causing the corresponding value of Conditional Expression (4) not to be greater than or equal to an upper limit thereof can suppress weak refraction of the off-axis ray on the surface of the first negative lens on the display element side with respect to refraction of the off-axis ray on the surface of the first positive lens on the eyepoint side and thus can suppress insufficient correction of the lateral chromatic aberration. In order to obtain more favorable characteristics, the observation optical system 5 more preferably satisfies Conditional Expression (4-1) below and still more preferably satisfies Conditional Expression (4-2) below.

$$0 < |(Rnf-Rpr)/(Rnf+Rpr)| < 0.6 \tag{4}$$

$$0.001 < |(Rnf-Rpr)/(Rnf+Rpr)| < 0.58 \tag{4-1}$$

$$0.002 < |(Rnf-Rpr)/(Rnf+Rpr)| < 0.55 \tag{4-2}$$

In a case where a focal length of the first positive lens is denoted by fp1, the observation optical system 5 preferably satisfies Conditional Expression (5) below. Causing a corresponding value of Conditional Expression (5) not to be less than or equal to a lower limit thereof can suppress weak positive refractive power of the first positive lens and thus is advantageous for suppressing the astigmatism and the field curvature. Causing the corresponding value of Conditional Expression (5) not to be greater than or equal to an upper limit thereof can suppress weak refractive power of the eyepiece lens 3 and thus is advantageous for securing a wide apparent field of view. In order to obtain more favorable characteristics, the observation optical system 5 more preferably satisfies Conditional Expression (5-1) below and still more preferably satisfies Conditional Expression (5-2) below.

$$0 < f/fp1 < 1.8 \tag{5}$$

$$0.05 < f/fp1 < 1.78 \tag{5-1}$$

$$0.1 < f/fp1 < 1.76 \tag{5-2}$$

In a case where a focal length of the first negative lens is denoted by fn1, the observation optical system 5 preferably satisfies Conditional Expression (6) below. Causing a corresponding value of Conditional Expression (6) not to be less than or equal to a lower limit thereof prevents the first negative lens from having excessively strong refractive power and thus can suppress excessive correction of the lateral chromatic aberration. Causing the corresponding value of Conditional Expression (6) not to be greater than or equal to an upper limit thereof can prevent the first negative lens from having excessively weak refractive power and thus is advantageous for reducing the total length of the observation optical system 5 in the optical axis direction in a case of securing a wide apparent field of view. In order to obtain more favorable characteristics, the observation optical system 5 more preferably satisfies Conditional Expression (6-1) below and still more preferably satisfies Conditional Expression (6-2) below.

$$-1.4 < f/fn1 < -0.3 \tag{6}$$

$$-1.38 < f/fn1 < -0.4 \tag{6-1}$$

$$-1.35 < f/fn1 < -0.5 \tag{6-2}$$

In a case where a focal length of the second positive lens is denoted by fp2, the observation optical system 5 preferably satisfies Conditional Expression (7) below. Causing a corresponding value of Conditional Expression (7) not to be less than or equal to a lower limit thereof can suppress weak positive refractive power of the second positive lens and thus is advantageous for suppressing the astigmatism and a spherical aberration. Causing the corresponding value of Conditional Expression (7) not to be greater than or equal to an upper limit thereof can suppress weak refractive power of the eyepiece lens 3 and thus is advantageous for securing a wide apparent field of view. In order to obtain more favorable characteristics, the observation optical system 5 more preferably satisfies Conditional Expression (7-1) below and still more preferably satisfies Conditional Expression (7-2) below.

$$0 < f/fp2 < 0.9 \tag{7}$$

$$0.15 < f/fp2 < 0.85 \tag{7-1}$$

$$0.2 < f/fp2 < 0.8 \tag{7-2}$$

In a case where the focal length of the first positive lens is denoted by fp1, the observation optical system 5 preferably satisfies Conditional Expression (8) below. Since H>0 and fp1>0 are established, a lower limit of Conditional Expression (8) is H/fp1>0. Causing a corresponding value of Conditional Expression (8) not to be greater than or equal to an upper limit thereof prevents the first positive lens from having excessively strong refractive power and thus can suppress excessive correction of the astigmatism and of the field curvature. The observation optical system 5 more preferably satisfies Conditional Expression (8-1) below. Causing a corresponding value of Conditional Expression (8-1) not to be less than or equal to a lower limit thereof prevents the off-axis ray emitted from the display surface of the display element 1 from having an excessively low height from the optical axis Z and thus is advantageous for securing a wide apparent field of view. In order to obtain more favorable characteristics, the observation optical system 5 more preferably satisfies Conditional Expression (8-2) below.

$$0 < H/fp1 < 0.9 \tag{8}$$

$$0.02 < H/fp1 < 0.8 \tag{8-1}$$

$$0.04 < H/fp1 < 0.75 \tag{8-2}$$

The observation optical system 5 preferably satisfies Conditional Expression (9) below. Causing a corresponding value of Conditional Expression (9) not to be less than or equal to a lower limit thereof prevents the off-axis ray emitted from the display surface of the display element 1 from having an excessively high height from the optical axis Z and thus is advantageous for size reduction of a lens adjacent to the display surface. Alternatively, causing the corresponding value of Conditional Expression (9) not to be less than or equal to the lower limit thereof prevents the first negative lens from having excessively strong refractive power and thus can suppress excessive correction of the lateral chromatic aberration. Causing the corresponding value of Conditional Expression (9) not to be greater than or equal to an upper limit thereof can prevent the first negative lens from having excessively weak refractive power and thus is advantageous for reducing the total length of the observation optical system 5 in the optical axis direction in a case of securing a wide apparent field of view. In order to obtain more favorable characteristics, the observation optical system 5 more preferably satisfies Conditional Expression (9-1) below and still more preferably satisfies Conditional Expression (9-2) below.

$$-0.6 < H/fn1 < -0.2 \tag{9}$$

$$-0.55 < H/fn1 < -0.25 \tag{9-1}$$

$$-0.5 < H/fn1 < -0.3 \tag{9-2}$$

The observation optical system 5 preferably satisfies Conditional Expression (10) below. Since H>0 and fp2>0 are established, a lower limit of Conditional Expression (10) is H/fp2>0. Causing a corresponding value of Conditional Expression (10) not to be greater than or equal to an upper limit thereof prevents the second positive lens from having excessively strong refractive power and thus can suppress excessive correction of the astigmatism and of the spherical aberration. The observation optical system 5 more preferably satisfies Conditional Expression (10-1) below. Causing a corresponding value of Conditional Expression (10-1) not to be less than or equal to a lower limit thereof prevents the off-axis ray emitted from the display surface of the display element 1 from having an excessively low height from the optical axis Z and thus is advantageous for securing a wide apparent field of view. In order to obtain more favorable characteristics, the observation optical system 5 more preferably satisfies Conditional Expression (10-2) below.

$$0 < H/fp2 < 0.4 \tag{10}$$

$$0.02 < H/fp2 < 0.35 \tag{10-1}$$

$$0.04 < H/fp2 < 0.3 \tag{10-2}$$

In a case where an Abbe number of the first negative lens based on the d line is denoted by vn1, the observation optical system 5 preferably satisfies Conditional Expression (11) below. Causing a corresponding value of Conditional Expression (11) not to be less than or equal to a lower limit thereof prevents the first negative lens from having excessively high dispersibility of color and thus can suppress excessive correction of the lateral chromatic aberration. Causing the corresponding value of Conditional Expression (11) not to be greater than or equal to an upper limit thereof prevents the first negative lens from having excessively low dispersibility of color and thus is advantageous for correcting the lateral chromatic aberration. In order to obtain more favorable characteristics, the observation optical system 5 more preferably satisfies Conditional Expression (11-1) below and still more preferably satisfies Conditional Expression (11-2) below.

$$19 < vn1 < 27 \tag{11}$$

$$20 < vn1 < 26 \tag{11-1}$$

$$21 < vn1 < 25 \tag{11-2}$$

In a case where a refractive index of a lens having the strongest positive refractive power among the lenses included in the eyepiece lens 3 with respect to the d line is denoted by Nps, the observation optical system 5 preferably satisfies Conditional Expression (12) below. Causing a corresponding value of Conditional Expression (12) not to be less than or equal to a lower limit thereof can suppress excessively weak refractive power of the lens having the strongest positive refractive power and thus is advantageous for reducing the total length of the observation optical system 5 in the optical axis direction. Causing the corresponding value of Conditional Expression (12) not to be greater than or equal to an upper limit thereof can suppress the chromatic aberration occurring in the lens having the strongest positive refractive power and thus is particularly advantageous for correcting the lateral chromatic aberration. In order to obtain more favorable characteristics, the observation optical system 5 more preferably satisfies Conditional Expression (12-1) below and still more preferably satisfies Conditional Expression (12-2) below.

$$1.6 < Nps < 2 \tag{12}$$

$$1.65 < Nps < 1.95 \tag{12-1}$$

$$1.7 < Nps < 1.9 \tag{12-2}$$

In a case where an Abbe number of the lens having the strongest positive refractive power among the lenses included in the eyepiece lens 3 based on the d line is denoted by vps, the observation optical system 5 preferably satisfies Conditional Expression (13) below. Causing a corresponding value of Conditional Expression (13) not to be less than or equal to a lower limit thereof can suppress dispersion of color occurring in the lens having the strongest positive refractive power and thus is particularly advantageous for correcting the lateral chromatic aberration. Causing the corresponding value of Conditional Expression (13) not to be greater than or equal to an upper limit thereof can suppress an excessively low refractive index of the lens having the strongest positive refractive power and thus prevents the lens from having excessively weak refractive power. Accordingly, this is advantageous for reducing the total length of the observation optical system 5 in the optical axis direction. In order to obtain more favorable characteristics, the observation optical system 5 more preferably satisfies Conditional Expression (13-1) below and still more preferably satisfies Conditional Expression (13-2) below.

$$35 < vps < 55 \tag{13}$$

$$38 < vps < 54 \tag{13-1}$$

$$40 < vps < 53 \tag{13-2}$$

In a case where an average value of refractive indexes of all lenses included in the eyepiece lens 3 with respect to the d line is denoted by Nave, the observation optical system 5 preferably satisfies Conditional Expression (14) below. Causing a corresponding value of Conditional Expression (14) not to be less than or equal to a lower limit thereof can suppress a large Petzval sum and thus is advantageous for correcting the field curvature. Causing the corresponding value of Conditional Expression (14) not to be greater than or equal to an upper limit thereof can prevent materials selectable as a lens material from being limited to materials having a small Abbe number and thus is advantageous for correcting the chromatic aberration. In order to obtain more favorable characteristics, the observation optical system 5 more preferably satisfies Conditional Expression (14-1) below and still more preferably satisfies Conditional Expression (14-2) below.

$$1.55 < Nave < 1.75 \tag{14}$$

$$1.56 < Nave < 1.7 \tag{14-1}$$

$$1.57 < Nave < 1.68 \tag{14-2}$$

In a case where a focal length of a lens of the eyepiece lens 3 closest to the eyepoint side is denoted by fe, the observation optical system 5 preferably satisfies Conditional Expression (15) below. Since f>0 and |fe|>0 are established, a lower limit of Conditional Expression (15) is f/|fe|>0. Causing a corresponding value of Conditional Expression (15) not to be greater than or equal to an upper limit thereof can suppress weak refractive power of the eyepiece lens 3 and thus is advantageous for securing a wide apparent field of view. The observation optical system 5 more preferably satisfies Conditional Expression (15-1) below. Causing a corresponding value of Conditional Expression (15-1) not to be less than or equal to a lower limit thereof can suppress weak refractive power of the lens of the eyepiece lens 3 closest to the eyepoint side and thus is advantageous for suppressing the astigmatism and the spherical aberration. In order to obtain more favorable characteristics, the observation optical system 5 more preferably satisfies Conditional Expression (15-2) below.

$$0 < f/|fe| < 0.9 \tag{15}$$

$$0.001 < f/|fe| < 0.85 \tag{15-1}$$

$$0.004 < f/|fe| < 0-8 \tag{15-2}$$

In a case where a paraxial curvature radius of a surface, on the display element side, of the lens of the eyepiece lens 3 closest to the eyepoint side is denoted by Ref, and a paraxial curvature radius of a surface, on the eyepoint side, of the lens of the eyepiece lens 3 closest to the eyepoint side is denoted by Rer, the observation optical system 5 preferably satisfies Conditional Expression (16). Causing a corresponding value of Conditional Expression (16) not to be less than or equal to a lower limit thereof prevents excessively strong refraction of the off-axis ray on the lens closest to the eyepoint side and thus can suppress excessive correction of the field curvature. Causing the corresponding value of Conditional Expression (16) not to be greater than or equal to an upper limit thereof can suppress weak refraction of the off-axis ray on the lens closest to the eyepoint side and thus is advantageous for correcting the field curvature. In order to obtain more favorable characteristics, the observation optical system 5 more preferably satisfies Conditional Expression (16-1) below and still more preferably satisfies Conditional Expression (16-2) below.

$$0<|(Rer-Ref)/(Rer+Ref)|<3 \qquad (16)$$

$$0.1<|(Rer-Ref)/(Rer+Ref)|<2.8 \qquad (16\text{-}1)$$

$$0.14<|(Rer-Ref)/(Rer+Ref)|<2.7 \qquad (16\text{-}2)$$

In a case where an air interval on the optical axis between the lens of the eyepiece lens 3 closest to the eyepoint side and the second lens of the eyepiece lens 3 from the eyepoint side in a state where the diopter is −1 diopter is denoted by dE, the observation optical system 5 preferably satisfies Conditional Expression (17) below. Causing a corresponding value of Conditional Expression (17) not to be less than or equal to a lower limit thereof is advantageous for securing a movable range during diopter adjustment. Causing the corresponding value of Conditional Expression (17) not to be greater than or equal to an upper limit thereof is advantageous for reducing the total length of the observation optical system 5 in the optical axis direction. In order to obtain more favorable characteristics, the observation optical system 5 more preferably satisfies Conditional Expression (17-1) below and still more preferably satisfies Conditional Expression (17-2) below.

$$0.002<dE/TLA<0.07 \qquad (17)$$

$$0.003<dE/TLA<0.068 \qquad (17\text{-}1)$$

$$0.004<dE/TLA<0.065 \qquad (17\text{-}2)$$

In a case where a focal length of a lens of the eyepiece lens 3 closest to the display element side is denoted by fo, the observation optical system 5 preferably satisfies Conditional Expression (18) below. Causing a corresponding value of Conditional Expression (18) not to be less than or equal to a lower limit thereof can suppress weak refractive power of the lens of the eyepiece lens 3 closest to the display element side and thus is advantageous for suppressing the astigmatism, the spherical aberration, and the field curvature. Causing the corresponding value of Conditional Expression (18) not to be greater than or equal to an upper limit thereof can suppress weak refractive power of the eyepiece lens 3 and thus is advantageous for securing a wide apparent field of view. In order to obtain more favorable characteristics, the observation optical system 5 more preferably satisfies Conditional Expression (18-1) below and still more preferably satisfies Conditional Expression (18-2) below.

$$0.01<f/|fo|<1.8 \qquad (18)$$

$$0.015<f/|fo|<1.75 \qquad (18\text{-}1)$$

$$0.02<f/|fo|<1.7 \qquad (18\text{-}2)$$

In a case where a paraxial curvature radius of a surface, on the display element side, of the lens of the eyepiece lens 3 closest to the display element side is denoted by Rof, and a paraxial curvature radius of a surface, on the eyepoint side, of the lens of the eyepiece lens 3 closest to the display element side is denoted by Ror, the observation optical system 5 preferably satisfies Conditional Expression (19) below. Causing a corresponding value of Conditional Expression (19) not to be less than or equal to a lower limit thereof prevents excessively strong refraction of the off-axis ray on the lens closest to the display element side and thus can suppress excessive correction of the field curvature. Causing the corresponding value of Conditional Expression

14

(19) not to be greater than or equal to an upper limit thereof can suppress weak refraction of the off-axis ray on the lens closest to the display element side and thus is advantageous for correcting the field curvature. In order to obtain more favorable characteristics, the observation optical system 5 more preferably satisfies Conditional Expression (19-1) below and still more preferably satisfies Conditional Expression (19-2) below.

$$0<|(Ror-Rof)/(Ror+Rof)|<10 \qquad (19)$$

$$0.005<|(Ror-Rof)/(Ror+Rof)|<9.9 \qquad (19\text{-}1)$$

$$0.01<|(Ror-Rof)/(Ror+Rof)|<9.8 \qquad (19\text{-}2)$$

In a case where an air interval on the optical axis between the lens of the eyepiece lens 3 closest to the display element side and the second lens of the eyepiece lens 3 from the display element side is denoted by dO, the observation optical system 5 preferably satisfies Conditional Expression (20) below. Causing a corresponding value of Conditional Expression (20) not to be less than or equal to a lower limit thereof is advantageous for securing a movable range during diopter adjustment. Causing the corresponding value of Conditional Expression (20) not to be greater than or equal to an upper limit thereof is advantageous for reducing the total length of the observation optical system 5 in the optical axis direction. In order to obtain more favorable characteristics, the observation optical system 5 more preferably satisfies Conditional Expression (20-1) below and still more preferably satisfies Conditional Expression (20-2) below.

$$0<dO/TLA<0.1 \qquad (20)$$

$$0.01<dO/TLA<0.095 \qquad (20\text{-}1)$$

$$0.02<dO/TLA<0.09 \qquad (20\text{-}2)$$

The eyepiece lens 3 may be configured to include three or four resin lenses. In this case, a degree of freedom in design is improved, and this is advantageous for reducing the total length of the observation optical system 5 in the optical axis direction while correcting the astigmatism and the field curvature.

The eyepiece lens 3 may be configured to include an aspherical lens. Including the aspherical lens is advantageous for favorable aberration correction.

All lenses included in the eyepiece lens 3 may be configured to be non-cemented single lenses. In this case, the degree of freedom in design can be increased compared to that in a case where cemented lenses are used. Thus, this is advantageous for correcting various aberrations and also for obtaining a wider apparent field of view.

The above preferable configurations and available configurations including the configurations related to the conditional expressions are available in any combination thereof and are preferably selectively employed as appropriate in accordance with required specifications. The conditional expressions preferably satisfied by the observation optical system 5 according to the embodiment of the present disclosure are not limited to the conditional expressions described in the form of an expression and include all conditional expressions obtained by any combination of lower limits and upper limits from the preferable, more preferable, and still more preferable conditional expressions.

As an example, one preferable aspect of the present disclosure is the observation optical system 5 comprising the display element 1, and the eyepiece lens 3 disposed on the eyepoint side with respect to the display element 1, in which the eyepiece lens 3 includes the first negative lens having the strongest negative refractive power among the lenses included in the eyepiece lens 3, the first positive lens disposed adjacent to the display element side of the first negative lens, and the second positive lens disposed closest to the display element side among the positive lenses disposed on the eyepoint side with respect to the first negative lens, the number of lenses included in the eyepiece lens 3 is greater than or equal to five, and Conditional Expressions (1), (2), and (3) are satisfied.

In an observation optical system for a viewfinder such as a digital camera, the number of pixels of the display element has recently been increased, and thus a wider apparent field of view and high resolution performance have been required. However, in a case of obtaining a wider apparent field of view, an amount of occurrence of various aberrations such as the field curvature and the lateral chromatic aberration is increased, and it is difficult to establish both of a wider apparent field of view and high resolution performance. Therefore, employing the one preferable aspect makes it easy to implement an observation optical system that enables observation with a wider apparent field of view while suppressing the field curvature, the lateral chromatic aberration, and the like.

Next, examples of the observation optical system 5 according to the embodiment of the present disclosure will be described with reference to the drawings. Reference numerals attached to constituents of a cross-sectional view of each example are independently used for each example in order to avoid complication of the description and of the drawings caused by an increase in the number of digits of the reference numerals. Accordingly, a common reference numeral attached in the drawings of different examples does not necessarily denote a common configuration.

Example 1

The configuration of the observation optical system 5 of Example 1 is illustrated in FIG. 1, and an illustration method and the configuration thereof are described above. Thus, duplicate description will be partially omitted here. The observation optical system 5 of Example 1 comprises the display element 1 and the eyepiece lens 3 in order from the display element side to the eyepoint side.

The eyepiece lens 3 consists of five lenses of the lens L1 to the lens L5 in order from the display element side to the eyepoint side. During the diopter adjustment, the display element 1 and the lens L1 move as a single body along the optical axis Z, and the other lenses are fixed. A bracket and a bidirectional arrow in a horizontal direction below the display element 1 and the lens L1 in FIG. 1 illustrate that the display element 1 and the lens L1 move as a single body along the optical axis Z during the diopter adjustment. In the present specification, "moving as a single body" means moving by the same amount in the same direction at the same time.

For the observation optical system 5 of Example 1, basic lens data is shown in Table 1, specifications and variable surface spacing are shown in Table 2, and aspherical coefficients are shown in Table 3.

Table 1 is described as follows. The Sn column shows a surface number of each surface in a case where a surface on which the display region 1a of the display element 1 is disposed is referred to as a first surface, and the number is increased by one at a time toward the eyepoint side. In the optical axis direction, a position of the first surface corresponds to a position of the display surface. The R column shows a curvature radius of each surface. The D column shows surface spacing between each surface and a surface adjacent to the eyepoint side thereof on the optical axis. The Nd column shows a refractive index of each constituent with respect to the d line. The vd column shows an Abbe number of each constituent based on the d line.

In Table 1, the display element 1 and the eyepoint EP are also described, and a surface number and a word (EP) are described in the field of Sn of a surface corresponding to the eyepoint EP. A*mark is attached to a surface number of an aspherical surface, and a numerical value of a paraxial curvature radius is described in the field of the curvature radius of the aspherical surface. In Table 1, a sign of a curvature radius of a surface having a convex shape facing toward the display element side is positive. A sign of a curvature radius of a surface having a convex shape facing toward the eyepoint side is negative. Variable surface spacing during the diopter adjustment is described in the D column by using a symbol DIN and by attaching a surface number on the display element side of the spacing to the inside of [ ].

Table 2 shows the focal length f of the eyepiece lens 3, the apparent field of view at a full angle of view in a diagonal direction, and the variable surface spacing at each diopter. In the field of the diopter, a unit diopter is described as "dpt". In the field of the apparent field of view, [°] indicates that a unit is degrees. In addition, Table 2 shows the half value H of the longest diameter of the display region 1a in the display element 1.

In Table 3, the Sn row shows the surface number of the aspherical surface. The KA and Am rows show numerical values of the aspherical coefficients for each aspherical surface. In the present example, m=4, 6, 8, 10, 12, 14, 16, 18, and 20 is established. In Table 3, "E±n" (n: integer) in the numerical values of the aspherical coefficients means "×10$^{\pm n}$". KA and Am are aspherical coefficients in an aspheric equation represented by the following equation.

$$Zd = C \times h^2/\{1 + (1 - KA \times C^2 \times h^2)^{1/2}\} + \Sigma Am \times h^m$$

where

Zd: a depth of the aspherical surface (a length of a perpendicular line drawn from a point on the aspherical surface at a height h down to a plane that is tangential to an aspherical surface apex and that is perpendicular to the optical axis Z)

h: a height (a distance from the optical axis Z to the lens surface)

C: a reciprocal of the paraxial curvature radius

KA and Am: aspherical coefficients

In the aspheric equation, Σ means a total sum related to m.

In the data of each table, while degrees are used as a unit of angle, and millimeters (mm) are used as a unit of length, the optical system can also be used by proportionally enlarging or proportionally reducing the optical system. Thus, other appropriate units can also be used. In addition, in each table shown below, numerical values rounded in a predetermined number of digits are described.

TABLE 1

| | | Example 1 | | |
|---|---|---|---|---|
| Sn | R | D | Nd | vd |
| 1 | ∞ | 0.7000 | 1.51900 | 64.90 |
| 2 | ∞ | 3.2543 | | |
| *3 | −11.8616 | 2.1916 | 1.72924 | 53.85 |
| *4 | −11.4174 | DD[4] | | |
| *5 | 24.7155 | 6.5000 | 1.76709 | 49.20 |

TABLE 1-continued

Example 1

| Sn | R | D | Nd | vd |
|---|---|---|---|---|
| *6 | −11.4539 | 1.1025 | | |
| *7 | −11.2675 | 1.3209 | 1.63351 | 23.63 |
| *8 | 40.4097 | 1.0923 | | |
| *9 | −21.3136 | 5.6547 | 1.53500 | 55.73 |
| *10 | −12.3534 | 0.4330 | | |
| *11 | −80.7989 | 3.9809 | 1.53500 | 55.73 |
| *12 | −19.5754 | 15.0000 | | |
| 13 (EP) | ∞ | | | |

5

TABLE 2

15

Example 1

| Diopter | −1 dpt | −4.5 dpt | 2.5 dpt |
|---|---|---|---|
| f | 16.20 | 16.20 | 16.20 |
| Apparent Field of View [°] | 41 | 43 | 40 |
| DD[4] | 2.39 | 3.84 | 0.94 |
| H | 6.43 | | |

20

TABLE 3

Example 1

| Sn | 3 | 4 | 5 | 6 |
|---|---|---|---|---|
| KA | 1.0000000E+00 | 1.0000000E+00 | 1.0000000E+00 | 1.0000000E+00 |
| A4 | 1.3170264E−04 | 4.3645851E−05 | −2.9598281E−04 | −4.1753666E−05 |
| A6 | −1.0991125E−05 | −2.1906686E−06 | 3.9790178E−07 | 5.9052290E−06 |
| A8 | 7.8713654E−07 | 4.0312965E−07 | 1.4311301E−07 | −1.0850504E−07 |
| A10 | −1.3822671E−08 | −8.6638422E−09 | −6.2926982E−09 | 8.0423783E−10 |
| A12 | −9.3274001E−11 | 2.5898485E−11 | 9.0000267E−11 | 9.3010032E−12 |
| A14 | 4.0261007E−12 | 8.9278466E−13 | 7.7730140E−13 | −7.0189913E−14 |
| A16 | −2.0972805E−14 | −3.3747072E−15 | −3.7520587E−14 | −1.9774768E−15 |
| A18 | 2.1743420E−16 | −8.2555780E−17 | 4.0286273E−16 | 2.0027193E−17 |
| A20 | −3.6405720E−18 | 6.8114663E−19 | −1.4636769E−18 | −1.2673493E−20 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −1.4562770E−04 | −1.1496351E−04 | 3.2529869E−04 | 2.9276778E−05 |
| A6 | 1.1487241E−05 | 5.8510881E−07 | −5.5894713E−07 | 2.9760547E−06 |
| A8 | −2.5840964E−07 | −3.4850902E−09 | −2.0595070E−09 | −1.7400977E−08 |
| A10 | 3.5347842E−09 | 1.5008651E−11 | −1.3537857E−11 | −1.0079600E−10 |
| A12 | −1.2300103E−11 | 1.7671763E−13 | −5.8848609E−13 | 7.7232623E−13 |
| A14 | −3.1618229E−13 | −2.9208240E−15 | 3.1864431E−15 | 4.1754968E−15 |
| A16 | 1.8689387E−15 | −2.0641989E−18 | 1.1464560E−17 | 5.6352530E−18 |
| A18 | 3.2879589E−17 | 3.5166199E−19 | 7.5724829E−20 | −5.5938319E−19 |
| A20 | −2.5998197E−19 | −1.5880777E−21 | −5.5494499E−22 | 2.2616558E−21 |

| Sn | 11 | 12 |
|---|---|---|
| KA | 1.0000000E+00 | 1.0000000E+00 |
| A4 | −2.0521453E−04 | −8.7628494E−05 |
| A6 | 1.7605141E−06 | −7.4334321E−07 |
| A8 | −1.8126938E−08 | 2.2291577E−08 |
| A10 | 2.0921664E−10 | −1.2461358E−10 |
| A12 | −1.5357929E−13 | −2.3556919E−14 |
| A14 | −6.4624589E−15 | 8.0167981E−15 |
| A16 | 3.1317888E−17 | −2.0191560E−17 |
| A18 | −1.0397878E−19 | −2.1667470E−19 |
| A20 | 3.4784934E−22 | 1.0933028E−21 |

Figure 2:
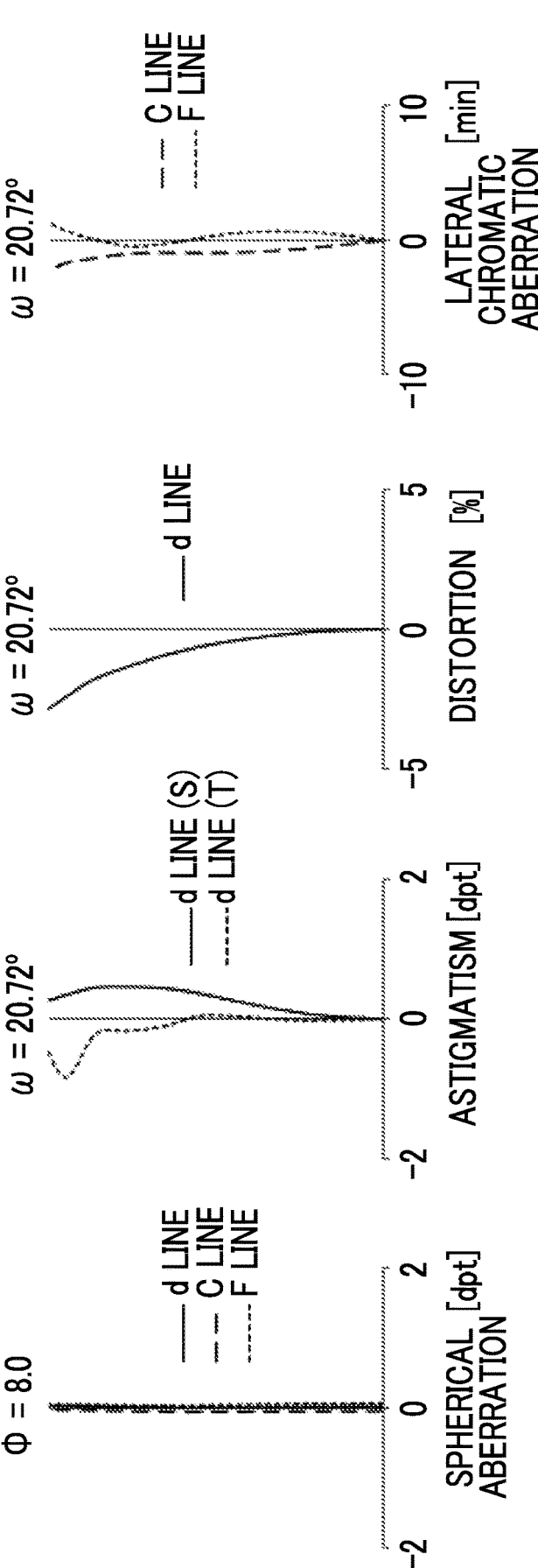
FIG. 2 illustrates various aberration diagrams of the observation optical system of Example 1.

FIG. 2 illustrates various aberration diagrams of the observation optical system 5 of Example 1 in a state where the diopter is –1.00 diopter. In FIG. 2, the spherical aberration, the astigmatism, the distortion, and the lateral chromatic aberration are illustrated in order from the left. In the spherical aberration diagram, aberrations on the d line, a C line, and an F line are illustrated by a solid line, a long broken line, and a short broken line, respectively. In the astigmatism diagram, the aberration on the d line in a sagittal direction is illustrated by a solid line, and the aberration on the d line in a tangential direction is illustrated by a short broken line. In the distortion diagram, the aberration on the d line is illustrated by a solid line. In the lateral chromatic aberration diagram, the aberrations on the C line and the F line are illustrated by a long broken line and a short broken line, respectively. The unit "dpt" on horizontal axes of the spherical aberration diagram and the astigmatism diagram denotes diopter. The unit "min" on a horizontal axis of the lateral chromatic aberration diagram denotes a minute of angle. In the spherical aberration diagram, a diameter of the eyepoint EP in units of millimeters (mm) is shown after "Φ=". In other aberration diagrams, a value of the apparent field of view at a half angle of view is shown after "ω=".

Symbols, meanings, description methods, and illustration methods of each of the data related to Example 1 are the same as those in the following examples unless otherwise specified. Thus, duplicate description will be omitted below.

Example 2

Figure 3:
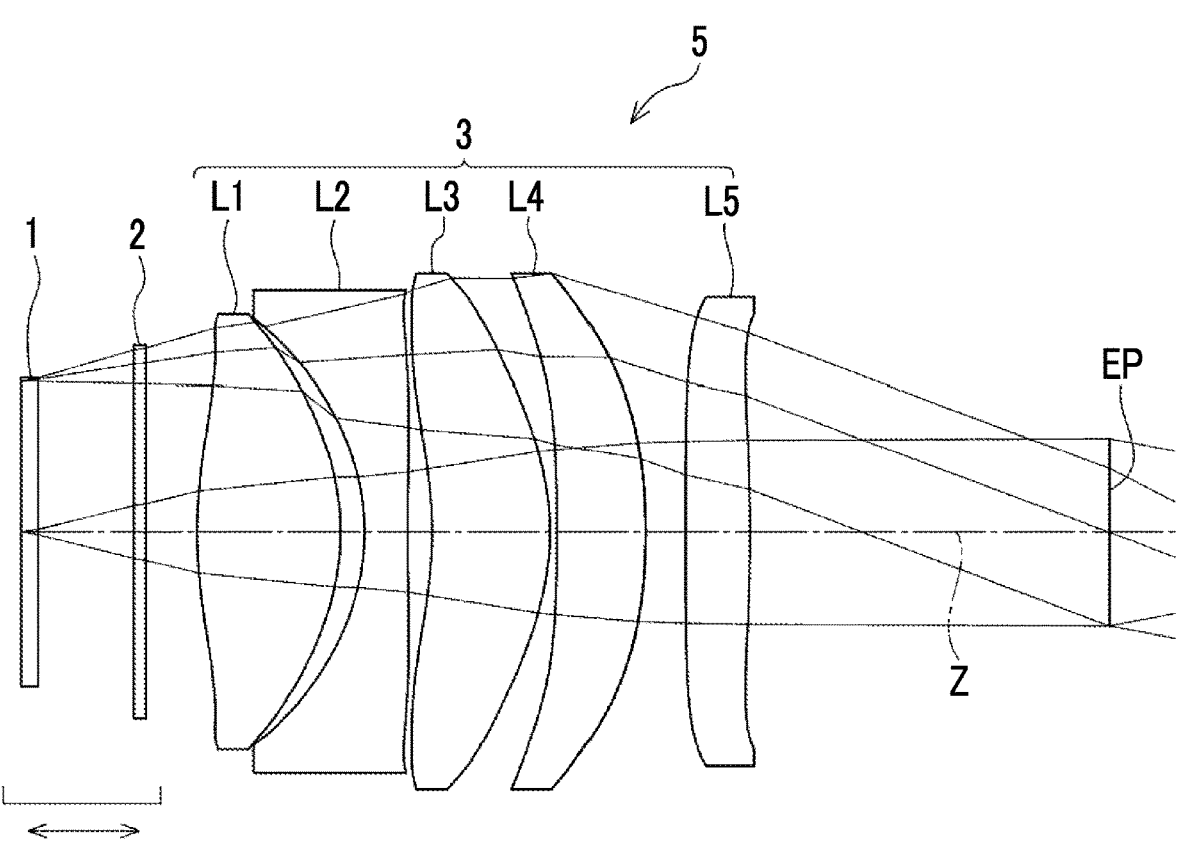
FIG. 3 is a cross-sectional view illustrating a configuration and luminous flux of an observation optical system of Example 2.

FIG. 3 illustrates a configuration and luminous flux of the observation optical system 5 of Example 2. The observation optical system 5 of Example 2 comprises the display element 1, the optical member 2, and the eyepiece lens 3 in order from the display element side to the eyepoint side. The optical member 2 is a member that has a shape of parallel flat plates and that does not have refractive power, and is assumed to be protective cover glass, various filters, or the like.

The eyepiece lens 3 consists of the lens L1 having positive refractive power, the lens L2 having negative refractive power, the lens L3 having positive refractive power, the lens L4 having positive refractive power, and the lens L5 having positive refractive power in order from the display element side to the eyepoint side. During the diopter adjustment, the display element 1 and the optical member 2 move as a single body along the optical axis Z.

Figure 4:
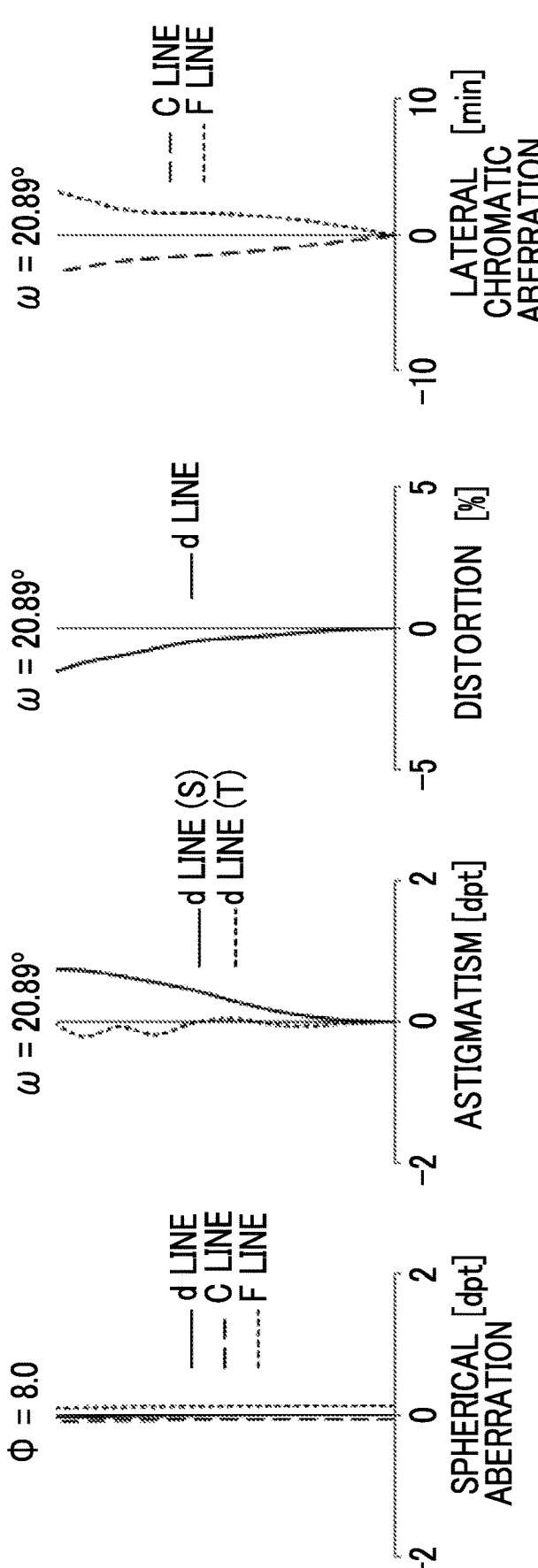
FIG. 4 illustrates various aberration diagrams of the observation optical system of Example 2.

For the observation optical system 5 of Example 2, basic lens data is shown in Table 4, specifications and variable surface spacing are shown in Table 5, aspherical coefficients are shown in Table 6, and various aberration diagrams in a state where the diopter is –0.97 diopter are illustrated in FIG. 4.

TABLE 4

| | | Example 2 | | |
|---|---|---|---|---|
| Sn | R | D | Nd | vd |
| 1 | ∞ | 0.7000 | 1.51900 | 64.90 |
| 2 | ∞ | 4.0000 | | |
| 3 | ∞ | 0.5000 | 1.51601 | 52.00 |
| 4 | ∞ | DD[4] | | |
| *5 | 21.0163 | 6.0006 | 1.77215 | 50.78 |
| *6 | –10.8992 | 1.0005 | | |
| *7 | –10.5202 | 1.8003 | 1.63351 | 23.63 |
| *8 | 106.6114 | 1.0231 | | |
| *9 | –17.0944 | 4.9055 | 1.53500 | 55.73 |
| *10 | –12.3603 | 0.3000 | | |
| *11 | –132.3415 | 3.6861 | 1.53500 | 55.73 |
| *12 | –24.5723 | 1.6685 | | |
| *13 | –1578.8057 | 2.6943 | 1.55068 | 63.05 |
| *14 | –63.7162 | 15.0000 | | |
| 15 (EP) | ∞ | | | |

TABLE 5

| | Example 2 | | |
|---|---|---|---|
| Diopter | –1 dpt | –4.5 dpt | 2.5 dpt |
| f | 16.24 | 16.24 | 16.24 |
| Apparent Field of View [°] | 42 | 43 | 40 |
| DD[4] | 2.15 | 3.31 | 0.98 |
| H | 6.43 | | |

TABLE 6

| | | Example 2 | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | –1.7184936E–04 | 1.2697482E–04 | –1.0480586E–04 | –1.2981717E–04 |
| A6 | –1.6509046E–06 | 3.0796684E–06 | 8.9202774E–06 | 6.0799958E–07 |
| A8 | 1.4067162E–07 | –9.1746551E–08 | –2.3886730E–07 | –2.8064918E–09 |
| A10 | –6.0985371E–09 | 6.9875483E–10 | 3.5860828E–09 | 2.2695233E–11 |
| A12 | 8.8988393E–11 | 9.4334738E–12 | –1.2325303E–11 | 2.4002160E–13 |
| A14 | 7.7126192E–13 | –7.6767173E–14 | –3.3746380E–13 | –2.5565315E–15 |
| A16 | –3.7789813E–14 | –1.9500123E–15 | 1.8569988E–15 | –7.0703865E–18 |
| A18 | 4.0356009E–16 | 2.1038826E–17 | 3.7377355E–17 | 3.2948821E–19 |
| A20 | –1.4278060E–18 | –2.5572365E–20 | –2.9434286E–19 | –1.1328495E–21 |

| | | | | |
|---|---|---|---|---|
| Sn | 9 | 10 | 11 | 12 |
| KA | 1.0000000E+00 | 1.0000000E+00 | 1.0000000E+00 | 1.0000000E+00 |
| A4 | 3.3953045E–04 | 4.9137113E–05 | –2.0067480E–04 | –9.5871849B–05 |
| A6 | –6.7276533E–07 | 2.9525435E–06 | 1.4411527E–06 | –1.3848131E–06 |
| A8 | –1.8265509E–09 | –1.7535581E–08 | –1.9958215E–08 | 2.4847285E–08 |
| A10 | –1.3609479E–11 | –9.1291846E–11 | 2.0754712E–10 | –1.3708240E–10 |
| A12 | –5.1999790E–13 | 7.0575920E–13 | –2.0060245E–13 | –1.7720107E–13 |
| A14 | 3.5408648E–15 | 4.2506641E–15 | –6.6891581E–15 | 7.4389021E–15 |

TABLE 6-continued

| | | Example 2 | | |
|---|---|---|---|---|
| A16 | 2.0059891E−17 | 4.0526212E−18 | 2.6180408E−17 | −2.0292436E−17 |
| A18 | 1.2898644E−20 | −5.0942372E−19 | −8.5778015E−20 | −2.2448188E−19 |
| A20 | −5.7269685E−22 | 2.1274558E−21 | 4.0267136E−22 | 1.0057180E−21 |

| Sn | 13 | 14 |
|---|---|---|
| KA | 1.0000000E+00 | 1.0000000E+00 |
| A4 | 5.9320839E−05 | 5.5456179E−05 |
| A6 | −1.0465336E−07 | 7.1977700E−07 |
| A8 | 7.0527061E−11 | −1.1067406E−08 |
| A10 | 1.3534002E−12 | 1.2200559E−10 |
| A12 | 2.8067867E−13 | −1.4819590E−12 |
| A14 | 1.2336458E−15 | 3.8664715E−14 |
| A16 | 6.5634108E−18 | −6.0217205E−16 |
| A18 | 2.0949745E−19 | 6.9899178E−18 |
| A20 | −3.2318438E−21 | −3.4003970E−20 |

Example 3

Figure 5:
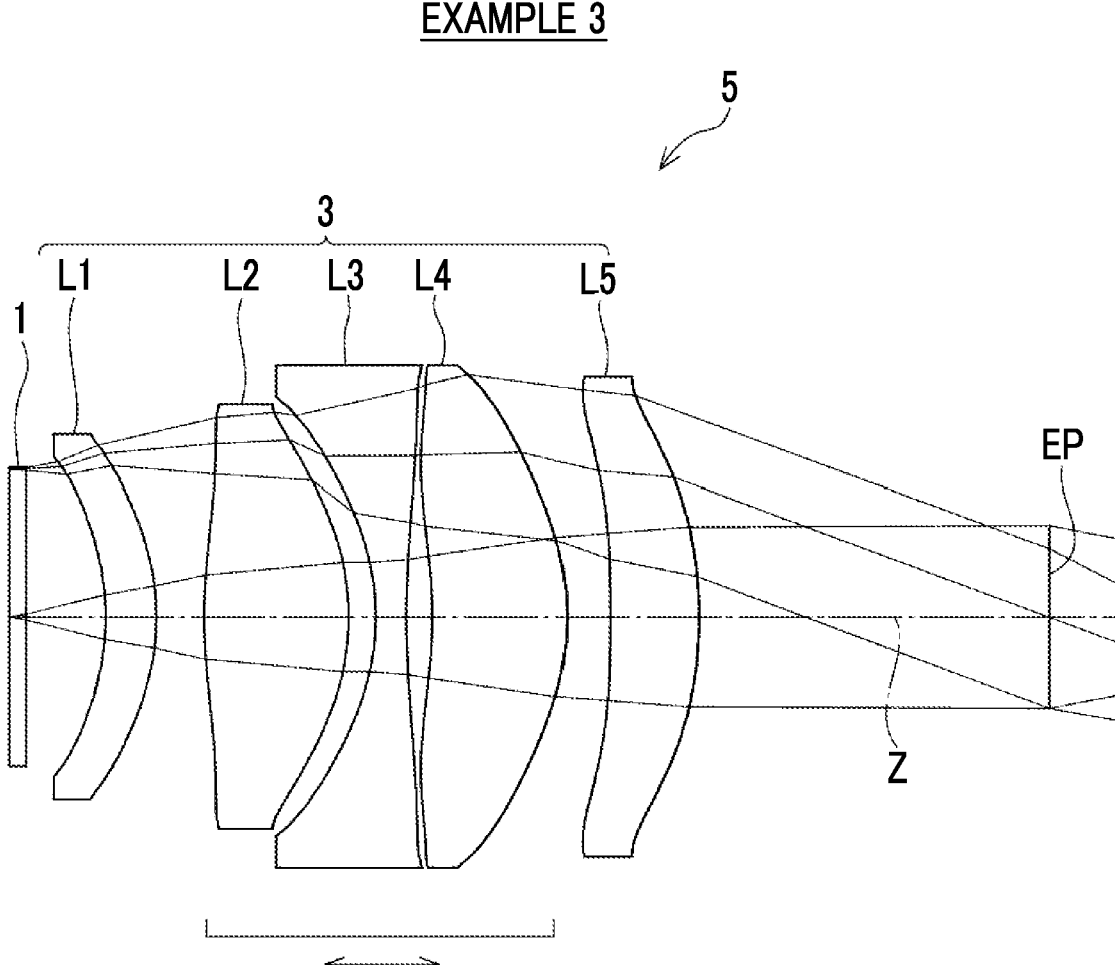
FIG. 5 is a cross-sectional view illustrating a configuration and luminous flux of an observation optical system of Example 3.

FIG. 5 illustrates a configuration and luminous flux of the observation optical system 5 of Example 3. The observation optical system 5 of Example 3 comprises the display element 1 and the eyepiece lens 3 in order from the display element side to the eyepoint side. The eyepiece lens 3 consists of the lens L1 having positive refractive power, the lens L2 having positive refractive power, the lens L3 having negative refractive power, the lens L4 having positive refractive power, and the lens L5 having positive refractive power in order from the display element side to the eyepoint side. During the diopter adjustment, the lens L2, the lens L3, and the lens L4 move as a single body along the optical axis Z.

Figure 6:
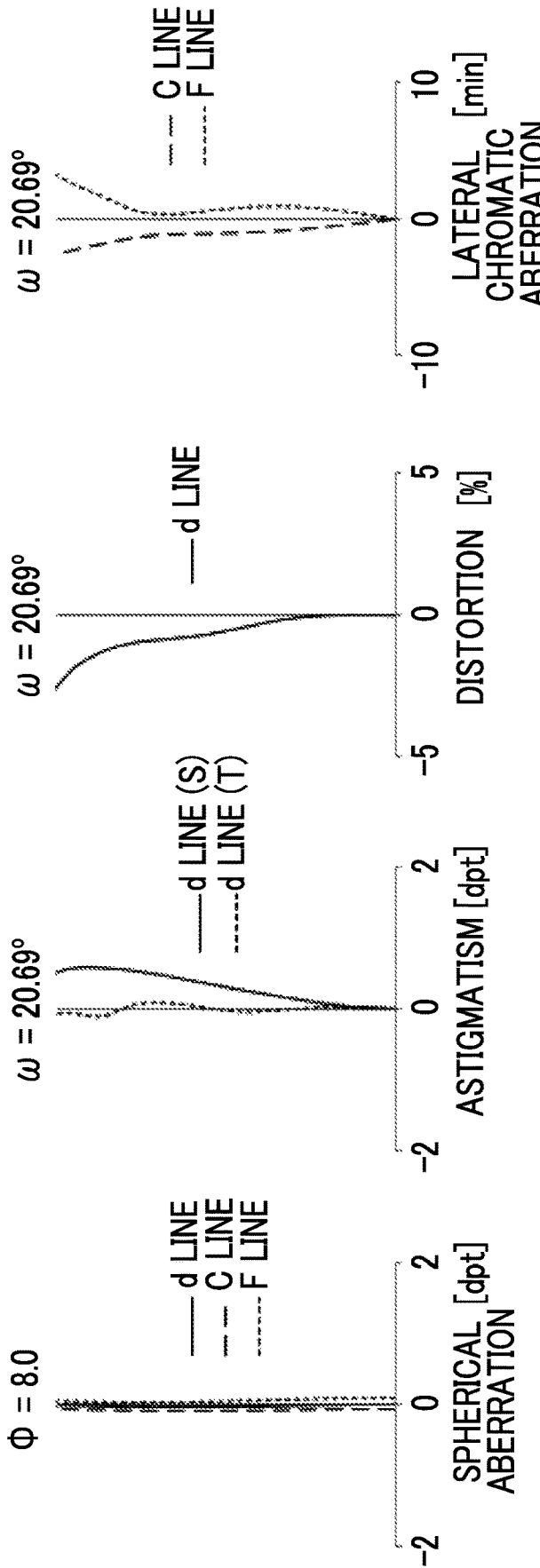
FIG. 6 illustrates various aberration diagrams of the observation optical system of Example 3.

For the observation optical system 5 of Example 3, basic lens data is shown in Table 7, specifications and variable surface spacing are shown in Table 8, aspherical coefficients are shown in Table 9, and various aberration diagrams in a state where the diopter is −0.96 diopter are illustrated in FIG. 6.

TABLE 7

| | | Example 3 | | |
|---|---|---|---|---|
| Sn | R | D | Nd | vd |
| 1 | ∞ | 0.7000 | 1.51900 | 64.90 |
| 2 | ∞ | 3.4166 | | |

TABLE 7-continued

| | | Example 3 | | |
|---|---|---|---|---|
| Sn | R | D | Nd | vd |
| *3 | −11.6615 | 2.1701 | 1.72924 | 53.85 |
| *4 | −11.2449 | DD[4] | | |
| *5 | 23.3338 | 6.1925 | 1.76709 | 49.20 |
| *6 | −11.4111 | 1.1564 | | |
| *7 | −11.3632 | 1.3124 | 1.63351 | 23.63 |
| *8 | 41.2214 | 1.1009 | | |
| *9 | −21.3394 | 5.7473 | 1.53500 | 55.73 |
| *10 | −12.3728 | DD[10] | | |
| *11 | −76.2464 | 3.7807 | 1.53500 | 55.73 |
| *12 | −19.8700 | 15.0000 | | |
| 13 (EP) | ∞ | | | |

TABLE 8

| | Example 3 | | |
|---|---|---|---|
| Diopter | −1 dpt | −4.5 dpt | 2.5 dpt |
| f | 16.20 | 16.20 | 16.20 |
| Apparent Field of View [°] | 41 | 38 | 45 |
| DD[4] | 2.04 | 0.33 | 3.76 |
| DD[10] | 1.85 | 3.56 | 0.13 |
| H | 6.43 | | |

TABLE 9

| | | Example 3 | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | 1.2932461E−04 | 3.7012263E−05 | −3.0265693E−04 | −2.7089111E−05 |
| A6 | −1.2182718E−05 | −2.2525871E−06 | 3.4085516E−07 | 5.8004601E−06 |
| A8 | 8.3454671E−07 | 3.9310938E−07 | 1.4251833E−07 | −1.0848829E−07 |
| A10 | −1.4125015E−08 | −9.3302018E−09 | −6.3004469E−09 | 8.0671730E−10 |
| A12 | −1.2962026E−10 | 3.1883950E−11 | 8.9959105E−11 | 9.2728340E−12 |
| A14 | 3.9623543E−12 | 8.7751249E−13 | 7.7750897E−13 | −7.0738346E−14 |
| A16 | −1.8501996E−14 | −3.8969465E−15 | −3.7513188E−14 | −1.9883389E−15 |
| A18 | 2.7996543E−16 | −8.0696828E−17 | 4.0301283E−16 | 1.9910270E−17 |
| A20 | −4.1051273E−18 | 7.6938735E−19 | −1.4613457E−18 | −1.4548517E−20 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −1.3492730E−04 | −1.1587662E−04 | 3.2524939E−04 | 2.6535077E−05 |

TABLE 9-continued

| | Example 3 | | | |
|---|---|---|---|---|
| A6 | 1.1671470E−05 | 5.7785148E−07 | −5.5794096E−07 | 2.9825954E−06 |
| A8 | −2.6028649E−07 | −3.5408078E−09 | −2.0496176E−09 | −1.7388940E−08 |
| A10 | 3.5117054E−09 | 1.4554968E−11 | −1.3530245E−11 | −1.0058210E−10 |
| A12 | −1.2246727E−11 | 1.7365348E−13 | −5.8916849E−13 | 7.7416423E−13 |
| A14 | −3.1607833E−13 | −2.9401213E−15 | 3.1704951E−15 | 4.1925627E−15 |
| A16 | 1.8546662E−15 | −2.1592276E−18 | 1.1266088E−17 | 5.7785494E−18 |
| A18 | 3.2558536E−17 | 3.5173869E−19 | 7.3429148E−20 | −5.5869615E−19 |
| A20 | −2.5905774E−19 | −1.5813612E−21 | −5.8053177E−22 | 2.2612055E−21 |

| Sn | 11 | 12 |
|---|---|---|
| KA | 1.0000000E+00 | 1.0000000E+00 |
| A4 | −2.0037256E−04 | −8.7126476E−05 |
| A6 | 1.7478315E−06 | −6.8107519E−07 |
| A8 | −1.8162068E−08 | 2.2356512E−08 |
| A10 | 2.0915695E−10 | −1.2601726E−10 |
| A12 | −1.5414044E−13 | −3.9312960E−14 |
| A14 | −6.4714189E−15 | 7.9033178E−15 |
| A16 | 3.1258318E−17 | −2.0589968E−17 |
| A18 | −1.0250239E−19 | −2.1139147E−19 |
| A20 | 3.8095971E−22 | 1.1970269E−21 |

Example 4

Figure 7:
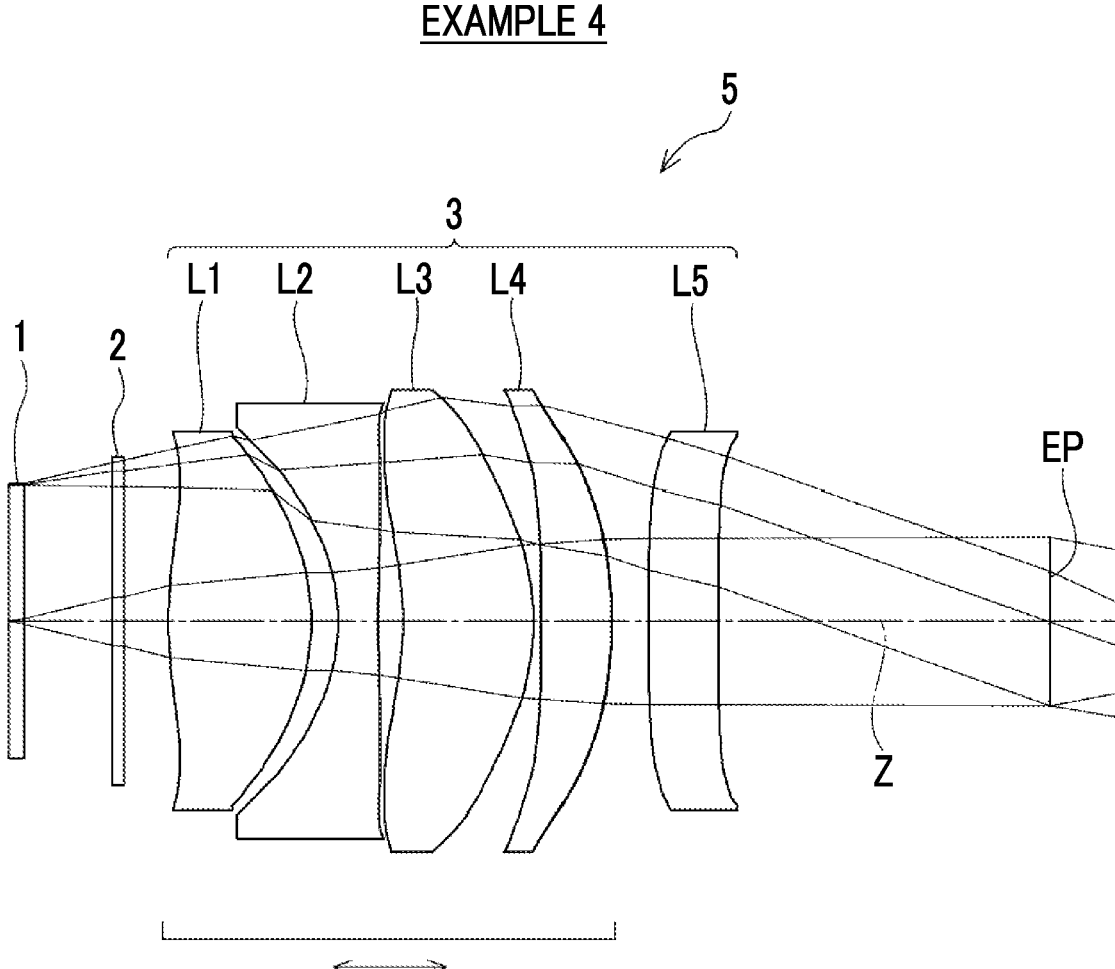
FIG. 7 is a cross-sectional view illustrating a configuration and luminous flux of an observation optical system of Example 4.

FIG. 7 illustrates a configuration and luminous flux of the observation optical system 5 of Example 4. The observation optical system 5 of Example 4 comprises the display element 1, the optical member 2, and the eyepiece lens 3 in order from the display element side to the eyepoint side. The eyepiece lens 3 consists of the lens L1 having positive refractive power, the lens L2 having negative refractive power, the lens L3 having positive refractive power, the lens L4 having positive refractive power, and the lens L5 having positive diopter adjustment, the lens L1, the lens L2, the lens L3, and the lens L4 move as a single body along the optical axis Z.

Figure 8:
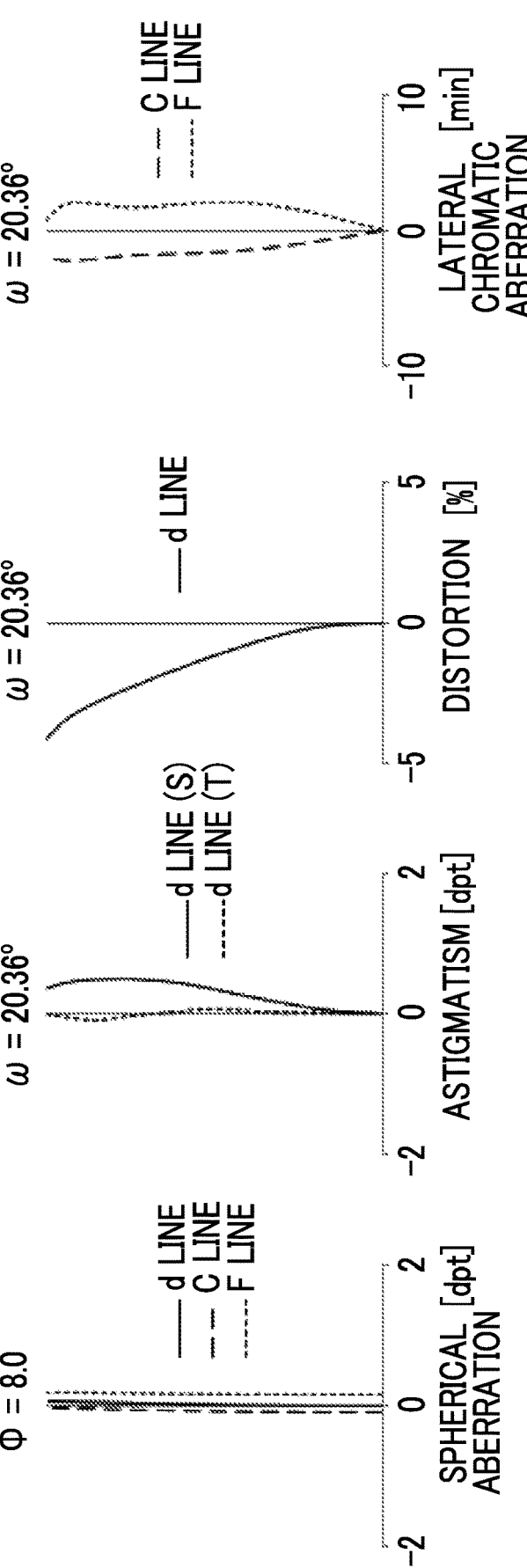
FIG. 8 illustrates various aberration diagrams of the observation optical system of Example 4.

For the observation optical system 5 of Example 4, basic lens data is shown in Table 10, specifications and variable surface spacing are shown in Table 11, aspherical coefficients are shown in Table 12, and various aberration diagrams in a state where the diopter is −0.99 diopter are illustrated in FIG. 8.

TABLE 10

| | Example 4 | | | |
|---|---|---|---|---|
| Sn | R | D | Nd | vd |
| 1 | ∞ | 0.7000 | 1.51900 | 64.90 |
| 2 | ∞ | 4.0000 | | |

TABLE 10-continued

| | Example 4 | | | |
|---|---|---|---|---|
| Sn | R | D | Nd | vd |
| 3 | ∞ | 0.5000 | 1.51900 | 64.90 |
| 4 | ∞ | DD[4] | | |
| *5 | 21.5065 | 6.4403 | 1.81625 | 46.38 |
| *6 | −10.8826 | 1.2268 | | |
| *7 | −9.8940 | 1.7876 | 1.63351 | 23.63 |
| *8 | 70.0718 | 1.1294 | | |
| *9 | −16.4677 | 5.9122 | 1.53500 | 55.73 |
| *10 | −12.0971 | 0.3000 | | |
| *11 | 438.5021 | 3.1693 | 1.53500 | 55.73 |
| *12 | −23.0194 | DD[12] | | |
| *13 | 369.8600 | 3.1385 | 1.51600 | 64.38 |
| *14 | 536.1041 | 15.0000 | | |
| 15 (EP) | ∞ | | | |

TABLE 11

| | Example 4 | | |
|---|---|---|---|
| Diopter | −1 dpt | −4.5 dpt | 2.5 dpt |
| f | 16.24 | 16.24 | 16.24 |
| Apparent Field of View [°] | 41 | 39 | 43 |
| DD[4] | 2.02 | 0.85 | 3.19 |
| DD[12] | 1.67 | 2.84 | 0.50 |
| H | 6.43 | | |

TABLE 12

| | Example 4 | | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | −2.5049601E−04 | 8.7590914E−05 | −4.4356765E−05 | −1.3161738E−04 |
| A6 | −1.5646354E−06 | 3.3733966E−06 | 9.1976661E−06 | 5.9526326E−07 |
| A8 | 1.3919126E−07 | −9.3207321E−08 | −2.3802190E−07 | −2.7814142E−09 |
| A10 | −6.0515032E−09 | 7.1097396E−10 | 3.5967128E−09 | 2.3014885E−11 |
| A12 | 8.9256744E−11 | 9.6811963E−12 | −1.2129624E−11 | 2.4756578E−13 |
| A14 | 7.6900339E−13 | −7.6417408E−14 | −3.3475870E−13 | −2.4782900E−15 |
| A16 | −3.7836884E−14 | −1.9030997E−15 | 1.8893639E−15 | −6.3491516E−18 |
| A18 | 4.0345387E−16 | 2.0665340E−17 | 3.7678953E−17 | 3.3340273E−19 |
| A20 | −1.4343015E−18 | −3.0149135E−20 | −2.9133834E−19 | −1.1163301E−21 |

TABLE 12-continued

|       | Example 4 | | | |
|-------|-----------|-----------|-----------|-----------|
| Sn    | 9         | 10        | 11        | 12        |
| KA    | 1.0000000E+00  | 1.0000000E+00  | 1.0000000E+00  | 1.0000000E+00  |
| A4    | 3.5292360E−04  | 5.0079490E−05  | −2.1485262E−04 | −7.6301215E−05 |
| A6    | −6.1169700E−07 | 2.9840393E−06  | 1.3931666E−06  | −1.3292706E−06 |
| A8    | −1.5527547E−09 | −1.7508666E−08 | −2.0025899E−08 | 2.5155755E−08  |
| A10   | −1.2352821E−11 | −9.1224651E−11 | 2.0677983E−10  | −1.3499799E−10 |
| A12   | −5.1369596E−13 | 7.0750589E−13  | −2.0145417E−13 | −1.6524205E−13 |
| A14   | 3.5579079E−15  | 4.2266599E−15  | −6.6390721E−15 | 7.5048225E−15  |
| A16   | 2.0035646E−17  | 3.8401879E−18  | 2.6766064E−17  | −2.0370828E−17 |
| A18   | 9.3940819E−21  | −5.1133179E−19 | −8.5000468E−20 | −2.2475792E−19 |
| A20   | −6.1973399E−22 | 2.1130866E−21  | 3.7941321E−22  | 1.0294694E−21  |

| Sn    | 13            | 14            |
|-------|---------------|---------------|
| KA    | 1.0000000E+00 | 1.0000000E+00 |
| A4    | 9.1094779E−05 | 4.1778287E−05 |
| A6    | 2.6843790E−07 | 9.4075623E−07 |
| A8    | 7.9763393E−10 | −1.0135481E−08 |
| A10   | −4.5552179E−12 | 1.5249186E−10 |
| A12   | 2.2518523E−13 | −1.3244117E−12 |
| A14   | 1.1617307E−15 | 3.7793868E−14 |
| A16   | 1.0071930E−17 | −6.1019187E−16 |
| A18   | 1.6149041E−19 | 7.0999839E−18 |
| A20   | −2.3199890E−21 | −3.2983455E−20 |

Example 5

Figure 9:
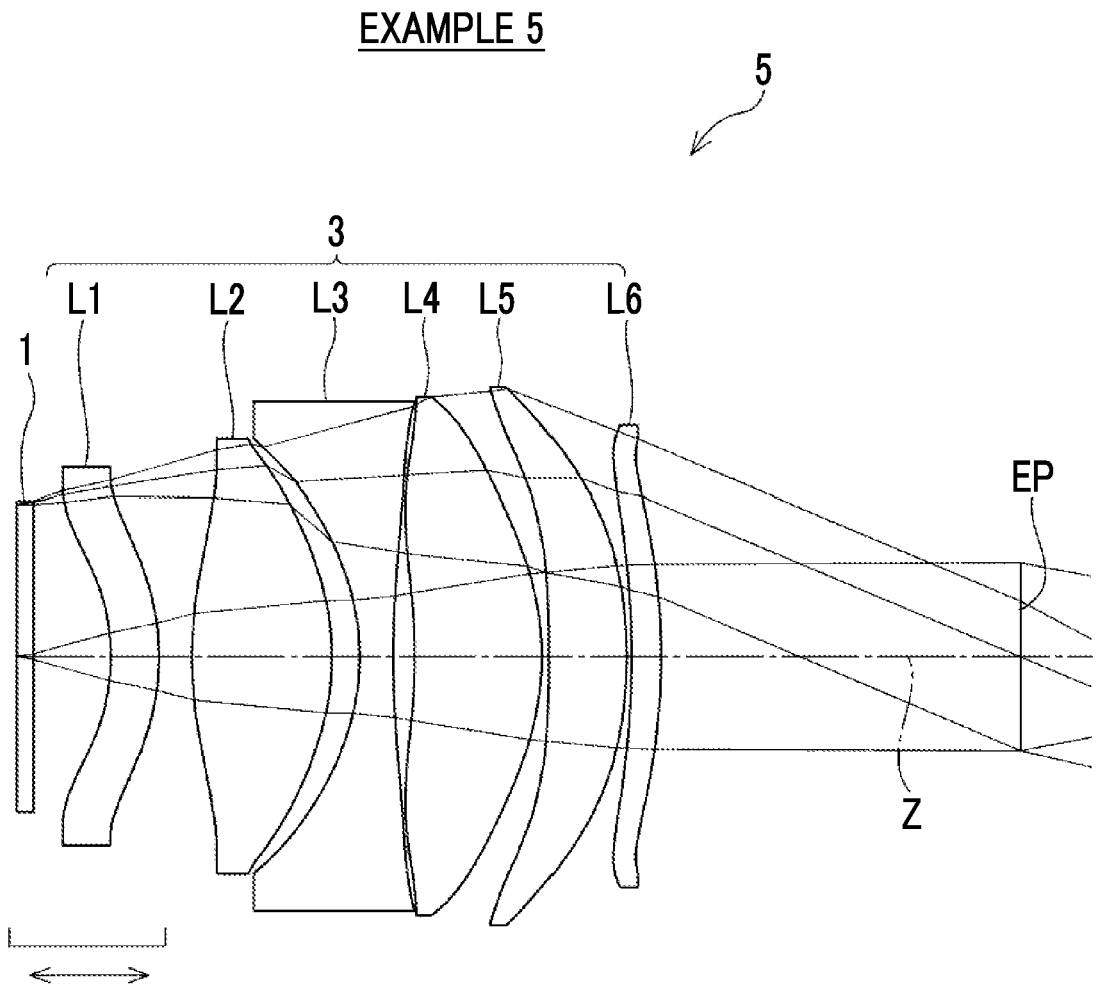
FIG. 9 is a cross-sectional view illustrating a configuration and luminous flux of an observation optical system of Example 5.

FIG. 9 illustrates a configuration and luminous flux of the observation optical system 5 of Example 5. The observation optical system 5 of Example 5 comprises the display element 1 and the eyepiece lens 3 in order from the display element side to the eyepoint side. The eyepiece lens 3 consists of the lens L1 having negative refractive power, the lens L2 having positive refractive power, the lens L3 having negative refractive power, the lens L4 having positive refractive power, the lens L5 having positive refractive power, and a lens L6 During the diopter adjustment, the display element 1 and the lens L1 move as a single body along the optical axis Z.

Figure 10:
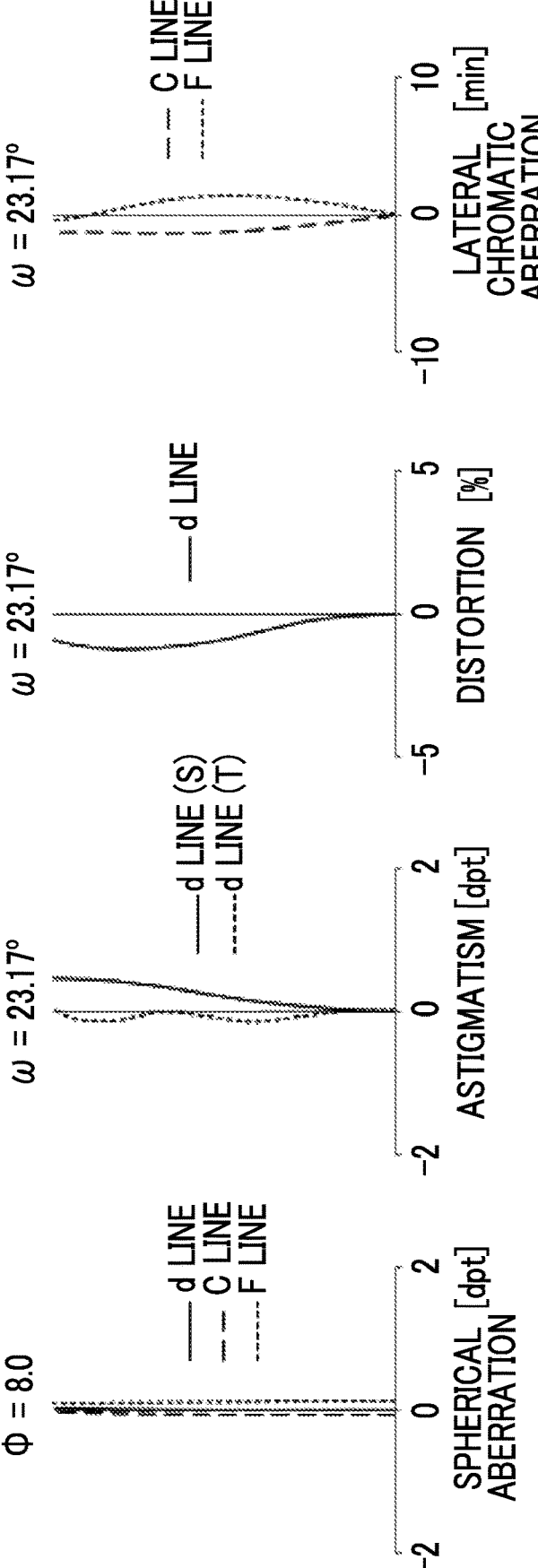
FIG. 10 illustrates various aberration diagrams of the observation optical system of Example 5.

For the observation optical system 5 of Example 5, basic lens data is shown in Table 13, specifications and variable surface spacing are shown in Table 14, aspherical coefficients are shown in Table 15, and various aberration diagrams in a state where the diopter is −0.97 diopter are illustrated in FIG. 10.

TABLE 13

|       | Example 5 | | | |
|-------|-----------|-----------|-----------|-----------|
| Sn    | R         | D         | Nd        | vd        |
| 1     | ∞         | 0.7000    | 1.51900   | 64.90     |
| 2     | ∞         | 3.2358    |           |           |

TABLE 13-continued

|        | Example 5 | | | |
|--------|-----------|-----------|-----------|-----------|
| Sn     | R         | D         | Nd        | vd        |
| *3     | −9.6268   | 2.0183    | 1.72924   | 53.85     |
| *4     | −11.0742  | DD[4]     |           |           |
| *5     | 16.9394   | 5.8419    | 1.76709   | 49.20     |
| *6     | −11.3115  | 1.1657    |           |           |
| *7     | −10.4650  | 1.3955    | 1.63351   | 23.63     |
| *8     | 41.3489   | 0.9003    |           |           |
| *9     | −22.4043  | 5.3053    | 1.53500   | 55.73     |
| *10    | −12.1275  | 0.3000    |           |           |
| *11    | −70.0977  | 3.1924    | 1.53500   | 55.73     |
| *12    | −19.3855  | 0.2000    |           |           |
| *13    | −37.5359  | 1.2373    | 1.53500   | 55.73     |
| *14    | −27.9134  | 15.0000   |           |           |
| 15 (EP) | ∞        |           |           |           |

TABLE 14

|                            | Example 5 | | |
|----------------------------|-----------|-----------|-----------|
| Diopter                    | −1 dpt    | −4.5 dpt  | 2.5 dpt   |
| f                          | 14.62     | 14.62     | 14.62     |
| Apparent Field of View [°] | 46        | 48        | 45        |
| DD[4]                      | 1.36      | 2.43      | 0.29      |
| H                          | 6.43      |           |           |

TABLE 15

|       | Example 5 | | | |
|-------|-----------|-----------|-----------|-----------|
| Sn    | 3         | 4         | 5         | 6         |
| KA    | 1.0000000E+00  | 1.0000000E+00  | 1.0000000E+00  | 1.0000000E+00  |
| A4    | −4.2375029E−04 | −2.1066975E−04 | −2.5533911E−04 | 1.2606340E−04  |
| A6    | 6.6204584E−06  | 5.9738723E−06  | −1.9378567E−08 | 2.9396120E−06  |
| A8    | 7.0167822E−07  | 1.7783501E−07  | 1.3640588E−07  | −8.8266083E−08 |
| A10   | −9.3418388E−09 | −1.0172481E−09 | −6.3422231E−09 | 7.5515822E−10  |
| A12   | −8.6013650E−11 | −5.3582937E−11 | 9.0062779E−11  | 7.7413362E−12  |
| A14   | 5.3001639E−13  | 1.1401503E−13  | 7.7377839E−13  | −7.6541735E−14 |

TABLE 15-continued

| | Example 5 | | | |
|---|---|---|---|---|
| A16 | 2.7500902E−14 | 6.0798745E−15 | −3.7615221E−14 | −1.8970512E−15 |
| A18 | 1.2869271E−16 | 1.4157099E−16 | 4.0254299E−16 | 2.1782661E−17 |
| A20 | −5.4158758E−18 | −2.0046075E−18 | −1.4376536E−18 | −2.7983720E−20 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −3.8253126E−05 | −1.0474543E−04 | 3.4935504E−04 | 4.6539145B−05 |
| A6 | 9.1756286E−06 | 6.2999749E−07 | −5.3136997E−07 | 3.0402235E−06 |
| A8 | −2.4852712E−07 | −3.3673389E−09 | −2.3355120E−09 | −1.7532983E−08 |
| A10 | 3.6517669E−09 | 1.5826728E−11 | −1.6808427E−11 | −1.0364908E−10 |
| A12 | −1.2263860E−11 | 1.8991813E−13 | −6.2172544E−13 | 7.7416562E−13 |
| A14 | −3.4280153E−13 | −2.8076994E−15 | 2.9299088E−15 | 4.3029516E−15 |
| A16 | 2.0419787E−15 | −1.6113351E−18 | 9.5202940E−18 | 6.7335957E−18 |
| A18 | 3.5548323E−17 | 3.4738883E−19 | 7.2481311E−20 | −5.5465159E−19 |
| A20 | −2.8977537E−19 | −1.7649262E−21 | −4.1080437E−22 | 2.2418616E−21 |

| Sn | 11 | 12 | 13 | 14 |
|---|---|---|---|---|
| KA | 1.0000000E+00 | 1.0000000E+00 | 1.0000000E+00 | 1.0000000E+00 |
| A4 | −2.4169779E−04 | −9.9697126E−05 | 2.6089814E−06 | −2.2212106E−05 |
| A6 | 1.5885366E−06 | −1.3128857E−06 | 4.5743106E−07 | 1.3039525E−06 |
| A8 | −1.9493792E−08 | 2.4878058E−08 | −4.7219723E−09 | −1.8017565E−08 |
| A10 | 2.0597310E−10 | −1.3213194E−10 | 1.7693026E−11 | 1.7937001E−10 |
| A12 | −1.6727850E−13 | −1.7273318E−13 | 4.7981325E−13 | −1.2116923E−12 |
| A14 | −6.4576010E−15 | 7.2629841E−15 | 2.3842735E−15 | 4.2258090E−14 |
| A16 | 3.0318780E−17 | −2.1060686E−17 | 2.2412372E−17 | −7.1457672E−16 |
| A18 | −1.0606424E−19 | −2.1835527E−19 | 5.7124534E−19 | 7.2904447E−18 |
| A20 | 3.5480598E−22 | 1.0139348E−21 | −7.0871330E−21 | −2.7456588E−20 |

Example 6

Figure 11:
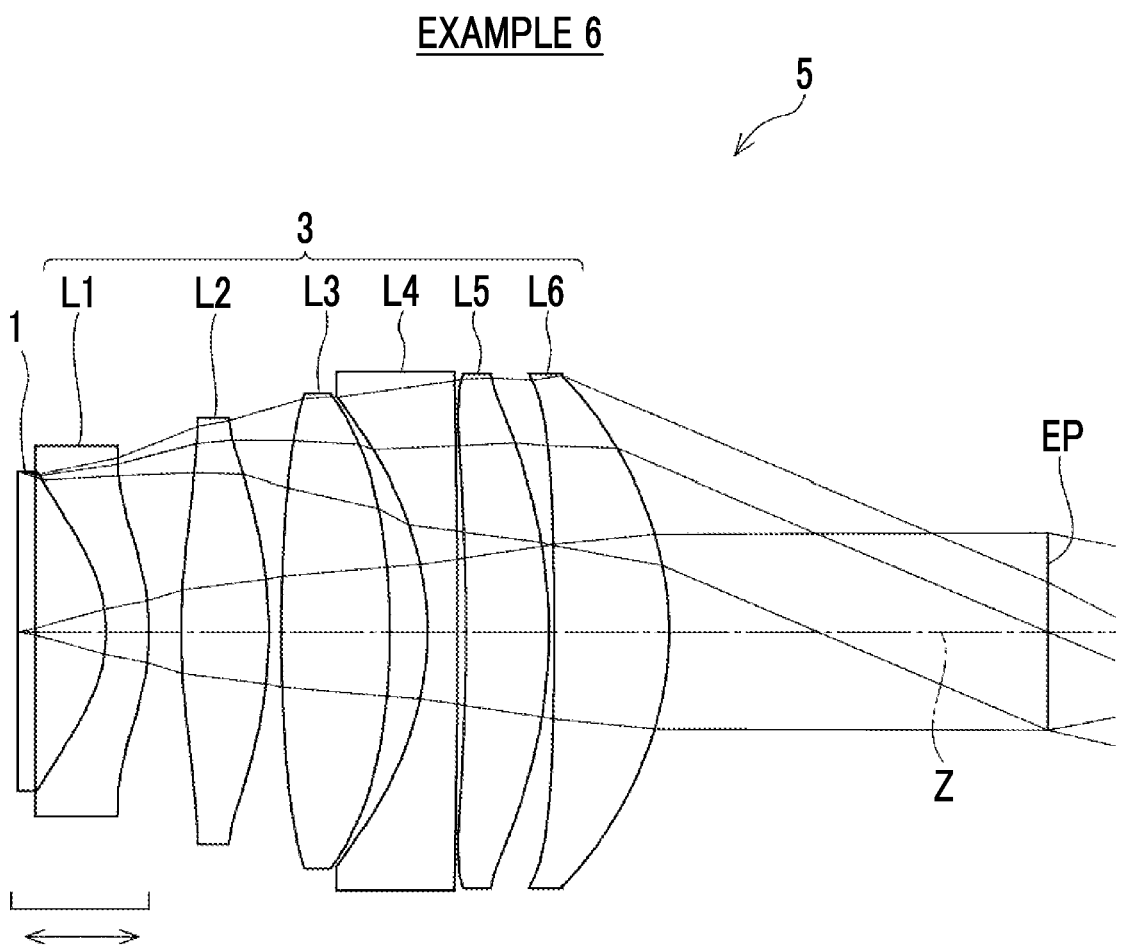
FIG. 11 is a cross-sectional view illustrating a configuration and luminous flux of an observation optical system of Example 6.

FIG. 11 illustrates a configuration and luminous flux of the observation optical system 5 of Example 6. The observation optical system 5 of Example 6 comprises the display element 1 and the eyepiece lens 3 in order from the display element side to the eyepoint side. The eyepiece lens 3 consists of the lens L1 having negative refractive power, the lens L2 having positive refractive power, the lens L3 having positive refractive power, the lens L4 having negative refractive power, the lens L5 having positive refractive power, and the lens L6 During the diopter adjustment, the display element 1 and the lens L1 move as a single body along the optical axis Z.

Figure 12:
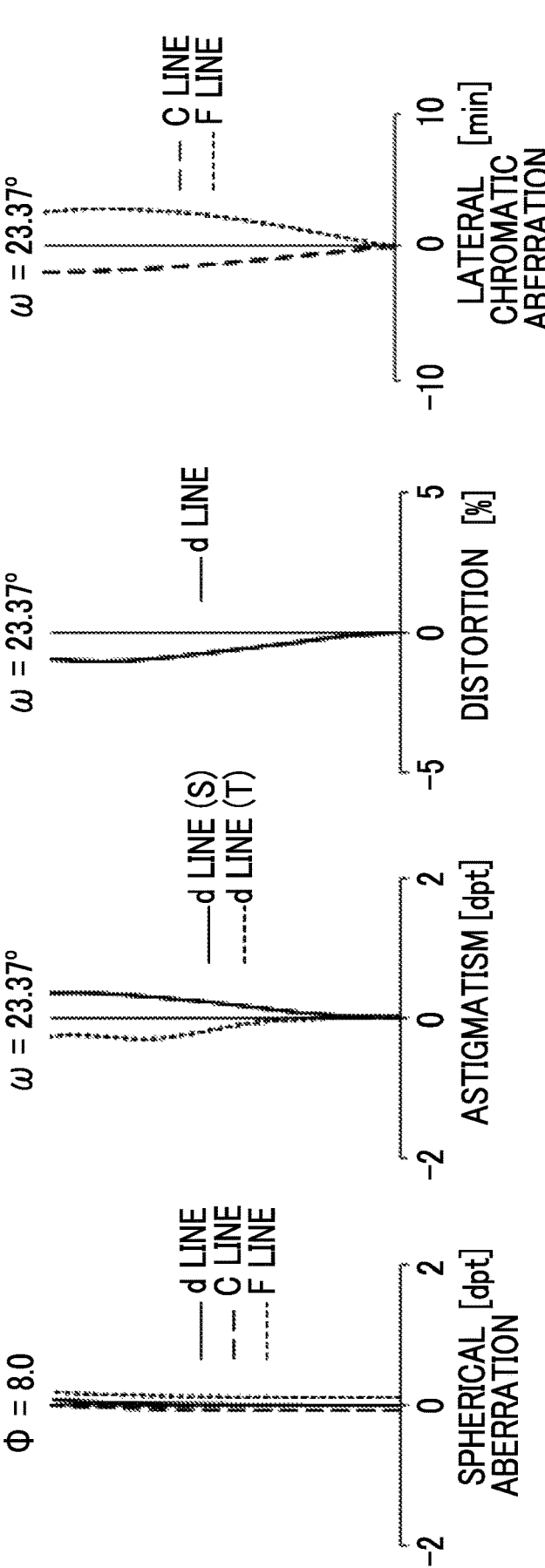
FIG. 12 illustrates various aberration diagrams of the observation optical system of Example 6.

For the observation optical system 5 of Example 6, basic lens data is shown in Table 16, specifications and variable surface spacing are shown in Table 17, aspherical coefficients are shown in Table 18, and various aberration diagrams in a state where the diopter is −0.99 diopter are illustrated in FIG. 12.

TABLE 16

| | Example 6 | | | |
|---|---|---|---|---|
| Sn | R | D | Nd | vd |
| 1 | ∞ | 0.7000 | 1.51900 | 64.90 |
| 2 | ∞ | 2.7844 | | |

TABLE 16-continued

| | Example 6 | | | |
|---|---|---|---|---|
| Sn | R | D | Nd | vd |
| *3 | −6.6548 | 1.7128 | 1.80001 | 25.00 |
| *4 | −11.0567 | DD[4] | | |
| *5 | 27.3497 | 3.4743 | 1.79997 | 48.00 |
| *6 | −18.8402 | 0.5001 | | |
| *7 | 76.4002 | 4.2927 | 1.53500 | 55.73 |
| *8 | −30.1465 | 1.5000 | | |
| *9 | −12.7821 | 1.1806 | 1.63351 | 23.63 |
| *10 | −547.0465 | 0.3499 | | |
| *11 | −85.1185 | 3.2811 | 1.53500 | 55.73 |
| *12 | −21.6905 | 0.2000 | | |
| *13 | −405.4037 | 4.5282 | 1.53500 | 55.73 |
| *14 | −13.4505 | 15.0000 | | |
| 15 (EP) | ∞ | | | |

TABLE 17

| | Example 6 | | |
|---|---|---|---|
| Diopter | −1 dpt | −4.5 dpt | 2.5 dpt |
| f | 14.62 | 14.62 | 14.62 |
| Apparent Field of View [°] | 47 | 48 | 45 |
| DD[4] | 1.27 | 1.92 | 0.44 |
| H | 6.43 | | |

TABLE 18

| | Example 6 | | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −6.0428790E−04 | −1.4954643E−04 | −1.3818870E−04 | 7.9075459E−05 |
| A6 | 7.9033590E−05 | 2.8022242E−05 | −1.8018539E−07 | −9.4689589E−07 |

TABLE 18-continued

| | Example 6 | | | |
|---|---|---|---|---|
| A8 | −1.4420249E−06 | −2.9118333E−07 | −8.3086941E−09 | 1.7106074E−09 |
| A10 | 3.8577372E−09 | −1.5054141E−09 | 2.8109698E−10 | 1.0015858E−10 |
| A12 | 5.4408177E−10 | 1.2742304E−11 | −2.5726262E−12 | 3.5486078E−13 |
| A14 | −3.7161020E−12 | 4.4705835E−13 | −6.2712651E−15 | 1.4409788E−15 |
| A16 | −3.3587790E−13 | 5.2182125E−15 | 3.7377640E−16 | 1.3745903E−16 |
| A18 | 6.1403271E−15 | −7.3018895E−17 | 4.0091914E−18 | −4.1729767E−19 |
| A20 | 1.0347673E−17 | −1.2323618E−18 | −7.7003844E−20 | 2.1735411E−21 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | 1.1883919E−05 | −4.7654804E−05 | 4.2444773E−05 | −5.9703973E−06 |
| A6 | 2.7848738E−07 | −4.7047261E−07 | 1.8902450E−07 | 2.5091047E−08 |
| A8 | −2.5127533E−09 | −1.3876016E−09 | 7.4961294E−10 | 2.0795002E−11 |
| A10 | 1.8495899E−11 | 3.0524714E−12 | 2.2136693E−12 | −3.8457527E−13 |
| A12 | 4.4174945E−14 | 5.7957627E−14 | 6.1772307E−14 | 8.1267188E−14 |
| A14 | −1.3810589E−15 | 5.2740680E−16 | 2.1266883E−15 | −2.6749889E−16 |
| A16 | 4.6900002E−17 | −7.2399592E−18 | −1.4393910E−17 | −2.7496316E−18 |
| A18 | −1.6190853E−20 | −8.1531740E−21 | −3.7500813E−19 | −8.6374096E−21 |
| A20 | −3.3000152E−21 | 1.0900102E−21 | 3.7974989E−21 | 4.0098140E−23 |

| Sn | 11 | 12 | 13 | 14 |
|---|---|---|---|---|
| KA | 1.0000000E+00 | 1.0000000E+00 | 1.0000000E+00 | 1.0000000E+00 |
| A4 | 1.1211182E−05 | 9.6240674E−07 | −5.0647214E−05 | 4.2236277E−05 |
| A6 | 5.8756230E−08 | 1.0125719E−07 | −2.9439572E−08 | 1.1807945E−07 |
| A8 | 1.5388086E−10 | 1.2356935E−10 | 2.4131204E−11 | −5.1831129E−10 |
| A10 | 6.6392183E−12 | 1.3406666E−12 | −5.5140020E−12 | 3.0061254E−12 |
| A12 | 3.6006370E−14 | 7.6331092E−15 | −1.7541837E−14 | 5.8661700E−14 |
| A14 | 3.1562623E−16 | 3.8879601E−16 | −3.9782153E−16 | −5.3013362E−16 |
| A16 | 3.7782876E−18 | 1.7076128E−18 | 5.6688571E−18 | 2.3785923E−18 |
| A18 | 1.2434343E−20 | 1.5989324E−20 | −6.8400472E−21 | −5.9154061E−20 |
| A20 | −8.5888651E−23 | 1.0335573E−22 | −7.2396744E−22 | 1.5587151E−22 |

Example 7

Figure 13:
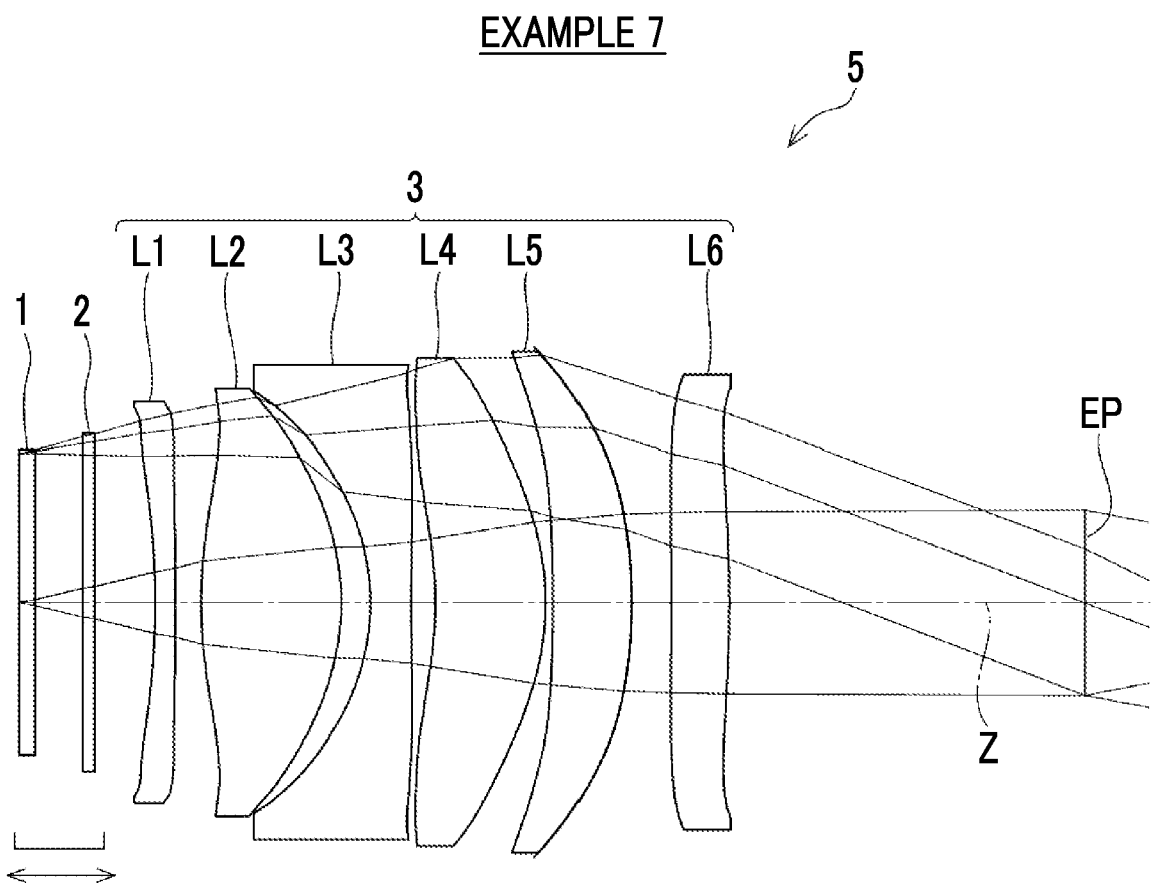
FIG. 13 is a cross-sectional view illustrating a configuration and luminous flux of an observation optical system of Example 7.

FIG. 13 illustrates a configuration and luminous flux of the observation optical system 5 of Example 7. The observation optical system 5 of Example 7 comprises the display element 1, the optical member 2, and the eyepiece lens 3 in order from the display element side to the eyepoint side. The eyepiece lens 3 consists of the lens L1 having negative refractive power, the lens L2 having positive refractive power, the lens L3 having negative refractive power, the lens L4 having positive refractive power, the lens L5 having positive refractive power, and the lens L6 having positive refractive power in order from the display element side to the eyepoint side. During the diopter adjustment, the display element 1 and the optical member 2 move as a single body along the optical axis Z.

Figure 14:
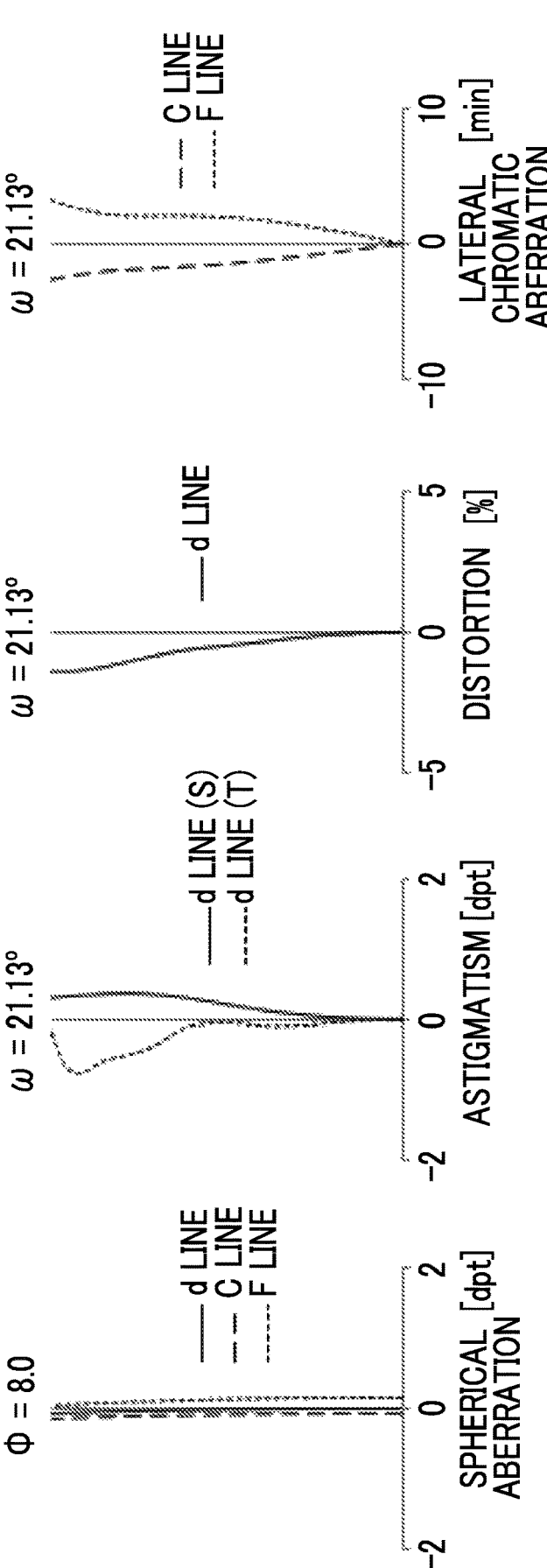
FIG. 14 illustrates various aberration diagrams of the observation optical system of Example 7.

For the observation optical system 5 of Example 7, basic lens data is shown in Table 19, specifications and variable surface spacing are shown in Table 20, aspherical coefficients are shown in Table 21, and various aberration diagrams in a state where the diopter is −0.97 diopter are illustrated in FIG. 14.

TABLE 19

| | Example 7 | | | |
|---|---|---|---|---|
| Sn | R | D | Nd | vd |
| 1 | ∞ | 0.7000 | 1.51900 | 64.90 |
| 2 | ∞ | 2.0000 | | |
| 3 | ∞ | 0.5000 | 1.51900 | 64.90 |
| 4 | ∞ | DD[4] | | |
| *5 | −36.1942 | 0.8432 | 1.51600 | 52.00 |
| *6 | −269.0697 | 1.0999 | | |
| *7 | 20.0811 | 5.9180 | 1.80435 | 47.57 |

TABLE 19-continued

| | Example 7 | | | |
|---|---|---|---|---|
| Sn | R | D | Nd | vd |
| *8 | −10.8311 | 1.2229 | | |
| *9 | −10.3614 | 1.7268 | 1.63351 | 23.63 |
| *10 | 107.4639 | 1.0140 | | |
| *11 | −17.1391 | 4.6573 | 1.53500 | 55.73 |
| *12 | −12.3329 | 0.3000 | | |
| *13 | −137.7903 | 3.2963 | 1.53500 | 55.73 |
| *14 | −23.6044 | 1.6685 | | |
| *15 | −225.3677 | 2.4625 | 1.55381 | 62.93 |
| *16 | −53.3744 | 15.0000 | | |
| 17 (EP) | ∞ | | | |

TABLE 20

| | Example 7 | | |
|---|---|---|---|
| Diopter | −1 dpt | −4.5 dpt | 2.5 dpt |
| f | 16.24 | 16.24 | 16.24 |
| Apparent Field of View [°] | 42 | 44 | 41 |
| DD[4] | 2.56 | 3.75 | 1.38 |
| H | 6.43 | | |

TABLE 21

| | | Example 7 | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | −2.7624015E−05 | 1.1654923E−05 | −1.7319591E−04 | 1.2233423E−04 |
| A6 | 5.4325480E−07 | −4.2519741E−08 | −1.7488363E−06 | 3.1481367E−06 |
| A8 | 1.2680658E−08 | 1.7083084E−09 | 1.4064307E−07 | −9.1737468E−08 |
| A10 | 1.4981048E−10 | −5.6983717E−12 | −6.1044344E−09 | 6.9914859E−10 |
| A12 | 3.5257276E−13 | 4.2414603E−13 | 8.8867436E−11 | 9.4636913E−12 |
| A14 | −2.1117819E−14 | 1.7823131E−14 | 7.6839454E−13 | −7.6437066E−14 |
| A16 | 2.3701719E−16 | −3.3558778E−16 | −3.7842467E−14 | −1.9485666E−15 |
| A18 | 9.3304260E−18 | −5.2450423E−18 | 4.0366936E−16 | 2.0965916E−17 |
| A20 | −3.0606653E−19 | −3.6226416E−21 | −1.4263051E−18 | −2.7108790E−20 |

| Sn | 9 | 10 | 11 | 12 |
|---|---|---|---|---|
| KA | 1.0000000E+00 | 1.0000000E+00 | 1.0000000E+00 | 1.0000000E+00 |
| A4 | −1.0242772E−04 | −1.3055557E−04 | 3.4075088E−04 | 4.7281386E−05 |
| A6 | 8.8923831E−06 | 6.0549969E−07 | −6.6849417E−07 | 2.9482377E−06 |
| A8 | −2.3823740E−07 | −2.7716045E−09 | −1.7977006E−09 | −1.7538090E−08 |
| A10 | 3.5918092E−09 | 2.2797029E−11 | −1.3737364E−11 | −9.1279566E−11 |
| A12 | −1.2421348E−11 | 2.4101392E−13 | −5.1947256E−13 | 7.0486351E−13 |
| A14 | −3.3896247E−13 | −2.5804425E−15 | 3.5212913E−15 | 4.2353492E−15 |
| A16 | 1.8340638E−15 | −7.1880219E−18 | 1.9972221E−17 | 3.8742486E−18 |
| A18 | 3.7330417E−17 | 3.2771703E−19 | 1.1410220E−20 | −5.0809627E−19 |
| A20 | −2.9491509E−19 | −1.1317198E−21 | −6.2709961E−22 | 2.1217606E−21 |

| Sn | 13 | 14 | 15 | 16 |
|---|---|---|---|---|
| KA | 1.0000000E+00 | 1.0000000E+00 | 1.0000000E+00 | 1.0000000E+00 |
| A4 | −1.9901375E−04 | −9.7630587E−05 | 5.8395346E−05 | 5.9463326E−05 |
| A6 | 1.4804424E−06 | −1.3914638E−06 | −9.9322876E−08 | 7.3107182E−07 |
| A8 | −1.9937546E−08 | 2.4840768E−08 | 1.0959339E−10 | −1.0973086E−08 |
| A10 | 2.0756109E−10 | −1.3698286E−10 | 6.8471718E−13 | 1.2317126E−10 |
| A12 | −1.9984963E−13 | −1.7676741E−13 | 2.5714206E−13 | −1.4699280E−12 |
| A14 | −6.6828752E−15 | 7.4114735E−15 | 1.2158295E−15 | 3.8424169E−14 |
| A16 | 2.6198774E−17 | −2.0292888E−17 | 7.9440428E−18 | −6.0492275E−16 |
| A18 | −8.4708346E−20 | −2.2455825E−19 | 2.0638927E−19 | 6.9651644E−18 |
| A20 | 3.9922937E−22 | 1.0056000E−21 | −3.3580058E−21 | −3.3897042E−20 |

Example 8

Figure 15:
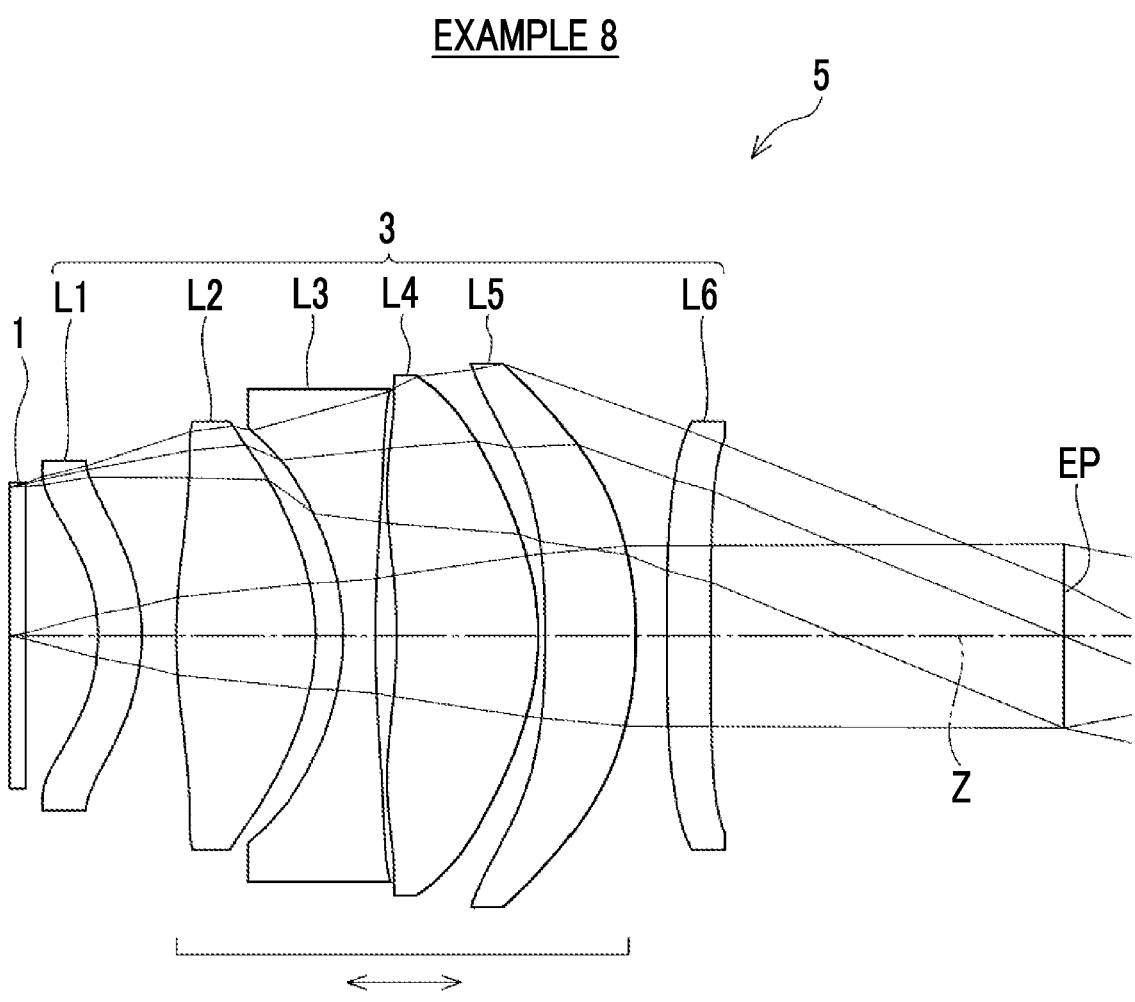
FIG. 15 is a cross-sectional view illustrating a configuration and luminous flux of an observation optical system of Example 8.

FIG. 15 illustrates a configuration and luminous flux of the observation optical system 5 of Example 8. The observation optical system 5 of Example 8 comprises the display element 1 and the eyepiece lens 3 in order from the display element side to the eyepoint side. The eyepiece lens 3 consists of the lens L1 having negative refractive power, the lens L2 having positive refractive power, the lens L3 having negative refractive power, the lens L4 having positive refractive power, the lens L5 having positive refractive power, and the lens L6 During the diopter adjustment, the lens L2, the lens L3, the lens L4, and the lens L5 move as a single body along the optical axis Z.

Figure 16:
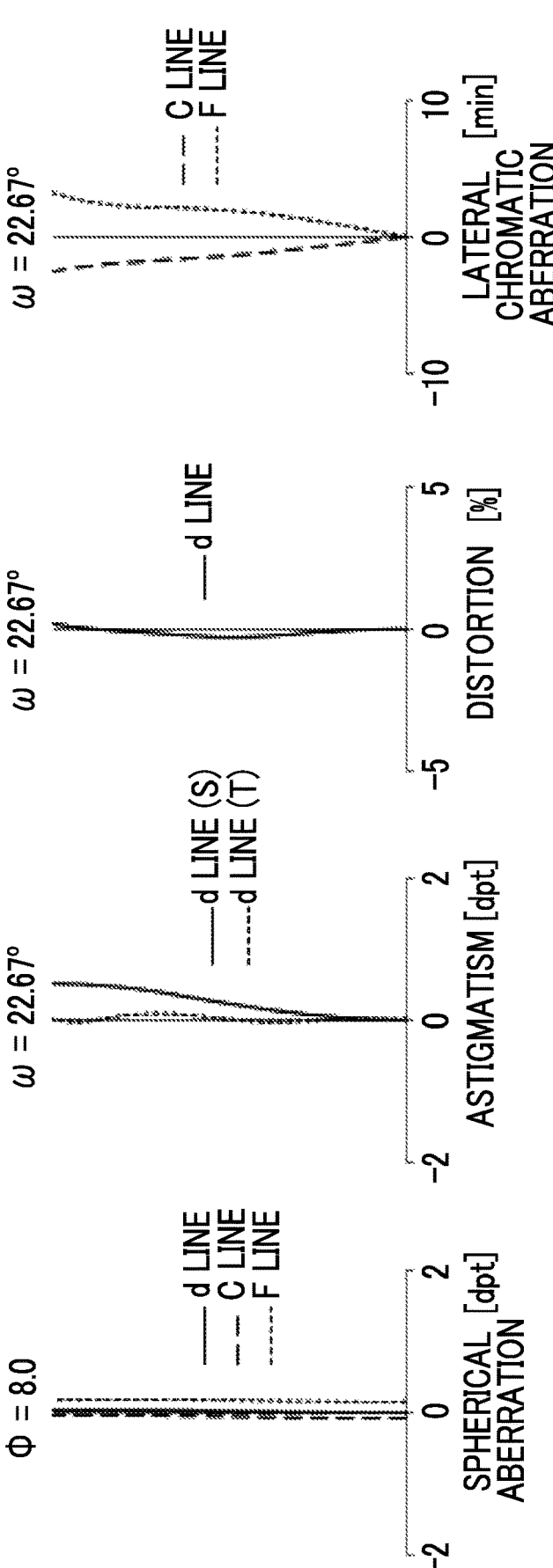
FIG. 16 illustrates various aberration diagrams of the observation optical system of Example 8.

For the observation optical system 5 of Example 8, basic lens data is shown in Table 22, specifications and variable surface spacing are shown in Table 23, aspherical coefficients are shown in Table 24, and various aberration diagrams in a state where the diopter is −1.01 diopter are illustrated in FIG. 16.

TABLE 22

| | | Example 8 | | |
|---|---|---|---|---|
| Sn | R | D | Nd | vd |
| 1 | ∞ | 0.7000 | 1.51900 | 64.90 |
| 2 | ∞ | 3.0873 | | |
| *3 | −8.3433 | 1.8510 | 1.85999 | 42.00 |
| *4 | −9.8718 | DD[4] | | |

TABLE 22-continued

| | | Example 8 | | |
|---|---|---|---|---|
| Sn | R | D | Nd | vd |
| *5 | 22.4755 | 5.9381 | 1.77538 | 50.46 |
| *6 | −10.6142 | 1.1743 | | |
| *7 | −11.3032 | 1.3556 | 1.63351 | 23.63 |
| *8 | 47.0562 | 0.9255 | | |
| *9 | −22.0286 | 6.0230 | 1.53500 | 55.73 |
| *10 | −12.3754 | 0.3000 | | |
| *11 | −50.7891 | 3.8081 | 1.53500 | 55.73 |
| *12 | −18.5773 | DD[12] | | |
| *13 | 209.7570 | 1.8916 | 1.53500 | 55.73 |
| *14 | −547.4242 | 15.0000 | | |
| 15 (EP) | ∞ | | | |

TABLE 23

| | Example 8 | | |
|---|---|---|---|
| Diopter | −1 dpt | −4.5 dpt | 2.5 dpt |
| f | 15.21 | 15.21 | 15.21 |
| Apparent Field of View [°] | 45 | 43 | 48 |
| DD[4] | 1.47 | 0.31 | 2.63 |
| DD[12] | 1.31 | 2.47 | 0.15 |
| H | 6.43 | | |

TABLE 24

| | | Example 8 | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −2.0227066E−04 | −1.0974583E−04 | −2.9102792E−04 | 1.3305178E−04 |
| A6 | 5.3805852E−06 | 3.0884533E−06 | 4.4955395E−07 | 3.5660732E−06 |
| A8 | 5.0433976E−07 | 1.7417471E−07 | 1.4250681E−07 | −8.7733430E−08 |
| A10 | −6.1481300E−09 | −5.7025305E−10 | −6.3239390E−09 | 7.3338441E−10 |
| A12 | −6.1400063E−11 | −2.4850414E−11 | 8.9956886E−11 | 8.2187460E−12 |
| A14 | 5.5708819E−13 | −3.9827486E−13 | 7.7508053E−13 | −7.4642986E−14 |
| A16 | 3.0861363E−14 | 4.5682930E−15 | −3.7606534E−14 | −1.8910280E−15 |
| A18 | −6.4607590E−17 | 1.8066755E−16 | 4.0231316E−16 | 2.1785102E−17 |
| A20 | −4.2351285E−18 | −1.6440337E−18 | −1.4396569E−18 | −3.4817158E−20 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −3.9286908E−05 | −1.1032393E−04 | 3.4770783E−04 | 2.7139482E−05 |
| A6 | 8.5949193E−06 | 6.1459699E−07 | −5.5589883E−07 | 2.9587324E−06 |
| A8 | −2.3921721E−07 | −3.2743461E−09 | −2.6106281E−08 | −1.7993773E−08 |
| A10 | 3.4308362E−09 | 1.6253213E−11 | −1.8939122E−11 | −1.0097038E−10 |
| A12 | −1.1144776E−11 | 2.0023210E−13 | −6.3219601E−13 | 7.7148483E−13 |
| A14 | −3.6097993E−13 | −2.7503385E−15 | 2.8735051E−15 | 4.2894216E−15 |
| A16 | 2.0182395E−15 | −1.1812008E−18 | 9.7620405E−18 | 6.1030176E−18 |
| A18 | 3.8065225E−17 | 3.4759110E−19 | 7.7745046E−20 | −5.5502737E−19 |
| A20 | −2.9650944E−19 | −1.7966279E−21 | −3.4317833E−22 | 2.2644560E−21 |

| Sn | 11 | 12 | 13 | 14 |
|---|---|---|---|---|
| KA | 1.0000000E+00 | 1.0000000E+00 | 1.0000000E+00 | 1.0000000E+00 |
| A4 | −2.4680820E−04 | −9.9892498E−05 | 1.0358725E−04 | 7.5230505E−05 |
| A6 | 1.5604278E−06 | −1.3231304E−06 | 2.0124541E−07 | 1.3139467E−06 |
| A8 | −1.9611002E−08 | 2.4825833E−08 | −5.7656846E−09 | −2.4199401E−08 |
| A10 | 2.0511402E−10 | −1.3236984E−10 | 1.0806502E−11 | 1.6126119E−10 |
| A12 | −1.7059595E−13 | −1.7196905E−13 | 3.5178123E−13 | −9.9552595E−13 |
| A14 | −6.4729986E−15 | 7.2948657E−15 | 3.7702683E−16 | 4.4632077E−14 |
| A16 | 2.9863517E−17 | −2.0458298E−17 | 1.2824105E−17 | −6.9905967E−16 |
| A18 | −1.0187471E−19 | −2.1890200E−19 | 5.6828636E−19 | 7.4818620E−18 |
| A20 | 3.7531965E−22 | 1.0092019E−21 | −5.2326999E−21 | −3.3133392E−20 |

Example 9

Figure 17:
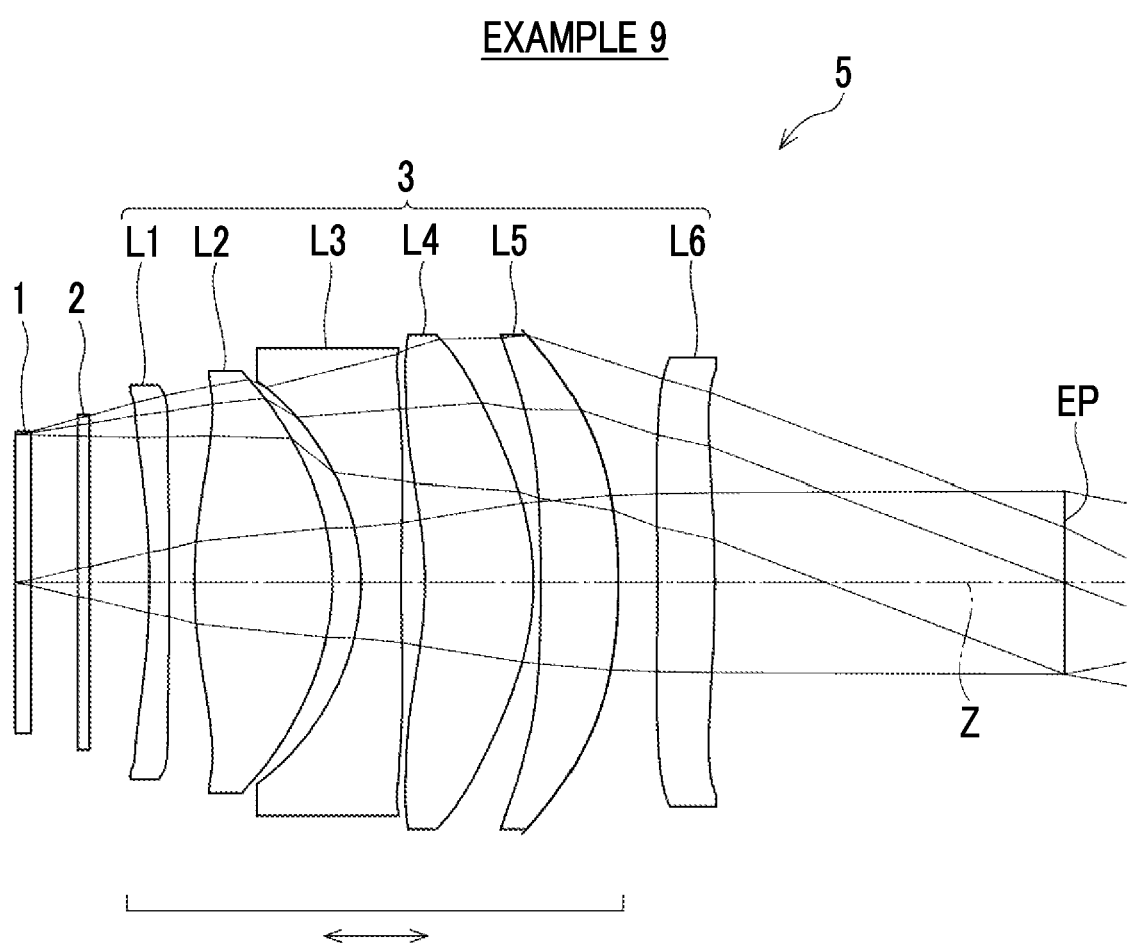
FIG. 17 is a cross-sectional view illustrating a configuration and luminous flux of an observation optical system of Example 9.

FIG. 17 illustrates a configuration and luminous flux of the observation optical system 5 of Example 9. The observation optical system 5 of Example 9 comprises the display element 1, the optical member 2, and the eyepiece lens 3 in order from the display element side to the eyepoint side. The eyepiece lens 3 consists of the lens L1 having negative refractive power, the lens L2 having positive refractive power, the lens L3 having negative refractive power, the lens L4 having positive refractive power, the lens L5 having positive refractive power, and the lens L6 having positive refractive power in order from the display element side to the eyepoint side. During the diopter adjustment, the lens L1, the lens L2, the lens L3, the lens L4, and the lens L5 move as a single body along the optical axis Z.

Figure 18:
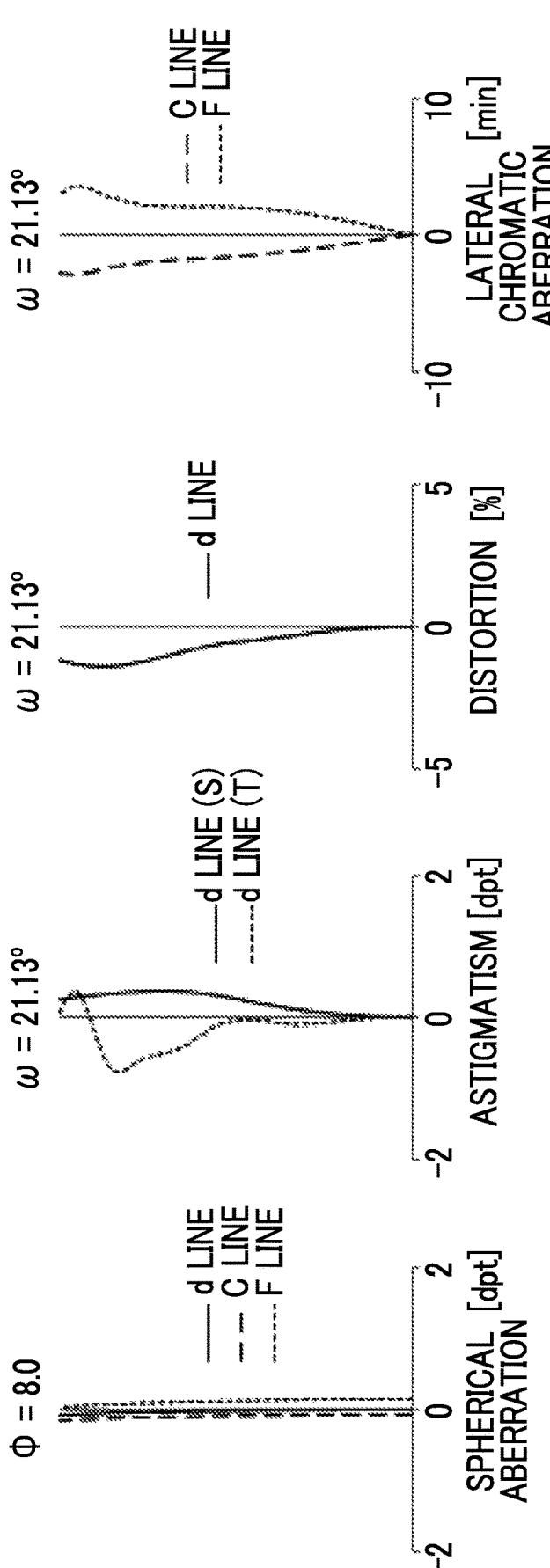
FIG. 18 illustrates various aberration diagrams of the observation optical system of Example 9.

For the observation optical system 5 of Example 9, basic lens data is shown in Table 25, specifications and variable surface spacing are shown in Table 26, aspherical coefficients are shown in Table 27, and various aberration diagrams in a state where the diopter is −0.97 diopter are illustrated in FIG. 18.

TABLE 25

| | | Example 9 | | |
|---|---|---|---|---|
| Sn | R | D | Nd | vd |
| 1 | ∞ | 0.7000 | 1.51900 | 64.90 |
| 2 | ∞ | 2.0000 | | |

TABLE 25-continued

| | | Example 9 | | |
|---|---|---|---|---|
| Sn | R | D | Nd | vd |
| 3 | ∞ | 0.5000 | 1.51900 | 64.90 |
| 4 | ∞ | DD[4] | | |
| *5 | −36.1942 | 0.8432 | 1.51600 | 52.00 |
| *6 | −269.0697 | 1.0999 | | |
| *7 | 20.0811 | 5.9180 | 1.80435 | 47.57 |
| *8 | −10.8311 | 1.2229 | | |
| *9 | −10.3614 | 1.7268 | 1.63351 | 23.63 |
| *10 | 107.4639 | 1.0140 | | |
| *11 | −17.1391 | 4.6573 | 1.53500 | 55.73 |
| *12 | −12.3329 | 0.3000 | | |
| *13 | −137.7903 | 3.2963 | 1.53500 | 55.73 |
| *14 | −23.6044 | DD[14] | | |
| *15 | −225.3677 | 2.4625 | 1.55381 | 62.93 |
| *16 | −53.3744 | 15.0000 | | |
| 17 (EP) | ∞ | | | |

TABLE 26

| | Example 9 | | |
|---|---|---|---|
| Diopter | −1 dpt | −4.5 dpt | 2.5 dpt |
| f | 16.24 | 16.24 | 16.24 |
| Apparent Field of View [°] | 42 | 40 | 44 |
| DD[4] | 2.56 | 1.38 | 3.75 |
| DD[14] | 1.67 | 2.86 | 0.48 |
| H | 6.43 | | |

TABLE 27

| | Example 9 | | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | −2.7624015E−05 | 1.1654923E−05 | −1.7319591E−04 | 1.2233423E−04 |
| A6 | 5.4325480E−07 | −4.2519741E−08 | −1.7488363E−06 | 3.1481367E−06 |
| A8 | 1.2680658E−08 | 1.7083084E−09 | 1.4064307E−07 | −9.1737468E−08 |
| A10 | 1.4981048E−10 | −5.6983717E−12 | −6.1044344E−09 | 6.9914859E−10 |
| A12 | 3.5257276E−13 | 4.2414603E−13 | 8.8867436E−11 | 9.4636913E−12 |
| A14 | −2.1117819E−14 | 1.7823131E−14 | 7.6839454E−13 | −7.6437066E−14 |
| A16 | 2.3701719E−16 | −3.3558778E−16 | −3.7842467E−14 | −1.9485666E−15 |
| A18 | 9.3304260E−18 | −5.2450423E−18 | 4.0366936E−16 | 2.0965916E−17 |
| A20 | −3.0606653E−19 | −3.6226416E−21 | −1.4263051E−18 | −2.7108790E−20 |

| Sn | 9 | 10 | 11 | 12 |
|---|---|---|---|---|
| KA | 1.0000000E+00 | 1.0000000E+00 | 1.0000000E+00 | 1.0000000E+00 |
| A4 | −1.0242772E−04 | −1.3055557E−04 | 3.4075088E−04 | 4.7281386E−05 |
| A6 | 8.8923831E−06 | 6.0549969E−07 | −6.6849417E−07 | 2.9482377E−06 |
| A8 | −2.3823740E−07 | −2.1716045E−09 | −1.7977006E−09 | −1.7538090E−08 |
| A10 | 3.5918092E−09 | 2.2797029E−11 | −1.3737364E−11 | −9.1279566E−11 |
| A12 | −1.2421348E−11 | 2.4101392E−13 | −5.1947256E−13 | 7.0486351E−13 |
| A14 | −3.3896247E−13 | −2.5804425E−15 | 3.5212913E−15 | 4.2353492E−15 |
| A16 | 1.8340638E−15 | −7.1880219E−18 | 1.9972221E−17 | 3.8742486E−18 |
| A18 | 3.7330417E−17 | 3.2771703E−19 | 1.1410220E−20 | −5.0809627E−19 |
| A20 | −2.9491509E−19 | −1.1317198E−21 | −6.2709961E−22 | 2.1217606E−21 |

| Sn | 13 | 14 | 15 | 16 |
|---|---|---|---|---|
| KA | 1.0000000E+00 | 1.0000000E+00 | 1.0000000E+00 | 1.0000000E+00 |
| A4 | −1.9901375E−04 | −9.7630587E−05 | 5.8395346E−05 | 5.9463326E−05 |
| A6 | 1.4804424E−06 | −1.3914638E−06 | −9.9322876E−08 | 7.3107182E−07 |
| A8 | −1.9937546E−08 | 2.4840768E−08 | 1.0959339E−10 | −1.0973086E−08 |
| A10 | 2.0756109E−10 | −1.3698286E−10 | 6.8471718E−13 | 1.2317126E−10 |
| A12 | −1.9984963E−13 | −1.7676741E−13 | 2.5714206E−13 | −1.4699280E−12 |
| A14 | −6.6828752E−15 | 7.4114735E−15 | 1.2158295E−15 | 3.8424169E−14 |
| A16 | 2.6198774E−17 | −2.0292888E−17 | 7.9440428E−18 | −6.0492275E−16 |
| A18 | −8.4708346E−20 | −2.2455825E−19 | 2.0638927E−19 | 6.9651644E−18 |
| A20 | 3.9922937E−22 | 1.0056000E−21 | −3.3580058E−21 | −3.3897042E−20 |

Example 10

Figure 19:
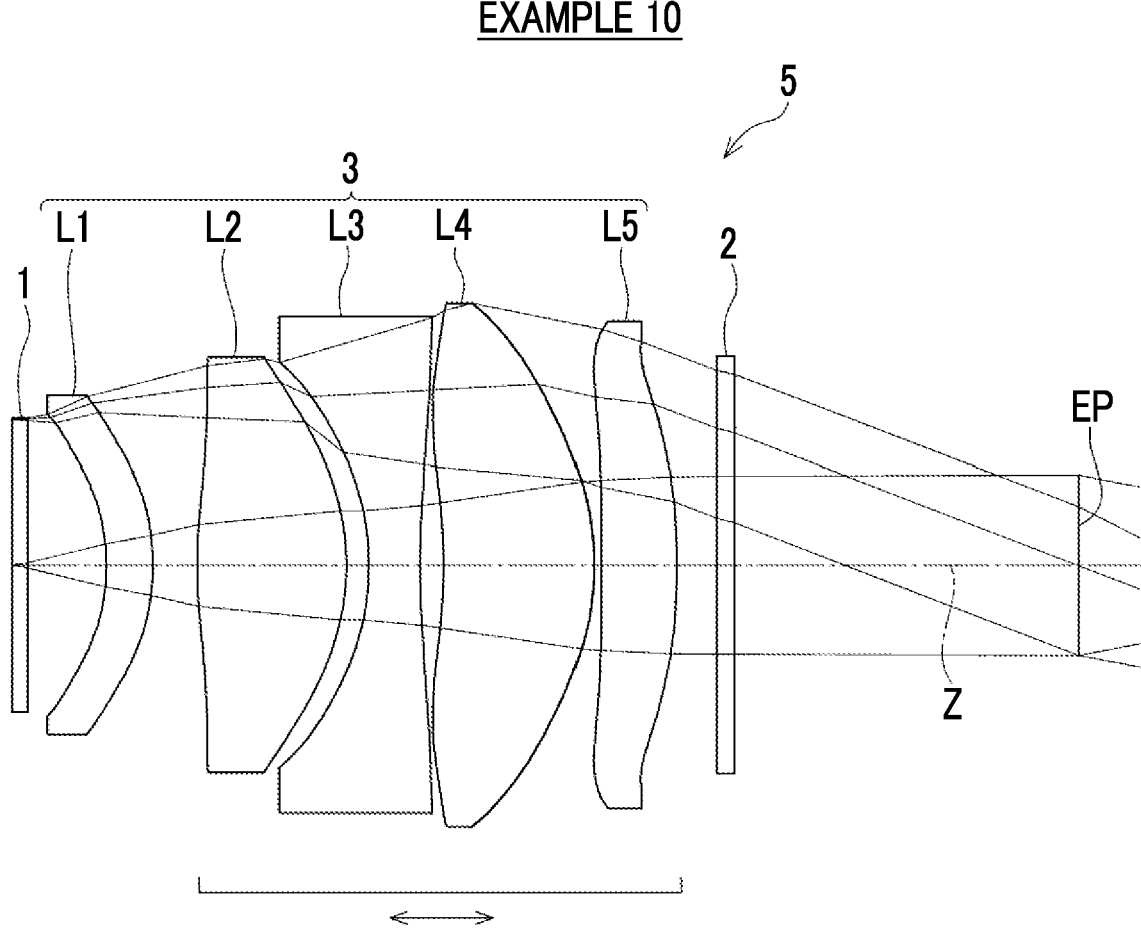
FIG. 19 is a cross-sectional view illustrating a configuration and luminous flux of an observation optical system of Example 10.

FIG. 19 illustrates a configuration and luminous flux of the observation optical system 5 of Example 10. The observation optical system 5 of Example 10 comprises the display element 1, the eyepiece lens 3, and the optical member 2 in order from the display element side to the eyepoint side. The eyepiece lens 3 consists of the lens L1 having negative refractive power, the lens L2 having positive refractive power, the lens L3 having negative refractive power, the lens L4 having positive refractive power, and the lens L5 having positive diopter adjustment, the lens L2, the lens L3, the lens L4, and the lens L5 move as a single along the optical axis Z.

Figure 20:
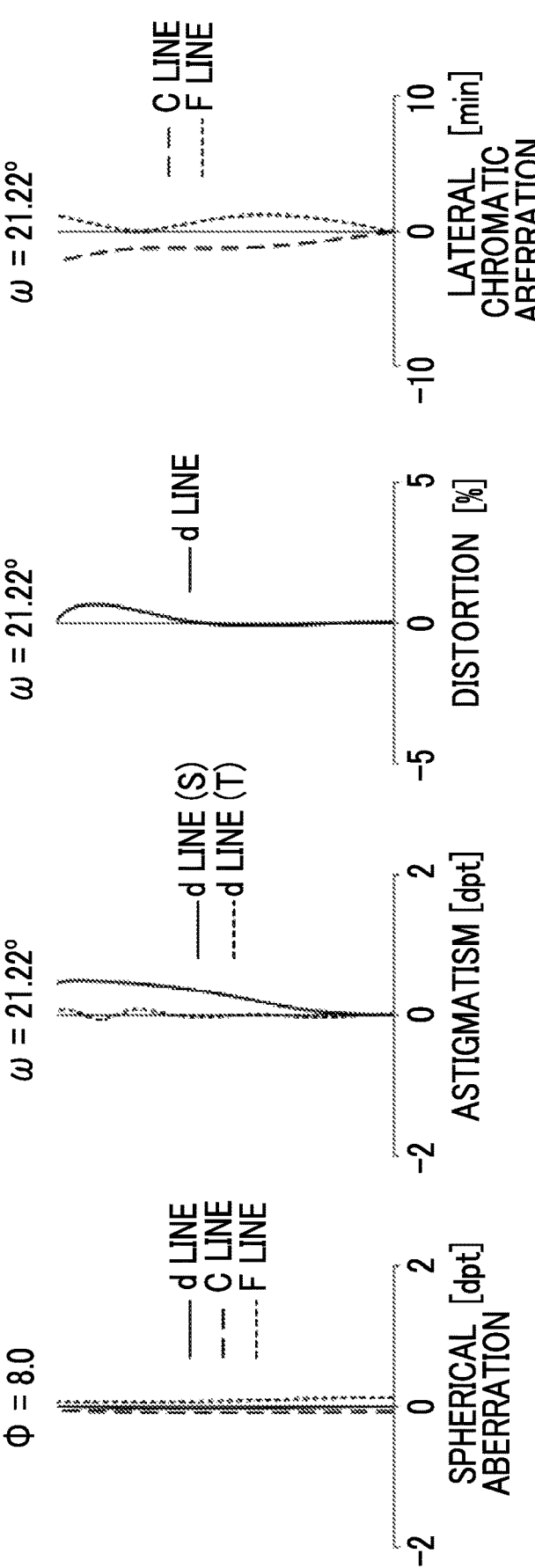
FIG. 20 illustrates various aberration diagrams of the observation optical system of Example 10.

For the observation optical system 5 of Example 10, basic lens data is shown in Table 28, specifications and variable surface spacing are shown in Table 29, aspherical coefficients are shown in Table 30, and various aberration diagrams in a state where the diopter is −0.97 diopter are illustrated in FIG. 20.

TABLE 28

| | Example 10 | | | |
|---|---|---|---|---|
| Sn | R | D | Nd | vd |
| 1 | ∞ | 0.7000 | 1.51900 | 64.90 |
| 2 | ∞ | 3.4144 | | |
| *3 | −10.3317 | 2.0452 | 1.72924 | 53.85 |
| *4 | −11.4140 | DD[4] | | |

TABLE 28-continued

| | Example 10 | | | |
|---|---|---|---|---|
| Sn | R | D | Nd | vd |
| *5 | 24.1383 | 6.5000 | 1.76709 | 49.20 |
| *6 | −11.2332 | 0.9636 | | |
| *7 | −12.5284 | 2.2442 | 1.63351 | 23.63 |
| *8 | 43.9034 | 1.0278 | | |
| *9 | −21.2966 | 6.5363 | 1.53500 | 55.73 |
| *10 | −12.4793 | 0.3000 | | |
| *11 | 1145.4705 | 3.2941 | 1.53500 | 55.73 |
| *12 | −30.3380 | DD[12] | | |
| 13 | ∞ | 0.8000 | 1.51680 | 64.20 |
| 14 | ∞ | 15.0000 | | |
| 15 (EP) | ∞ | | | |

TABLE 29

| | Example 10 | | |
|---|---|---|---|
| Diopter | −1 dpt | −4.5 dpt | 2.5 dpt |
| f | 16.20 | 16.20 | 16.20 |
| Apparent Field of View [°] | 42 | 41 | 44 |
| DD[4] | 1.94 | 0.61 | 3.28 |
| DD[12] | 1.72 | 3.06 | 0.39 |
| H | 6.43 | | |

TABLE 30

| | | Example 10 | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −4.2886912E−04 | −4.3201879E−04 | −3.4382197E−04 | −2.2552824E−05 |
| A6 | −2.4822302E−05 | −5.2612470E−06 | 6.0223800E−07 | 5.0581621E−06 |
| A8 | 2.2600116E−06 | 7.1352751E−07 | 1.4891437E−07 | −9.7565936E−08 |
| A10 | −3.9022658E−08 | −1.0362661E−08 | −6.2386248E−09 | 7.8052678E−10 |
| A12 | −2.0112726E−10 | −2.2208069E−11 | 8.9840778E−11 | 8.8242645E−12 |
| A14 | 7.9893660E−12 | 1.2721294E−12 | 7.6381402E−13 | −7.1781667E−14 |
| A16 | 4.1761714E−14 | −4.2551149E−15 | −3.7652672E−14 | −1.9204857E−15 |
| A18 | −1.1321258E−15 | −8.3110051E−17 | 4.0201326E−16 | 2.0059542E−17 |
| A20 | −5.5933283E−18 | 7.3942093E−19 | −1.4332195E−18 | −2.8137744E−20 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −3.0083678E−04 | −1.1188472E−04 | 3.2401325E−04 | 8.8862967E−06 |
| A6 | 1.2789712E−05 | 6.6139448E−07 | −5.2328921E−07 | 2.9281244E−06 |
| A8 | −2.6301946E−07 | −3.2411811E−09 | −1.6645537E−09 | −1.7143476E−08 |
| A10 | 3.3897964E−09 | 1.3512330E−11 | −9.8263221E−12 | −9.8377415E−11 |
| A12 | −1.1271902E−11 | 1.4593529E−13 | −5.6300179E−13 | 7.8225005E−13 |
| A14 | −3.2068469E−13 | −3.1994800E−15 | 3.3303067E−15 | 4.2845221E−15 |
| A16 | 2.0435456E−15 | −4.3200085E−18 | 1.1567657E−17 | 6.2614134E−18 |
| A18 | 2.7258825E−17 | 3.4478869E−19 | 6.2128385E−20 | −5.5092474E−19 |
| A20 | −2.2741969E−19 | −1.5178937E−21 | −7.9067816E−22 | 2.2985707E−21 |

| Sn | 11 | 12 |
|---|---|---|
| KA | 1.0000000E+00 | 1.0000000E+00 |
| A4 | −1.6537643E−04 | −7.9271633E−05 |
| A6 | 1.8453507E−06 | −7.7840666E−07 |
| A8 | −1.9148326E−08 | 2.3438193E−08 |
| A10 | 2.0386720E−10 | −1.0193160E−10 |
| A12 | −1.7386284E−13 | 3.4001276E−14 |
| A14 | −6.2797010E−15 | 6.9877215E−15 |
| A16 | 3.3830355E−17 | −3.0877633E−17 |
| A18 | −8.4302006E−20 | −2.5411910E−19 |
| A20 | 3.0239213E−22 | 2.3677677E−21 |

Example 11

Figure 21:
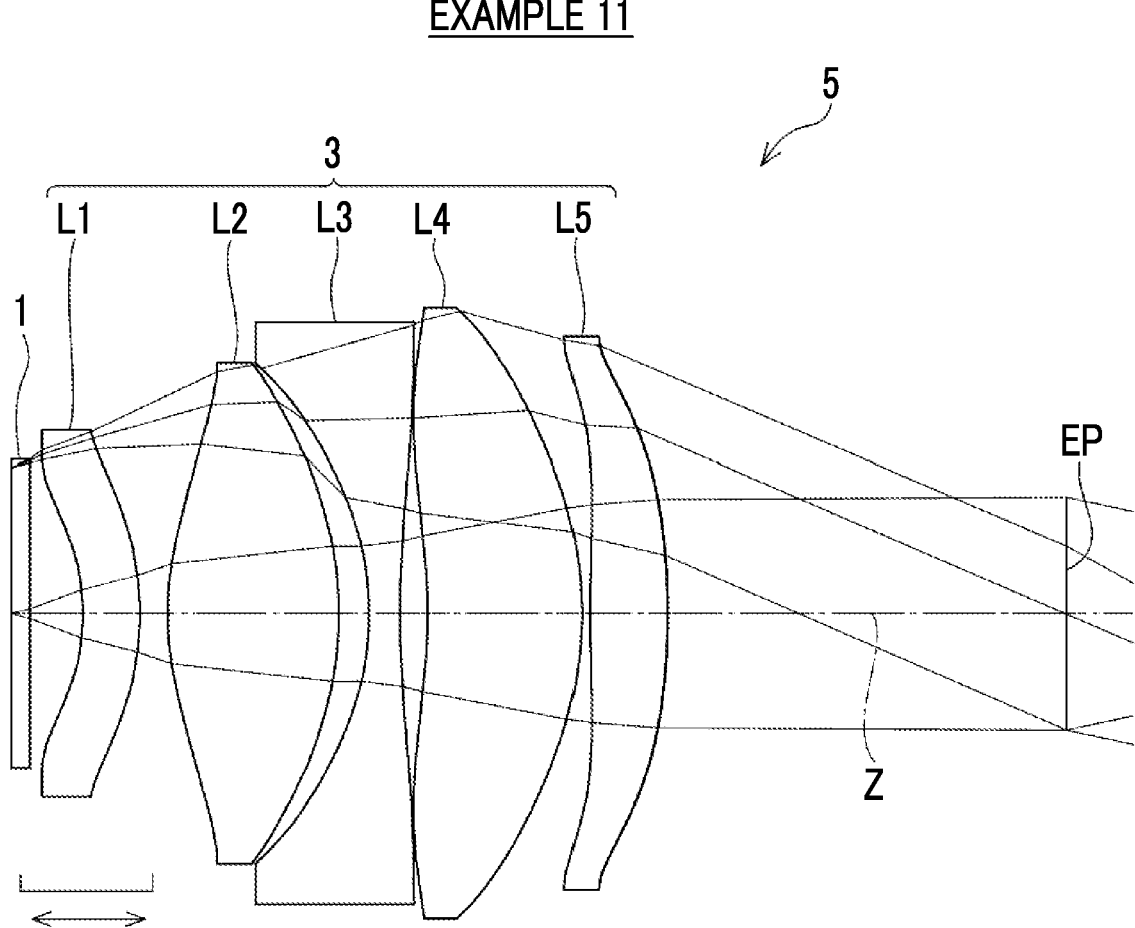
FIG. 21 is a cross-sectional view illustrating a configuration and luminous flux of an observation optical system of Example 11.

FIG. 21 illustrates a configuration and luminous flux of the observation optical system 5 of Example 11. The observation optical system 5 of Example 11 comprises the display element 1 and the eyepiece lens 3 in order from the display element side to the eyepoint side. The eyepiece lens 3 consists of the lens L1 having negative refractive power, the lens L2 having positive refractive power, the lens L3 having negative refractive power, the lens L4 having positive refractive power, and the lens L5 having positive refractive power in order from the display element side to the eyepoint side. During the diopter adjustment, the display element 1 and the lens L1 move as a single body along the optical axis Z.

Figure 22:
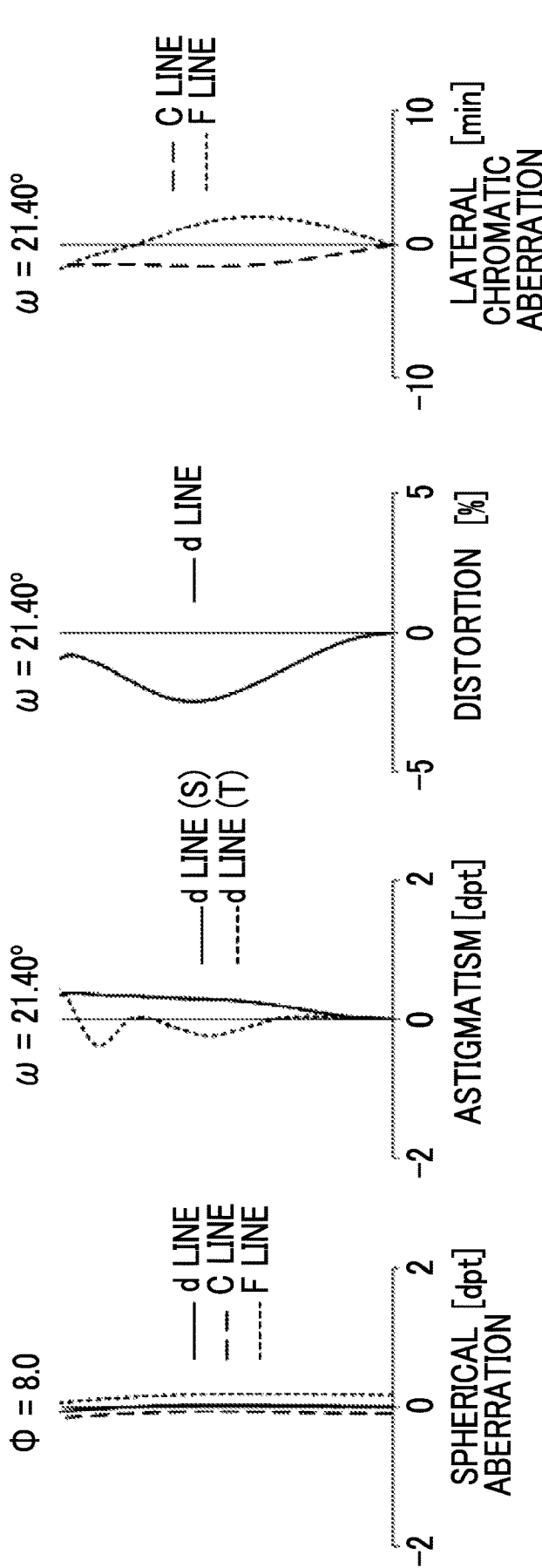
FIG. 22 illustrates various aberration diagrams of the observation optical system of Example 11.

For the observation optical system 5 of Example 11, basic lens data is shown in Table 31, specifications and variable surface spacing are shown in Table 32, aspherical coefficients are shown in Table 33, and various aberration diagrams in a state where the diopter is −0.97 diopter are illustrated in FIG. 22.

TABLE 31

| | | Example 11 | | |
|---|---|---|---|---|
| Sn | R | D | Nd | vd |
| 1 | ∞ | 0.7000 | 1.51900 | 64.90 |
| 2 | ∞ | 2.0000 | | |
| *3 | −6.9308 | 2.1409 | 1.72924 | 53.85 |

TABLE 31-continued

| | | Example 11 | | |
|---|---|---|---|---|
| Sn | R | D | Nd | vd |
| *4 | −9.1353 | DD[4] | | |
| *5 | 9.9226 | 6.4342 | 1.76709 | 49.20 |
| *6 | −11.3667 | 1.1262 | | |
| *7 | −9.3346 | 1.1805 | 1.63351 | 23.63 |
| *8 | 35.6651 | 1.0090 | | |
| *9 | −20.1960 | 5.7824 | 1.53500 | 55.73 |
| *10 | −12.1134 | 0.3000 | | |
| *11 | 53.9462 | 2.8991 | 1.53500 | 55.73 |
| *12 | −24.4645 | 15.0000 | | |
| 13 (EP) | ∞ | | | |

TABLE 32

| | Example 11 | | |
|---|---|---|---|
| Diopter | −1 dpt | −4.5 dpt | 2.5 dpt |
| f | 12.31 | 12.31 | 12.31 |
| Apparent Field of View [°] | 43 | 45 | 41 |
| DD[4] | 1.04 | 1.81 | 0.28 |
| H | 5.03 | | |

TABLE 33

| | | Example 11 | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −5.0960711E−04 | 5.2160402E−05 | −5.8714920E−04 | 1.3054128E−05 |
| A6 | 3.3618142E−05 | −2.4526828E−06 | 6.1015329E−08 | 4.6734885E−06 |
| A8 | 1.8527522E−06 | 5.8204341E−07 | 1.4660608E−07 | −1.0765474E−07 |
| A10 | −1.8397272E−09 | −8.1201621E−09 | −6.3904643E−09 | 8.8480490E−10 |
| A12 | −1.5565707E−09 | −8.5600588E−11 | 9.0225842E−11 | 9.6334413E−12 |
| A14 | 1.3734280E−11 | 1.7022831E−12 | 7.8125012E−13 | −7.5714689E−14 |
| A16 | 4.1488497E−13 | 5.0681460E−14 | −3.7590504E−14 | −2.0341801E−15 |
| A18 | −1.8592565E−14 | 6.7131886E−16 | 4.0241547E−16 | 1.8428358E−17 |
| A20 | 2.7558779E−16 | −3.1946110E−17 | −1.5077838E−18 | −2.0756263E−20 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −8.5709359E−05 | −1.2629205E−04 | 3.3875533E−04 | −9.4990018E−06 |
| A6 | 1.2949907E−05 | 5.2111988E−07 | −5.0654763E−07 | 3.0662758E−06 |
| A8 | −2.7652578E−07 | −3.7225431E−09 | −1.7039295E−09 | −1.7991841E−08 |
| A10 | 3.7434086E−09 | 1.4300120E−11 | −1.1769829E−11 | −9.7013964E−11 |
| A12 | −1.4926636E−11 | 1.6679204E−13 | −5.7937462E−13 | 7.7722975E−13 |
| A14 | −2.8965424E−13 | −2.9734237E−15 | 3.1918001E−15 | 4.2492842E−15 |
| A16 | 1.7369526E−15 | −2.1011719E−18 | 1.1230485E−17 | 7.2485173E−18 |
| A18 | 3.4635123E−17 | 3.5486716E−19 | 7.4287891E−20 | −5.5682941E−19 |
| A20 | −2.5464364E−19 | −1.5000986E−21 | −7.2020313E−22 | 2.2521823E−21 |

| Sn | 11 | 12 |
|---|---|---|
| KA | 1.0000000E+00 | 1.0000000E+00 |
| A4 | −3.4752189E−04 | −1.7453184E−04 |
| A6 | 7.1848947E−07 | −8.9236765E−07 |
| A8 | −1.4986711E−08 | 1.8647489E−08 |
| A10 | 2.4917094E−10 | −7.1292749E−11 |
| A12 | 1.8274853E−13 | 3.9209856E−13 |
| A14 | −3.8232061E−15 | 9.4961990E−15 |
| A16 | 4.5344149E−17 | −3.3209643E−17 |
| A18 | −1.0069226E−19 | −2.8849959E−19 |
| A20 | −1.8749000E−21 | 5.2694285E−21 |

Example 12

Figure 23:
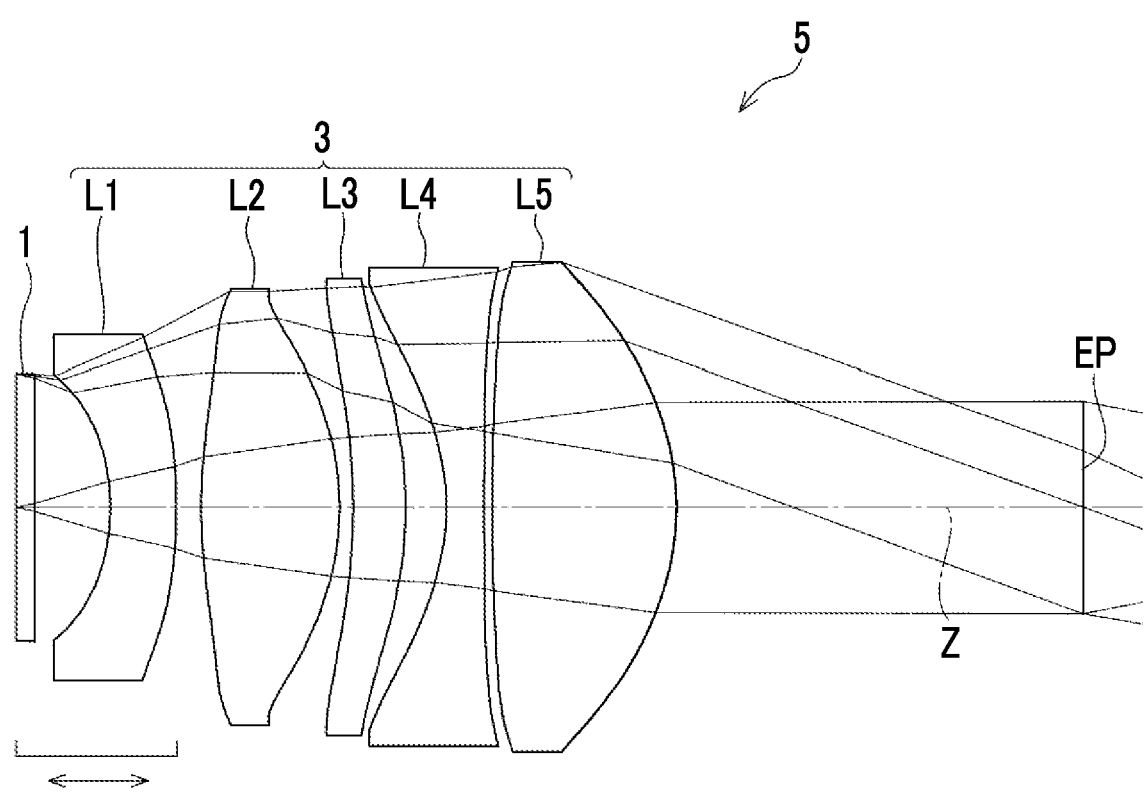
FIG. 23 is a cross-sectional view illustrating a configuration and luminous flux of an observation optical system of Example 12.

FIG. 23 illustrates a configuration and luminous flux of the observation optical system 5 of Example 12. The observation optical system 5 of Example 12 comprises the display element 1 and the eyepiece lens 3 in order from the display element side to the eyepoint side. The eyepiece lens 3 consists of the lens L1 having negative refractive power, the lens L2 having positive refractive power, the lens L3 having positive refractive power, the lens L4 having negative refractive power, and the lens L5 having positive refractive power in order from the display element side to the eyepoint side. During the diopter adjustment, the display element 1 and the lens L1 move as a single body along the optical axis Z.

Figure 24:
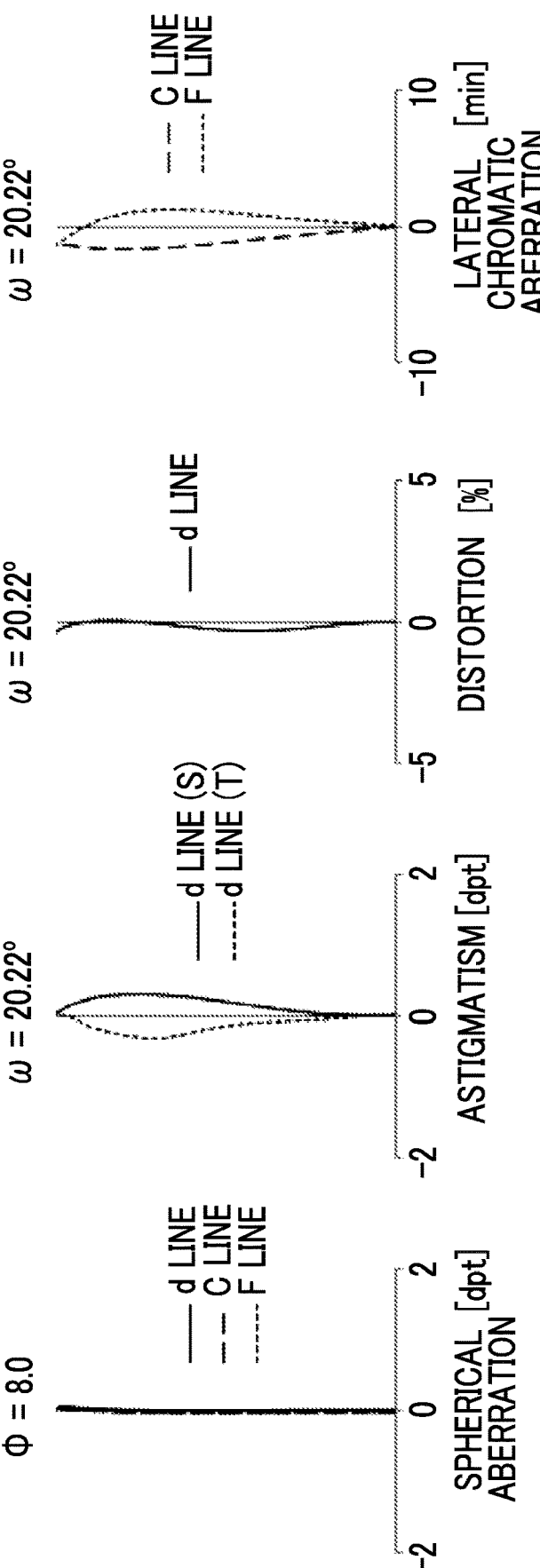
FIG. 24 illustrates various aberration diagrams of the observation optical system of Example 12.

For the observation optical system 5 of Example 12, basic lens data is shown in Table 34, specifications and variable surface spacing are shown in Table 35, aspherical coefficients are shown in Table 36, and various aberration diagrams in a state where the diopter is −0.96 diopter are illustrated in FIG. 24.

TABLE 34

| | | Example 12 | | |
|---|---|---|---|---|
| Sn | R | D | Nd | vd |
| 1 | ∞ | 0.7000 | 1.51900 | 64.90 |
| 2 | ∞ | 2.7718 | | |
| *3 | −8.8141 | 2.4564 | 1.80001 | 25.00 |

TABLE 34-continued

| | | Example 12 | | |
|---|---|---|---|---|
| Sn | R | D | Nd | vd |
| *4 | −23.6290 | DD[4] | | |
| *5 | 18.4200 | 5.1102 | 1.80001 | 48.00 |
| *6 | −10.5269 | 0.5000 | | |
| *7 | −23.2120 | 1.9271 | 1.53500 | 55.73 |
| *8 | −16.1863 | 1.5000 | | |
| *9 | −9.2666 | 1.4000 | 1.63351 | 23.63 |
| *10 | −9123.6193 | 0.3000 | | |
| *11 | 97.1805 | 6.7615 | 1.53500 | 55.73 |
| *12 | −10.3642 | 15.0000 | | |
| 13 (EP) | ∞ | | | |

TABLE 35

| | Example 12 | | |
|---|---|---|---|
| Diopter | −1 dpt | −4.5 dpt | 2.5 dpt |
| f | 13.32 | 13.32 | 13.32 |
| Apparent Field of View [°] | 40 | 42 | 39 |
| DD[4] | 0.90 | 1.38 | 0.29 |
| H | 5.03 | | |

TABLE 36

| | | Example 12 | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −9.5849614E−04 | −5.2407173E−04 | −4.0053261E−04 | 1.9405536E−04 |
| A6 | 3.6338658E−05 | 1.4323000E−05 | 6.1009411E−07 | −2.7657993E−06 |
| A8 | −9.0928932E−07 | −2.8425053E−07 | 2.9001627E−08 | 4.5744196E−08 |
| A10 | −5.1452112E−09 | −2.4057992E−09 | −1.5354647E−10 | −1.0951038E−10 |
| A12 | −4.4418629E−09 | 1.9475758E−10 | 8.8372394E−12 | 8.1028568E−13 |
| A14 | 2.7858802E−10 | 1.0129619E−12 | −3.2384248E−14 | −3.0076134E−15 |
| A16 | −4.2500462E−12 | −5.5071171E−14 | −2.9642572E−16 | 5.3186802E−16 |
| A18 | 2.1721950E−14 | −6.3568693E−16 | −6.7828947E−18 | 3.8392050E−18 |
| A20 | −1.2414409E−15 | 1.2994484E−17 | 6.7838433E−20 | 4.8789702E−20 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | 8.3783966E−05 | 2.5487422E−05 | 2.7163523E−04 | 9.7487114E−05 |
| A6 | 2.1492009E−07 | 1.7406600E−06 | 1.9647159E−06 | −3.9665413E−07 |
| A8 | 3.3844385E−09 | 3.7391211E−09 | 1.7112849E−08 | −2.7057853E−09 |
| A10 | −1.7808238E−11 | 6.7130316E−12 | −5.4703184E−11 | 3.7991517E−11 |
| A12 | −5.3648627E−13 | 7.9717645E−13 | −5.2497292E−12 | 4.4172648E−13 |
| A14 | 6.7051042E−16 | 1.5023763E−14 | 1.0131745E−13 | 4.8353164E−16 |
| A16 | 1.2178621E−17 | −6.0338587E−16 | −1.2534155E−16 | −1.4470865E−17 |
| A18 | 7.3478788E−19 | 2.0286595E−18 | 2.3267520E−18 | −1.2668209E−19 |
| A20 | 2.2622977E−20 | −7.4086135E−21 | −3.7935725E−20 | −1.4794399E−21 |

| Sn | 11 | 12 |
|---|---|---|
| KA | 1.0000000E+00 | 1.0000000E+00 |
| A4 | −3.3591151E−05 | 8.6655399E−05 |
| A6 | 5.4857238E−07 | 6.3246345E−07 |
| A8 | 2.9995759E−09 | 1.0544947E−09 |
| A10 | 2.3357807E−11 | 6.1014977E−13 |
| A12 | 2.2341446E−13 | 5.6629625E−13 |
| A14 | −4.8311079E−15 | 2.3064677E−15 |
| A16 | 5.4108623E−17 | 2.1314858E−18 |
| A18 | −6.1717360E−20 | −1.4996901E−19 |
| A20 | −4.4483492E−21 | 4.8795693E−21 |

Example 13

Figure 25:
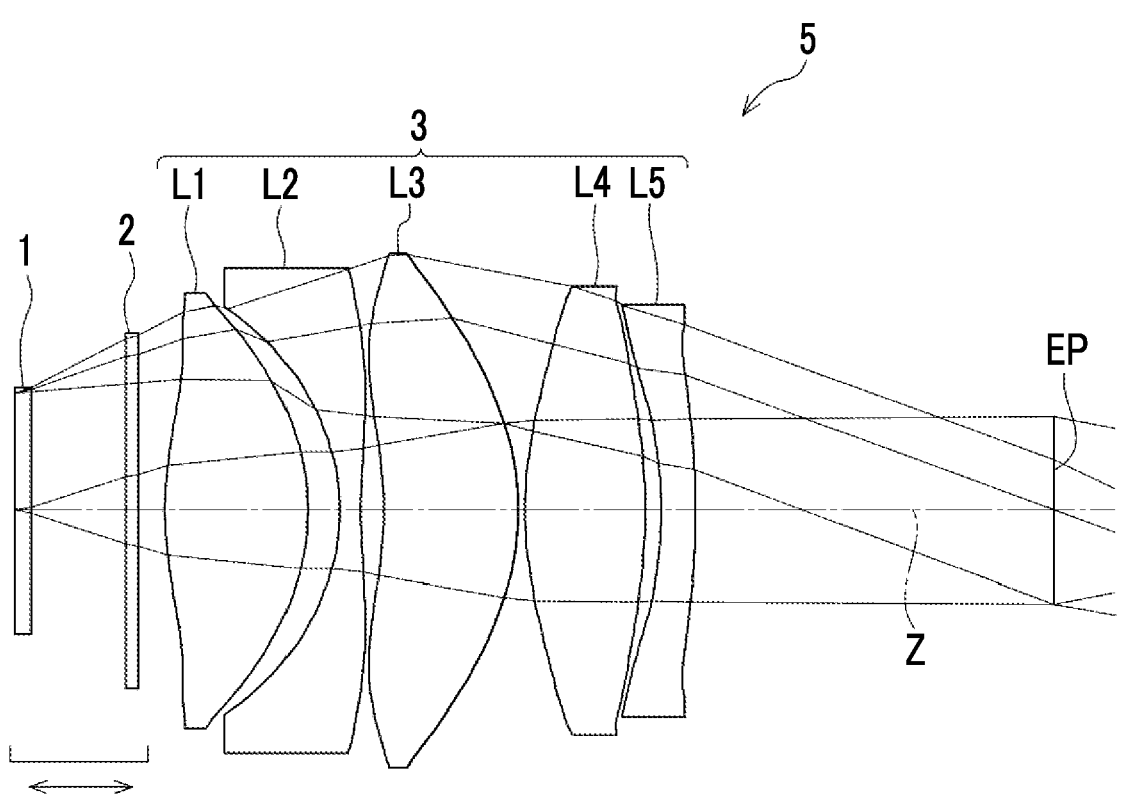
FIG. 25 is a cross-sectional view illustrating a configuration and luminous flux of an observation optical system of Example 13.

FIG. 25 illustrates a configuration and luminous flux of the observation optical system 5 of Example 13. The observation optical system 5 of Example 13 comprises the display element 1, the optical member 2, and the eyepiece lens 3 in order from the display element side to the eyepoint side. The eyepiece lens 3 consists of the lens L1 having positive refractive power, the lens L2 having negative refractive power, the lens L3 having positive refractive power, the lens L4 having positive refractive power, and the lens L5 having negative diopter adjustment, the display element 1 and the optical member 2 move as a single body along the optical axis Z.

Figure 26:
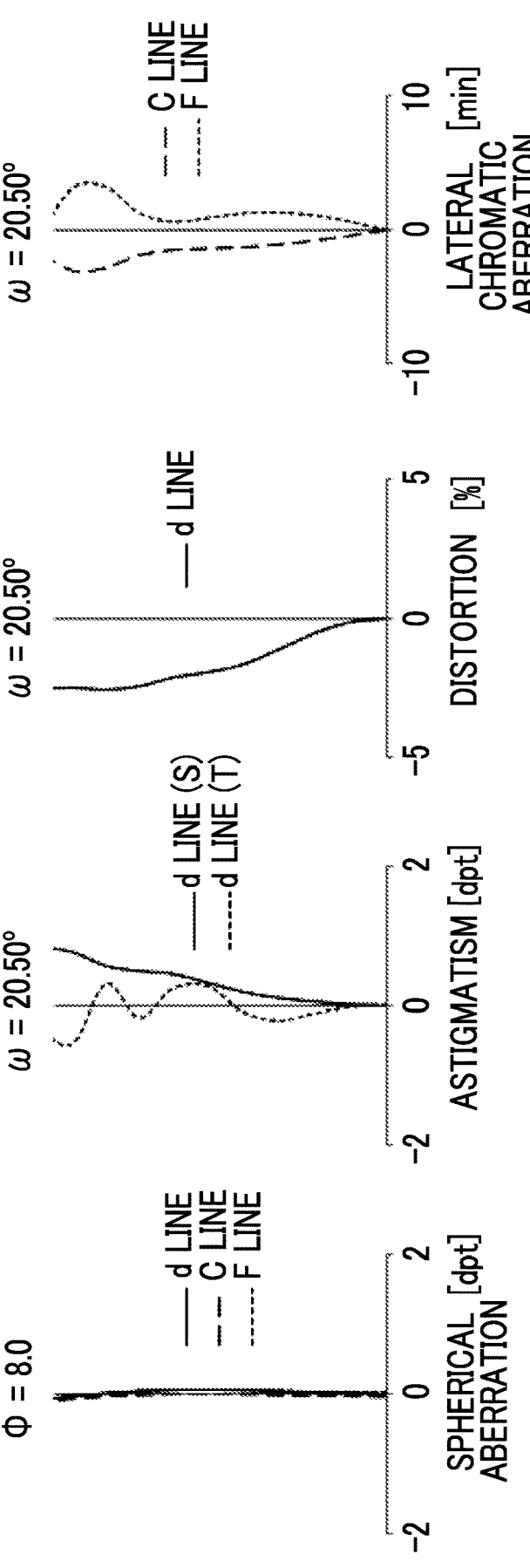
FIG. 26 illustrates various aberration diagrams of the observation optical system of Example 13.

For the observation optical system 5 of Example 13, basic lens data is shown in Table 37, specifications and variable surface spacing are shown in Table 38, aspherical coefficients are shown in Table 39, and various aberration diagrams in a state where the diopter is −0.99 diopter are illustrated in FIG. 26.

TABLE 37

| | | Example 13 | | |
|---|---|---|---|---|
| Sn | R | D | Nd | vd |
| 1 | ∞ | 0.7000 | 1.51900 | 64.90 |
| 2 | ∞ | 4.0000 | | |
| 3 | ∞ | 0.5000 | 1.51900 | 64.90 |
| 4 | ∞ | DD[4] | | |

TABLE 37-continued

| | | Example 13 | | |
|---|---|---|---|---|
| Sn | R | D | Nd | vd |
| *5 | 13.8177 | 5.9929 | 1.84088 | 43.91 |
| *6 | −10.5265 | 1.3225 | | |
| *7 | −9.4896 | 0.9000 | 1.63351 | 23.63 |
| *8 | 32.8866 | 0.9492 | | |
| *9 | −16.3989 | 5.6421 | 1.53500 | 55.73 |
| *10 | −12.3020 | 0.3000 | | |
| *11 | 16.6457 | 5.0472 | 1.53500 | 55.73 |
| *12 | −23.4484 | 0.6685 | | |
| *13 | −17.2761 | 1.4366 | 1.70000 | 30.00 |
| *14 | −37.4956 | 15.0000 | | |
| 15 (EP) | ∞ | | | |

TABLE 38

| | Example 13 | | |
|---|---|---|---|
| Diopter | −1 dpt | −4.5 dpt | 2.5 dpt |
| f | 12.84 | 12.84 | 12.84 |
| Apparent Field of View [°] | 41 | 44 | 39 |
| DD[4] | 1.10 | 1.89 | 0.31 |
| H | 5.03 | | |

TABLE 39

| | | Example 13 | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | −5.7869109E−04 | −4.9846539E−06 | −9.5419741E−05 | −3.4174496E−04 |
| A6 | 1.6569849E−06 | 4.4280494E−06 | 1.3022457E−05 | 1.0245779E−06 |
| A8 | 1.1209110E−07 | −6.8719650E−08 | −3.1868399E−07 | 1.2445836E−09 |
| A10 | −5.7404932E−09 | 1.4077734E−10 | 3.6637829E−09 | 4.4053617E−11 |
| A12 | 8.8340137E−11 | 1.0804835E−11 | −9.4776173E−12 | 2.5882852E−13 |
| A14 | 7.6976695E−13 | −4.4669422E−14 | −2.9535326E−13 | −3.1428518E−15 |
| A16 | −3.8019467E−14 | −1.8057089E−15 | 1.9663207E−15 | −1.3574756E−17 |
| A18 | 4.1028141E−16 | 1.9558953E−17 | 3.7310670E−17 | 8.0258244E−20 |
| A20 | −1.4852568E−18 | −3.7608213E−20 | −3.2756398E−19 | −7.3477938E−22 |

| Sn | 9 | 10 | 11 | 12 |
|---|---|---|---|---|
| KA | 1.0000000E+00 | 1.0000000E+00 | 1.0000000E+00 | 1.0000000E+00 |
| A4 | 4.2834776E−04 | −4.6966666E−05 | −2.4411398E−04 | 1.3362443E−04 |
| A6 | −5.4220705E−07 | 3.1741893E−06 | 2.6123817E−06 | −7.0766380E−07 |
| A8 | −1.9919442E−09 | −1.5847455E−08 | −2.9854744E−08 | 1.6973509E−08 |
| A10 | −1.1891058E−11 | −8.4743217E−11 | 1.7803332E−10 | −2.2990409E−10 |
| A12 | −5.0175583E−13 | 7.2141441E−13 | −3.2706408E−13 | −7.4940108E−13 |
| A14 | 2.8839505E−15 | 4.0726310E−15 | −3.2006822E−15 | 2.8799296E−15 |
| A16 | 1.2623797E−17 | −9.6161815E−19 | 1.9668773E−17 | 1.3653038E−16 |
| A18 | 5.0860428E−20 | −5.1754956E−19 | 5.6738810E−19 | −6.1823317E−19 |
| A20 | −7.0735010E−22 | 2.8138884E−21 | −1.0063779E−21 | 1.0056626E−20 |

| Sn | 13 | 14 |
|---|---|---|
| KA | 1.0000000E+00 | 1.0000000E+00 |
| A4 | 3.7913732E−05 | −5.7879470E−05 |
| A6 | 1.1257723E−06 | 1.8708033E−06 |
| A8 | −2.2477305E−09 | −8.2981751E−09 |
| A10 | 4.8247924E−11 | 2.9909819E−10 |
| A12 | 1.1420134E−12 | −2.8106781E−12 |
| A14 | 5.0187058E−15 | 1.0293290E−13 |
| A16 | −2.9019844E−16 | −9.0389418E−16 |
| A18 | −4.1382211E−18 | −1.2697912E−17 |
| A20 | 5.7187254E−20 | 1.6802666E−19 |

Example 14

Figure 27:
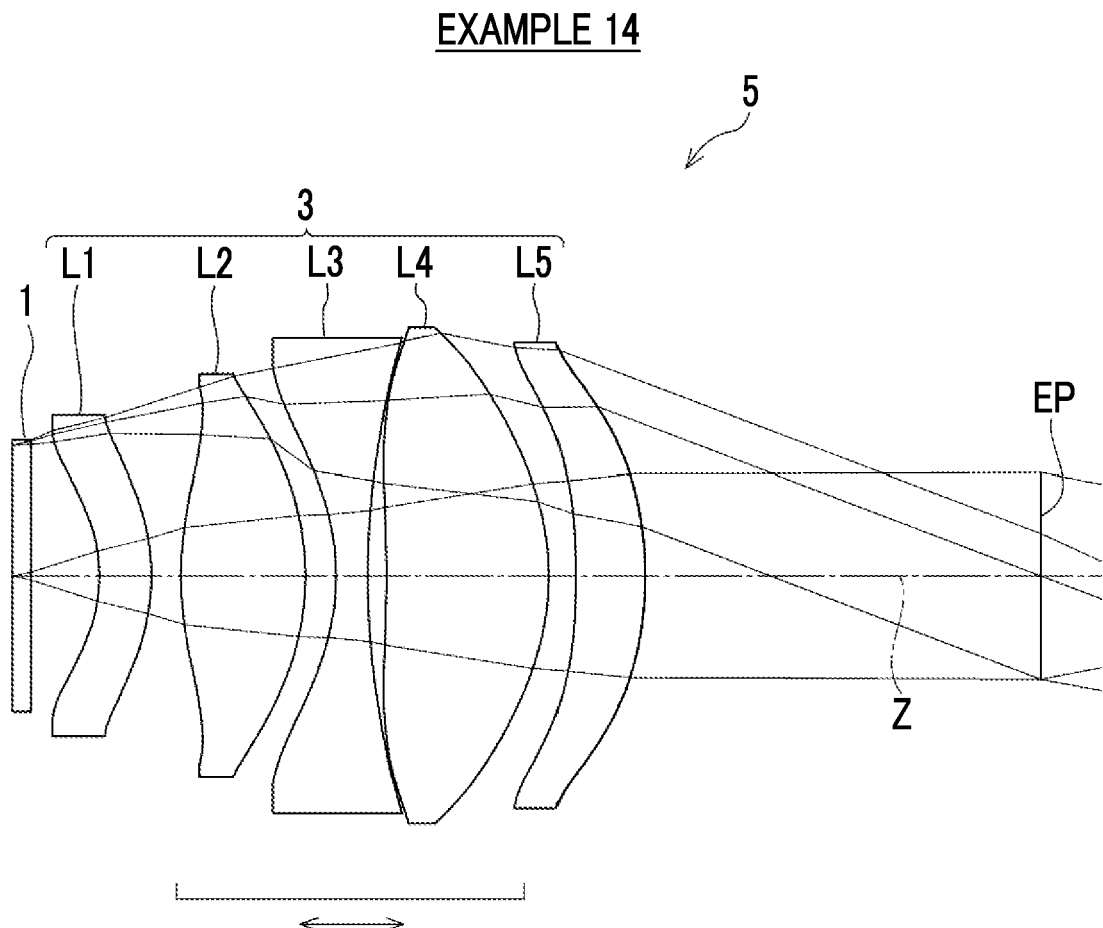
FIG. 27 is a cross-sectional view illustrating a configuration and luminous flux of an observation optical system of Example 14.

FIG. 27 illustrates a configuration and luminous flux of the observation optical system 5 of Example 14. The observation optical system 5 of Example 14 comprises the display element 1 and the eyepiece lens 3 in order from the display element side to the eyepoint side. The eyepiece lens 3 consists of the lens L1 having negative refractive power, the lens L2 having positive refractive power, the lens L3 having negative refractive power, the lens L4 having positive refractive power, and the lens L5 having positive refractive power in order from the display element side to the eyepoint side. During the diopter adjustment, the lens L2, the lens L3, and the lens L4 move as a single body along the optical axis Z.

Figure 28:
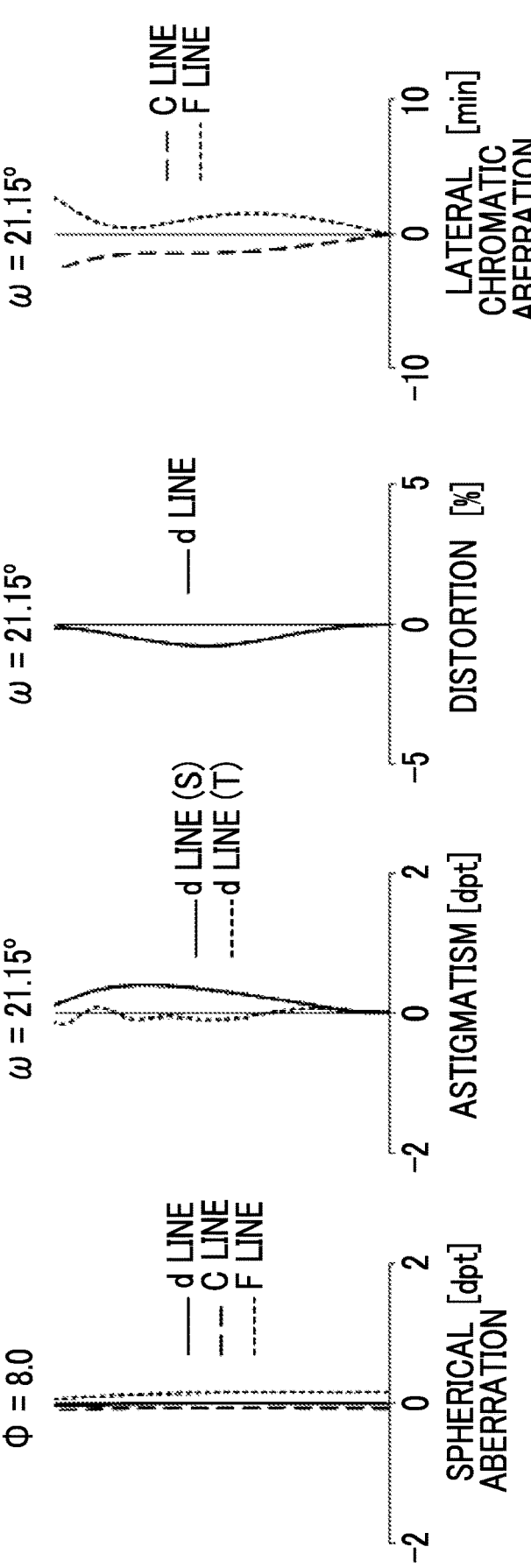
FIG. 28 illustrates various aberration diagrams of the observation optical system of Example 14.

For the observation optical system 5 of Example 14, basic lens data is shown in Table 40, specifications and variable surface spacing are shown in Table 41, aspherical coefficients are shown in Table 42, and various aberration diagrams in a state where the diopter is −0.99 diopter are illustrated in FIG. 28.

TABLE 40

| | | Example 14 | | |
|---|---|---|---|---|
| Sn | R | D | Nd | vd |
| 1 | ∞ | 0.7000 | 1.51900 | 64.90 |
| 2 | ∞ | 2.5911 | | |
| *3 | −6.3169 | 1.9731 | 1.72924 | 53.85 |

TABLE 40-continued

| | | Example 14 | | |
|---|---|---|---|---|
| Sn | R | D | Nd | vd |
| *4 | −8.5469 | DD[4] | | |
| *5 | 12.6475 | 4.7321 | 1.76709 | 49.20 |
| *6 | −10.5271 | 1.1540 | | |
| *7 | −9.8487 | 1.1952 | 1.63351 | 23.63 |
| *8 | 28.7405 | 0.7110 | | |
| *9 | −45.9241 | 6.1513 | 1.53500 | 55.73 |
| *10 | −10.7465 | DD[10] | | |
| *11 | −27.7903 | 2.6200 | 1.53500 | 55.73 |
| *12 | −14.6486 | 15.0000 | | |
| 13 (EP) | ∞ | | | |

TABLE 41

| | Example 14 | | |
|---|---|---|---|
| Diopter | −1 dpt | −4.5 dpt | 2.5 dpt |
| f | 12.81 | 12.81 | 12.81 |
| Apparent Field of View [°] | 42 | 40 | 45 |
| DD[4] | 1.12 | 0.28 | 1.96 |
| DD[10] | 1.00 | 1.84 | 0.16 |
| H | 5.03 | | |

TABLE 42

| | | Example 14 | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −9.0280655E−05 | 7.1255468E−05 | −4.6636787E−04 | 5.6185986E−05 |
| A6 | 7.1974952E−05 | 1.5766839E−05 | −3.1969090E−06 | 3.4831090E−06 |
| A8 | −8.6128340E−07 | −1.0253782E−07 | 1.5093068E−07 | −9.4693288E−08 |
| A10 | −8.3734847E−09 | 1.5577535E−09 | −6.2137862E−09 | 1.0800673E−09 |
| A12 | −9.8644607E−11 | −1.3128091E−10 | 9.2880786E−11 | 7.8456399E−12 |
| A14 | 1.0801250E−11 | 2.6543235E−12 | 7.8847759E−13 | −3.5492150E−14 |
| A16 | 2.4199428E−12 | −4.3457254E−14 | −3.8417884E−14 | −2.2643957E−15 |
| A18 | −9.3359188E−14 | 3.6108692E−15 | 3.9964927E−16 | 2.1392074E−17 |
| A20 | 8.9939386E−16 | −5.2748213E−17 | −1.7705520E−18 | −1.2564760E−20 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −8.4434801E−05 | −8.1016943E−05 | 3.0644904E−04 | 5.0872443E−05 |
| A6 | 1.5604787E−05 | 7.2911377E−07 | −6.1570542E−07 | 3.1557995E−06 |
| A8 | −2.7283552E−07 | −2.0359536E−09 | −1.4143564E−09 | −2.0056616E−08 |
| A10 | 3.5633820E−09 | 1.8252049E−11 | −6.2385855E−12 | −9.7833910E−11 |
| A12 | −1.0665812E−11 | 2.3806043E−13 | −4.8887298E−13 | 8.8611966E−13 |
| A14 | −2.7949534E−13 | −3.9331305E−15 | 3.6009874E−15 | 5.3066130E−15 |
| A16 | 1.5662330E−15 | −8.5524424E−18 | 1.0336213E−17 | 1.7926881E−17 |
| A18 | 3.2720662E−17 | 3.0378770E−19 | 6.7118973E−21 | −5.0534643E−19 |
| A20 | −3.0269254E−19 | −2.4724087E−21 | −1.7507411E−21 | 2.4082904E−21 |

| Sn | 11 | 12 |
|---|---|---|
| KA | 1.0000000E+00 | 1.0000000E+00 |
| A4 | −2.8880565E−04 | −1.6869429E−04 |
| A6 | 7.1426257E−07 | −2.5084059E−07 |
| A8 | −1.0002257E−08 | 1.4207186E−08 |
| A10 | 2.9418799E−10 | −4.1994902E−11 |
| A12 | 5.5587977E−13 | 1.0282404E−12 |
| A14 | 6.5813426E−16 | 1.1784322E−14 |
| A16 | 3.3918622E−17 | −6.4278379E−17 |
| A18 | −5.7004745E−19 | −5.5462975E−19 |
| A20 | −4.2867991E−21 | 1.1291123E−20 |

Example 15

Figure 29:
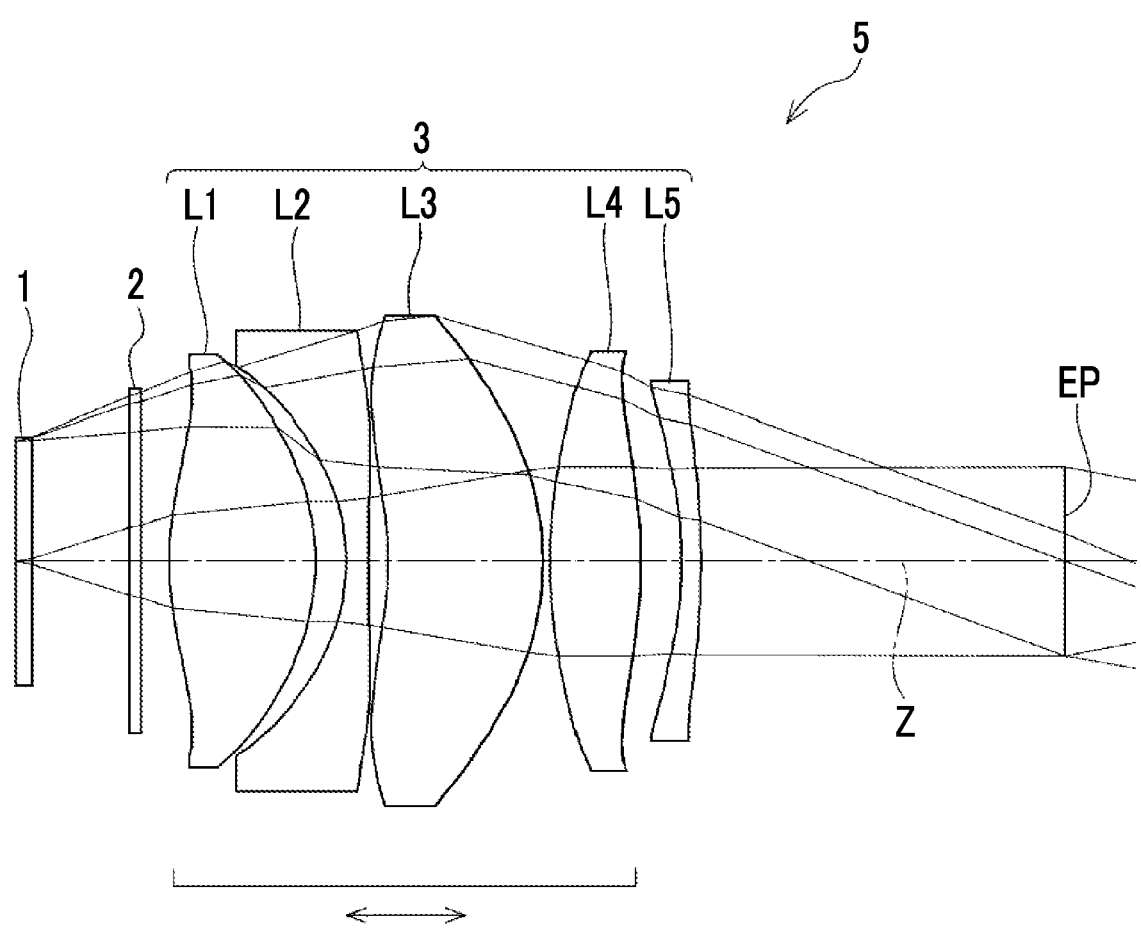
FIG. 29 is a cross-sectional view illustrating a configuration and luminous flux of an observation optical system of Example 15.

FIG. 29 illustrates a configuration and luminous flux of the observation optical system 5 of Example 15. The observation optical system 5 of Example 15 comprises the display element 1, the optical member 2, and the eyepiece lens 3 in order from the display element side to the eyepoint side. The eyepiece lens 3 consists of the lens L1 having positive refractive power, the lens L2 having negative refractive power, the lens L3 having positive refractive power, the lens L4 having positive refractive power, and the lens L5 having negative diopter adjustment, the lens L1, the lens L2, the lens L3, and the lens L4 move as a single along the optical axis Z.

Figure 30:
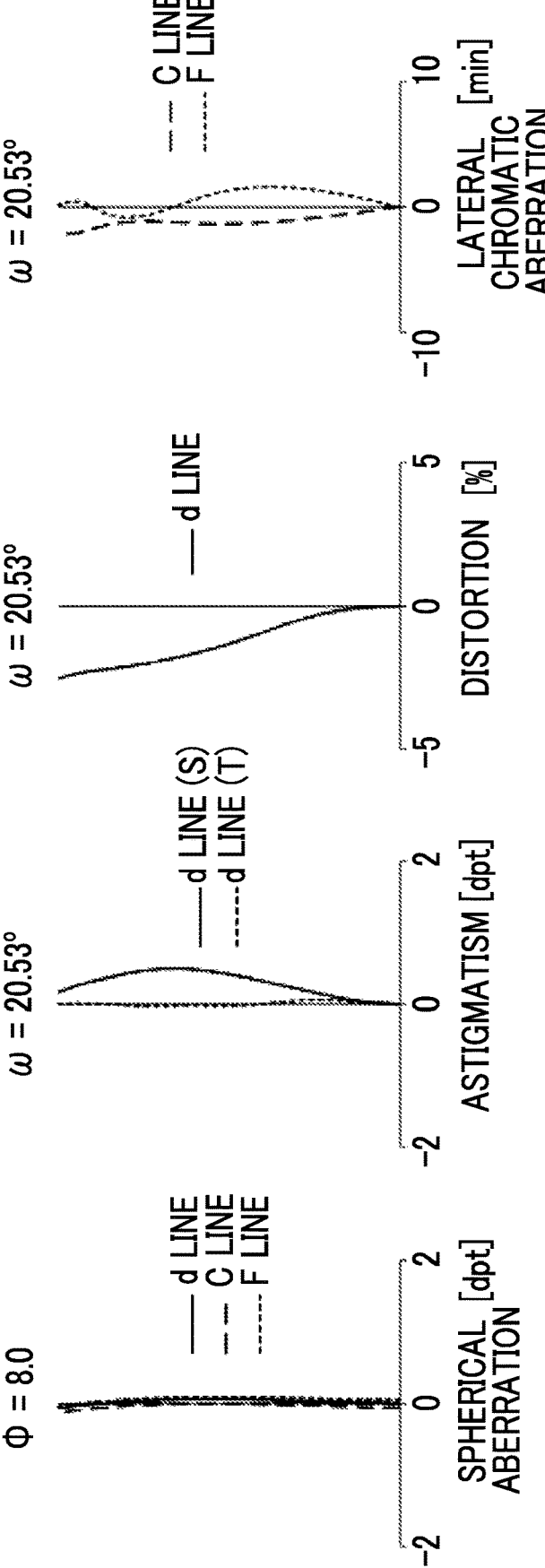
FIG. 30 illustrates various aberration diagrams of the observation optical system of Example 15.

For the observation optical system 5 of Example 15, basic lens data is shown in Table 43, specifications and variable surface spacing are shown in Table 44, aspherical coefficients are shown in Table 45, and various aberration diagrams in a state where the diopter is −0.99 diopter are illustrated in FIG. 30.

TABLE 43

| | | Example 15 | | |
|---|---|---|---|---|
| Sn | R | D | Nd | vd |
| 1 | ∞ | 0.7000 | 1.51900 | 64.90 |
| 2 | ∞ | 4.0000 | | |
| 3 | ∞ | 0.5000 | 1.51900 | 64.90 |
| 4 | ∞ | DD[4] | | |

TABLE 43-continued

| | | Example 15 | | |
|---|---|---|---|---|
| Sn | R | D | Nd | vd |
| *5 | 12.9462 | 6.0568 | 1.81781 | 46.22 |
| *6 | −10.5485 | 1.2580 | | |
| *7 | −9.0348 | 0.9000 | 1.63351 | 23.63 |
| *8 | 54.6256 | 0.8131 | | |
| *9 | −16.2769 | 6.3946 | 1.53500 | 55.73 |
| *10 | −12.5390 | 0.3000 | | |
| *11 | 21.2093 | 3.7074 | 1.53500 | 55.73 |
| *12 | −20.9644 | DD[12] | | |
| *13 | −16.9801 | 0.8000 | 1.67753 | 31.61 |
| *14 | −36.3412 | 15.0000 | | |
| 15 (EP) | ∞ | | | |

TABLE 44

| | Example 15 | | |
|---|---|---|---|
| Diopter | −1 dpt | −4.5 dpt | 2.5 dpt |
| f | 12.84 | 12.84 | 12.84 |
| Apparent Field of View [°] | 41 | 39 | 42 |
| DD[4] | 1.13 | 0.34 | 1.91 |
| DD[12] | 1.67 | 2.46 | 0.88 |
| H | 5.03 | | |

TABLE 45

| | | Example 15 | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | −5.1161594E−04 | −1.6535516E−05 | −2.0013692E−04 | −2.6148897E−04 |
| A6 | 7.6302538E−07 | 4.9464872E−06 | 1.4070296E−05 | 9.6258250E−07 |
| A8 | 1.1967926E−07 | −9.2087333E−08 | −2.9491908E−07 | 1.1458220E−11 |
| A10 | −5.9353264E−09 | 4.8001276E−10 | 3.5220281E−09 | 3.4977096E−11 |
| A12 | 8.8213302E−11 | 9.3148173E−12 | −9.7837846E−12 | 2.7955761E−13 |
| A14 | 7.5168722E−13 | −5.9626435E−14 | −3.1243970E−13 | −2.5545323E−15 |
| A16 | −3.7839083E−14 | −1.8514626E−15 | 2.1425755E−15 | −1.4948542E−17 |
| A18 | 4.0759164E−16 | 1.8715230E−17 | 3.8631282E−17 | 1.3658381E−19 |
| A20 | −1.4495444E−18 | −2.4315911E−20 | −3.1889107E−19 | −2.0579528E−21 |

| Sn | 9 | 10 | 11 | 12 |
|---|---|---|---|---|
| KA | 1.0000000E+00 | 1.0000000E+00 | 1.0000000E+00 | 1.0000000E+00 |
| A4 | 4.0909070E−04 | −7.9436921E−05 | −1.7374782E−04 | 1.7967245E−04 |
| A6 | −5.2963696E−07 | 3.0399640E−06 | 2.7569380E−06 | −5.8437768E−07 |
| A8 | −1.4744099E−09 | −1.5699297E−08 | −2.6749313E−08 | 2.2219943E−08 |
| A10 | −1.0834816E−11 | −8.2201523E−11 | 1.7044243E−10 | −1.6964132E−10 |
| A12 | −5.0343289E−13 | 7.3286851E−13 | −3.1925040E−13 | −1.7268632E−13 |
| A14 | 3.4611905E−15 | 4.1727604E−15 | −5.0643302E−15 | 8.4174894E−15 |
| A16 | 1.7906178E−17 | 2.0130809E−19 | 6.6244636E−17 | −2.6997821E−17 |
| A18 | 1.1333012E−20 | −5.0814564E−19 | 3.0232349E−19 | 5.7587380E−19 |
| A20 | −9.4421241E−22 | 2.7179060E−21 | 4.6072382E−21 | 7.5728929E−21 |

| Sn | 13 | 14 |
|---|---|---|
| KA | 1.0000000E+00 | 1.0000000E+00 |
| A4 | 1.1190247E−04 | −1.9017340E−06 |
| A6 | 6.5887305E−07 | 1.6427066E−06 |
| A8 | −4.7515935E−09 | −1.7727042E−08 |
| A10 | 6.0184685E−11 | 3.5203378E−10 |
| A12 | 1.5164718E−12 | −2.3883180E−12 |
| A14 | 3.2668030E−15 | 8.8608658E−14 |
| A16 | −1.2527184E−16 | −1.0631183E−15 |
| A18 | −4.2436755E−18 | −1.0736610E−17 |
| A20 | 5.0367193E−20 | 2.0652768E−19 |

Table 46 to Table 48 show the corresponding values of Conditional Expressions (1) to (20) of the observation optical system 5 of Examples 1 to 15. Values shown in Table 46 to Table 48 are values based on the d line. Preferable ranges of the conditional expressions may be set using the corresponding values of the examples shown in Table 46 to Table 48 as the upper limits or the lower limits of the conditional expressions.

TABLE 46

| Expression Number | | Example 1 | Example 2 | Example 3 | Example 4 | Example 5 |
|---|---|---|---|---|---|---|
| (1) | H/f | 0.397 | 0.396 | 0.397 | 0.396 | 0.440 |
| (2) | H/TLA | 0.227 | 0.214 | 0.220 | 0.204 | 0.242 |
| (3) | Nn1 | 1.63351 | 1.63351 | 1.63351 | 1.63351 | 1.63351 |
| (4) | \|(Rnf − Rpr)/(Rnf + Rpr)\| | 0.008 | 0.018 | 0.002 | 0.048 | 0.039 |
| (5) | f/fp1 | 1.464 | 1.604 | 1.496 | 1.671 | 1.505 |
| (6) | f/fn1 | −1.176 | −1.081 | −1.163 | −1.197 | −1.121 |
| (7) | f/fp2 | 0.360 | 0.265 | 0.360 | 0.280 | 0.349 |
| (8) | H/fp1 | 0.581 | 0.635 | 0.594 | 0.662 | 0.662 |
| (9) | H/fn1 | −0.467 | −0.428 | −0.462 | −0.474 | −0.493 |
| (10) | H/fp2 | 0.143 | 0.105 | 0.143 | 0.111 | 0.154 |
| (11) | vn1 | 23.63 | 23.63 | 23.63 | 23.63 | 23.63 |
| (12) | Nps | 1.76709 | 1.77215 | 1.76709 | 1.81625 | 1.76709 |
| (13) | vps | 49.20 | 50.78 | 49.20 | 46.38 | 49.20 |
| (14) | Nave | 1.63997 | 1.60527 | 1.63997 | 1.60715 | 1.62247 |
| (15) | f/\|fe\| | 0.343 | 0.135 | 0.330 | 0.007 | 0.075 |
| (16) | \|(Rer − Ref)/(Rer + Ref)\| | 0.610 | 0.922 | 0.587 | 0.183 | 0.147 |
| (17) | dE/TLA | 0.015 | 0.056 | 0.063 | 0.053 | 0.008 |
| (18) | f/\|fo\| | 0.119 | 1.604 | 0.120 | 1.671 | 0.060 |
| (19) | \|(Ror − Rof)/(Ror + Rof)\| | 0.019 | 3.155 | 0.018 | 3.049 | 0.070 |
| (20) | dO/TLA | 0.084 | 0.033 | 0.070 | 0.039 | 0.051 |

TABLE 47

| Expression Number | | Example 6 | Example 7 | Example 8 | Example 9 | Example 10 |
|---|---|---|---|---|---|---|
| (1) | H/f | 0.440 | 0.396 | 0.423 | 0.396 | 0.397 |
| (2) | H/TLA | 0.252 | 0.218 | 0.217 | 0.218 | 0.224 |
| (3) | Nn1 | 1.63351 | 1.63351 | 1.63351 | 1.63351 | 1.63351 |
| (4) | \|(Rnf − Rpr)/(Rnf + Rpr)\| | 0.404 | 0.022 | 0.031 | 0.022 | 0.055 |
| (5) | f/fp1 | 0.357 | 1.698 | 1.508 | 1.698 | 1.492 |
| (6) | f/fn1 | −0.707 | −1.095 | −1.067 | −1.095 | −1.069 |
| (7) | f/fp2 | 0.274 | 0.264 | 0.351 | 0.264 | 0.362 |
| (8) | H/fp1 | 0.157 | 0.673 | 0.638 | 0.673 | 0.592 |
| (9) | H/fn1 | −0.311 | −0.434 | −0.451 | −0.434 | −0.425 |
| (10) | H/fp2 | 0.120 | 0.105 | 0.148 | 0.105 | 0.144 |
| (11) | vn1 | 23.63 | 23.63 | 23.63 | 23.63 | 23.63 |
| (12) | Nps | 1.79997 | 1.80435 | 1.77538 | 1.80435 | 1.76709 |
| (13) | vps | 48.00 | 47.57 | 50.46 | 47.57 | 49.20 |
| (14) | Nave | 1.63975 | 1.59628 | 1.64565 | 1.59628 | 1.61944 |
| (15) | f/\|fe\| | 0.565 | 0.129 | 0.054 | 0.129 | 0.293 |
| (16) | \|(Rer − Ref)/(Rer + Ref)\| | 0.936 | 0.617 | 2.242 | 0.617 | 1.054 |
| (17) | dE/TLA | 0.008 | 0.056 | 0.044 | 0.056 | 0.060 |
| (18) | f/\|fo\| | 0.579 | 0.200 | 0.107 | 0.200 | 0.022 |
| (19) | \|(Ror − Rof)/(Ror + Rof)\| | 0.249 | 0.763 | 0.084 | 0.763 | 0.050 |
| (20) | dO/TLA | 0.050 | 0.037 | 0.050 | 0.029 | 0.068 |

TABLE 48

| Expression Number | | Example 11 | Example 12 | Example 13 | Example 14 | Example 15 |
|---|---|---|---|---|---|---|
| (1) | H/f | 0.409 | 0.378 | 0.392 | 0.393 | 0.392 |
| (2) | H/TLA | 0.207 | 0.209 | 0.179 | 0.212 | 0.181 |
| (3) | Nn1 | 1.63351 | 1.63351 | 1.63351 | 1.63351 | 1.63351 |
| (4) | \|(Rnf − Rpr)/(Rnf + Rpr)\| | 0.098 | 0.272 | 0.052 | 0.033 | 0.077 |
| (5) | f/fp1 | 1.549 | 0.146 | 1.604 | 1.559 | 1.597 |
| (6) | f/fn1 | −1.065 | −0.910 | −1.114 | −1.120 | −1.055 |
| (7) | f/fp2 | 0.272 | 0.744 | 0.207 | 0.518 | 0.201 |
| (8) | H/fp1 | 0.633 | 0.055 | 0.629 | 0.613 | 0.626 |
| (9) | H/fn1 | −0.435 | −0.344 | −0.437 | −0.440 | −0.414 |
| (10) | H/fp2 | 0.111 | 0.281 | 0.081 | 0.204 | 0.079 |
| (11) | vn1 | 23.63 | 23.63 | 23.63 | 23.63 | 23.63 |
| (12) | Nps | 1.76709 | 1.80001 | 1.84088 | 1.76709 | 1.81781 |
| (13) | vps | 49.20 | 48.00 | 43.91 | 49.20 | 46.22 |
| (14) | Nave | 1.63997 | 1.66070 | 1.64888 | 1.63997 | 1.63977 |
| (15) | f/\|fe\| | 0.386 | 0.744 | 0.272 | 0.237 | 0.268 |
| (16) | \|(Rer − Ref)/(Rer + Ref)\| | 2.660 | 1.239 | 0.369 | 0.310 | 0.363 |
| (17) | dE/TLA | 0.012 | 0.012 | 0.024 | 0.042 | 0.060 |
| (18) | f/\|fo\| | 0.185 | 0.702 | 1.604 | 0.242 | 1.597 |
| (19) | \|(Ror − Rof)/(Ror + Rof)\| | 0.137 | 0.457 | 7.397 | 0.150 | 9.799 |
| (20) | dO/TLA | 0.043 | 0.037 | 0.039 | 0.047 | 0.040 |

The observation optical system 5 of Examples 1 to 15 has an apparent field of view greater than or equal to 40 degrees at the full angle of view in the diagonal direction in a state where the diopter is −1 diopter, and thus has a wide apparent field of view. In addition, while the observation optical system 5 of Examples 1 to 15 are configured to have a small size, the observation optical system 5 of Examples 1 to 15 implements high optical performance by favorably correcting various aberrations.

Figure 31:
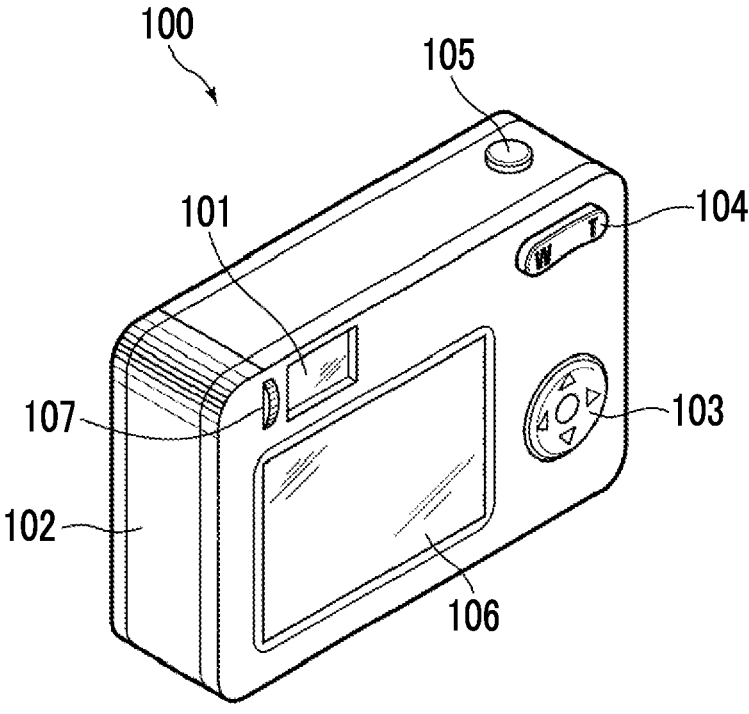
FIG. 31 is a perspective view of a rear surface side of an optical apparatus according to one embodiment.

Next, an optical apparatus comprising the observation optical system according to the embodiment of the present disclosure will be described. FIG. 31 is a perspective view illustrating a schematic configuration of a rear surface side of a camera 100 that is an optical apparatus according to one embodiment of the present disclosure. As an example, the camera 100 is a digital camera. The camera 100 comprises a finder 101 and a diopter adjustment dial 107 for performing the diopter adjustment in an upper portion of a camera body 102. The finder 101 is an example of an observation optical apparatus and comprises the observation optical system according to one embodiment of the present disclosure.

The camera 100 comprises an operation button 103 for performing various types of settings, a zoom lever 104 for changing magnification, and a monitor 106 for displaying images and various setting screens on a rear surface of the camera body 102 and comprises a shutter button 105 on an upper surface of the camera body 102. In addition, the camera 100 comprises an imaging lens (not illustrated) on a front surface of the camera body 102 and comprises an imaging element (not illustrated) that captures a subject image formed by the imaging lens inside the camera body 102. A user observes the subject image through the finder 101 from the rear surface side.

While the disclosed technology has been illustratively described above using the embodiment and the examples, the disclosed technology is not limited to the embodiment and to the examples and can be subjected to various modifications. For example, the curvature radius, the surface spacing, the refractive index, the Abbe number, and the aspherical coefficient of each lens are not limited to the values illustrated in each of the above numerical value examples and may have other values. In addition, the optical apparatus according to the embodiment of the present disclosure is not limited to the above example. The present disclosure can also be applied to a film camera, a video camera, a head-mounted display, and the like.

The following appendixes are further disclosed with respect to the embodiment and the examples described above.

Appendix 1

An observation optical system comprising a display element, and an eyepiece lens disposed on an eyepoint side with respect to the display element, in which the eyepiece lens includes a first negative lens having strongest negative refractive power among lenses included in the eyepiece lens, a first positive lens disposed adjacent to a display element side of the first negative lens, and a second positive lens disposed closest to the display element side among positive lenses disposed on the eyepoint side with respect to the first negative lens, the number of lenses included in the eyepiece lens is greater than or equal to five, and in a case where a half value of a longest diameter of a display region in the display element is denoted by H, a focal length of the eyepiece lens in a state where diopter is −1 diopter is denoted by f, a sum of an air conversion distance on an optical axis from a display surface of the display element to a lens surface of the eyepiece lens closest to the display element side and a distance on the optical axis from the lens surface of the eyepiece lens closest to the display element side to a lens surface of the eyepiece lens closest to the eyepoint side in a state where the diopter is −1 diopter is denoted by TLA, and a refractive index of the first negative lens with respect to a d line is denoted by Nn1, Conditional Expressions (1), (2), and (3) are satisfied, which are represented by $$0.355 < H/f < 0.48 \tag{1}$$

$$0.17 < H/TLA < 0.285 \tag{2}$$

$$1.5 < Nn1 < 1.7 \tag{3}.$$

Appendix 2

The observation optical system according to Appendix 1, in which the number of lenses included in the eyepiece lens is five or six.

Appendix 3

The observation optical system according to Appendix 1 or 2, in which in a case where a paraxial curvature radius of a surface of the first positive lens on the eyepoint side is denoted by Rpr, and a paraxial curvature radius of a surface of the first negative lens on the display element side is denoted by Rnf, Conditional Expression (4) is satisfied, which is represented by $$0 < |(Rnf-Rpr)/(Rnf+Rpr)| < 0.6 \tag{4}.$$

Appendix 4

The observation optical system according to any one of Appendixes 1 to 3, in which in a case where a focal length of the first positive lens is denoted by fp1, Conditional Expression (5) is satisfied, which is represented by $$0 < f/fp1 < 1.8 \tag{5}.$$

Appendix 5

The observation optical system according to any one of Appendixes 1 to 4, in which in a case where a focal length of the first negative lens is denoted by fn1, Conditional Expression (6) is satisfied, which is represented by $$-1.4 < f/fn1 < -0.3 \tag{6}.$$

Appendix 6

The observation optical system according to any one of Appendixes 1 to 5, in which in a case where a focal length of the second positive lens is denoted by fp2, Conditional Expression (7) is satisfied, which is represented by $$0 < f/fp2 < 0.9 \tag{7}.$$

Appendix 7

The observation optical system according to any one of Appendixes 1 to 6, in which in a case where a focal length of the first positive lens is denoted by fp1, Conditional Expression (8) is satisfied, which is represented by $$0 < H/fp1 < 0.9 \tag{8}.$$

Appendix 8

The observation optical system according to any one of Appendixes 1 to 7, in which in a case where a focal length of the first negative lens is denoted by fn1, Conditional Expression (9) is satisfied, which is represented by $$-0.6 < H/fn1 < -0.2 \tag{9}.$$

Appendix 9

The observation optical system according to any one of Appendixes 1 to 8, in which in a case where a focal length of the second positive lens is denoted by fp2, Conditional Expression (10) is satisfied, which is represented by $$0 < H/fp2 < 0.4 \tag{10}.$$

Appendix 10

The observation optical system according to any one of Appendixes 1 to 9, in which in a case where an Abbe number of the first negative lens based on the d line is denoted by vn1, Conditional Expression (11) is satisfied, which is represented by $$19 < vn1 < 27 \tag{11}.$$

Appendix 11

The observation optical system according to any one of Appendixes 1 to 10, in which in a case where a refractive index of a lens having strongest positive refractive power among the lenses included in the eyepiece lens with respect to the d line is denoted by Nps, Conditional Expression (12) is satisfied, which is represented by $$1.6 < Nps < 2 \tag{12}.$$

Appendix 12

The observation optical system according to any one of Appendixes 1 to 11, in which in a case where an Abbe number of a lens having strongest positive refractive power among the lenses included in the eyepiece lens based on the d line is denoted by vps, Conditional Expression (13) is satisfied, which is represented by $$35 < vps < 55 \tag{13}$$

Appendix 13

The observation optical system according to any one of Appendixes 1 to 12, in which in a case where an average value of refractive indexes of all lenses included in the eyepiece lens with respect to the d line is denoted by Nave, Conditional Expression (14) is satisfied, which is represented by $$1.55 < Nave < 1.75 \tag{14}$$

Appendix 14

The observation optical system according to any one of Appendixes 1 to 13, in which in a case where a focal length of a lens of the eyepiece lens closest to the eyepoint side is denoted by fe, Conditional Expression (15) is satisfied, which is represented by $$0 < f/|fe| < 0.9 \tag{15}$$

Appendix 15

The observation optical system according to any one of Appendixes 1 to 14, in which in a case where a paraxial curvature radius of a surface, on the display element side, of a lens of the eyepiece lens closest to the eyepoint side is denoted by Ref, and a paraxial curvature radius of a surface, on the eyepoint side, of the lens of the eyepiece lens closest to the eyepoint side is denoted by Rer, Conditional Expression (16) is satisfied, which is represented by $$0 < |(Rer-Ref)/(Rer+Ref)| < 3 \tag{16}$$

Appendix 16

The observation optical system according to any one of Appendixes 1 to 15, in which in a case where an air interval on the optical axis between a lens of the eyepiece lens closest to the eyepoint side and a second lens of the eyepiece lens from the eyepoint side in a state where the diopter is −1 diopter is denoted by dE, Conditional Expression (17) is satisfied, which is represented by $$0.002 < dE/TLA < 0.07 \tag{17}$$

Appendix 17

The observation optical system according to any one of Appendixes 1 to 16, in which in a case where a focal length of a lens of the eyepiece lens closest to the display element side is denoted by fo, Conditional Expression (18) is satisfied, which is represented by $$0.01 < f/|fo| < 1.8 \tag{18}$$

Appendix 18

The observation optical system according to any one of Appendixes 1 to 17, in which in a case where a paraxial curvature radius of a surface, on the display element side, of a lens of the eyepiece lens closest to the display element side is denoted by Rof, and a paraxial curvature radius of a surface, on the eyepoint side, of the lens of the eyepiece lens closest to the display element side is denoted by Ror, Conditional Expression (19) is satisfied, which is represented by $$0 < |(Ror-Rof)/(Ror+Rof)| < 10 \tag{19}$$

Appendix 19

The observation optical system according to any one of Appendixes 1 to 18, in which in a case where an air interval on the optical axis between a lens of the eyepiece lens closest to the display element side and a second lens of the eyepiece lens from the display element side is denoted by dO, Conditional Expression (20) is satisfied, which is represented by $$0 < dO/TLA < 0.1 \tag{20}$$

Appendix 20

An optical apparatus comprising the observation optical system according to any one of Appendixes 1 to 19.

What is claimed is:

1. An observation optical system comprising:
   a display element; and
   an eyepiece lens disposed on an eyepoint side with respect to the display element,
   wherein the eyepiece lens includes a first negative lens having strongest negative refractive power among lenses included in the eyepiece lens, a first positive lens disposed adjacent to a display element side of the first negative lens, and a second positive lens disposed closest to the display element side among positive lenses disposed on the eyepoint side with respect to the first negative lens,
   the number of lenses included in the eyepiece lens is greater than or equal to five,
   in a case where a half value of a longest diameter of a display region in the display element is denoted by H, a focal length of the eyepiece lens in a state where diopter is −1 diopter is denoted by f, a sum of an air conversion distance on an optical axis from a display surface of the display element to a lens surface of the eyepiece lens closest to the display element side and a distance on the optical axis from the lens surface of the eyepiece lens closest to the display element side to a lens surface of the eyepiece lens closest to the eyepoint side in a state where the diopter is −1 diopter is denoted by TLA, and a refractive index of the first negative lens with respect to a d line is denoted by Nn1, Conditional Expressions (1), (2), and (3) are satisfied, which are represented by $$0.355 < H/f < 0.48 \tag{1}$$

$$0.17 < H/TLA < 0.285 \tag{2}$$

$$1.5 < Nn1 < 1.7 \tag{3, and}$$

in a case where an Abbe number of the first negative lens based on the d line is denoted by $\nu n1$, Conditional Expression (11) is satisfied, which is represented by $$19 < \nu n1 < 27 \tag{11}$$

2. The observation optical system according to claim 1, wherein the number of lenses included in the eyepiece lens is five or six.

3. The observation optical system according to claim 1, wherein in a case where a paraxial curvature radius of a surface of the first positive lens on the eyepoint side is denoted by Rpr, and a paraxial curvature radius of a surface of the first negative lens on the display element side is denoted by Rnf, Conditional Expression (4) is satisfied, which is represented by $$0 < (Rnf-Rpr)/(Rnf+Rpr)| < 0.6 \tag{4}$$

4. The observation optical system according to claim 1, wherein in a case where a focal length of the first positive lens is denoted by fp1, Conditional Expression (5) is satisfied, which is represented by $$0 < f/fp1 < 1.8 \tag{5}$$

5. The observation optical system according to claim 1, wherein in a case where a focal length of the first negative lens is denoted by fn1, Conditional Expression (6) is satisfied, which is represented by $$-1.4 < f/fn1 < -0.3 \tag{6}$$

6. The observation optical system according to claim 1, wherein in a case where a focal length of the second positive lens is denoted by fp2, Conditional Expression (7) is satisfied, which is represented by $$0 < f/fp2 < 0.9 \tag{7}$$

7. The observation optical system according to claim 1, wherein in a case where a focal length of the first positive lens is denoted by fp1, Conditional Expression (8) is satisfied, which is represented by $$0 < H/fp1 < 0.9 \tag{8}$$

8. The observation optical system according to claim 1, wherein in a case where a focal length of the first negative lens is denoted by fn1, Conditional Expression (9) is satisfied, which is represented by $$-0.6 < H/fn1 < -0.2 \tag{9}$$

9. The observation optical system according to claim 1, wherein in a case where a focal length of the second positive lens is denoted by fp2, Conditional Expression (10) is satisfied, which is represented by $$0 < H/fp2 < 0.4 \tag{10}$$

10. The observation optical system according to claim 1, wherein in a case where an Abbe number of a lens having strongest positive refractive power among the lenses included in the eyepiece lens based on the d line is denoted by $\nu ps$, Conditional Expression (13) is satisfied, which is represented by $$35 < \nu ps < 55 \tag{13}$$

11. The observation optical system according to claim 1, wherein in a case where a focal length of a lens of the eyepiece lens closest to the eyepoint side is denoted by fe, Conditional Expression (15) is satisfied, which is represented by $$0 < f/|fe| < 0.9 \tag{15}$$

12. The observation optical system according to claim 1, wherein in a case where a paraxial curvature radius of a surface, on the display element side, of a lens of the eyepiece lens closest to the eyepoint side is denoted by Ref, and a paraxial curvature radius of a surface, on the eyepoint side, of the lens of the eyepiece lens closest to the eyepoint side is denoted by Rer, Conditional Expression (16) is satisfied, which is represented by $$0 < (Rer-Ref)/(Rer+Ref)| < 3 \tag{16}$$

13. The observation optical system according to claim 1, wherein in a case where an air interval on the optical axis between a lens of the eyepiece lens closest to the eyepoint side and a second lens of the eyepiece lens from the eyepoint side in a state where the diopter is −1 diopter is denoted by dE, Conditional Expression (17) is satisfied, which is represented by $$0.002 < dE/TLA < 0.07 \tag{17}$$

14. The observation optical system according to claim 1, wherein in a case where a focal length of a lens of the eyepiece lens closest to the display element side is denoted by fo, Conditional Expression (18) is satisfied, which is represented by $$0.01 < f/|fo| < 1.8 \tag{18}$$

15. The observation optical system according to claim 1, wherein in a case where a paraxial curvature radius of a surface, on the display element side, of a lens of the eyepiece lens closest to the display element side is denoted by Rof, and a paraxial curvature radius of a surface, on the eyepoint side, of the lens of the eyepiece lens closest to the display element side is denoted by Ror, Conditional Expression (19) is satisfied, which is represented by $$0 < (Ror-Rof)/(Ror+Rof)| < 10 \tag{19}$$

16. The observation optical system according to claim 1, wherein in a case where an air interval on the optical axis between a lens of the eyepiece lens closest to the display element side and a second lens of the eyepiece lens from the display element side is denoted by dO, Conditional Expression (20) is satisfied, which is represented by $$0 < dO/TLA < 0.1 \tag{20}$$

17. An optical apparatus comprising:
the observation optical system according to claim 1.

18. An observation optical system comprising:
a display element; and
an eyepiece lens disposed on an eyepoint side with respect to the display element,
wherein the eyepiece lens includes a first negative lens having strongest negative refractive power among lenses included in the eyepiece lens, a first positive lens disposed adjacent to a display element side of the first negative lens, and a second positive lens disposed closest to the display element side among positive lenses disposed on the eyepoint side with respect to the first negative lens,
the number of lenses included in the eyepiece lens is greater than or equal to five,
in a case where a half value of a longest diameter of a display region in the display element is denoted by H, a focal length of the eyepiece lens in a state where diopter is −1 diopter is denoted by f, a sum of an air conversion distance on an optical axis from a display surface of the display element to a lens surface of the eyepiece lens closest to the display element side and a distance on the optical axis from the lens surface of the eyepiece lens closest to the display element side to a lens surface of the eyepiece lens closest to the eyepoint side in a state where the diopter is −1 diopter is denoted by TLA, and a refractive index of the first negative lens with respect to a d line is denoted by Nn1, Conditional Expressions (1), (2), and (3) are satisfied, which are represented by $$0.355 < H/f < 0.48 \qquad (1)$$

$$0.17 < H/TLA < 0.285 \qquad (2)$$

$$1.5 < Nn1 < 1.7 \qquad (3), \text{and}$$

in a case where a refractive index of a lens having strongest positive refractive power among the lenses included in the eyepiece lens with respect to the d line is denoted by Nps, Conditional Expression (12) is satisfied, which is represented by $$1.6 < Nps < 2 \qquad (12).$$

19. The observation optical system according to claim 18, wherein in a case where an average value of refractive indexes of all lenses included in the eyepiece lens with respect to the d line is denoted by Nave, Conditional Expression (14-3) is satisfied, which is represented by $$1.59628 \le Nave < 1.75 \qquad (14-3).$$

20. The observation optical system according to claim 18, wherein in a case where an air interval on the optical axis between a lens of the eyepiece lens closest to the display element side and a second lens of the eyepiece lens from the display element side is denoted by dO, Conditional Expression (20-2) is satisfied, which is represented by $$0.02 < dO/TLA < 0.09 \qquad (20-2).$$

21. The observation optical system according to claim 18, wherein in a case where an average value of refractive indexes of all lenses included in the eyepiece lens with respect to the d line is denoted by Nave, and an air interval on the optical axis between a lens of the eyepiece lens closest to the display element side and a second lens of the eyepiece lens from the display element side is denoted by dO, Conditional Expressions (14-3) and (20-2) are satisfied, which are represented by $$1.59628 \le Nave < 1.75 \qquad (14-3)$$

$$0.02 < dO/TLA < 0.09 \qquad (20-2).$$

22. An optical apparatus comprising:
the observation optical system according to claim 18.

\* \* \* \* \*